(12) United States Patent
Kaushal et al.

(10) Patent No.: US 8,725,667 B2
(45) Date of Patent: May 13, 2014

(54) METHOD AND SYSTEM FOR DETECTION OF TOOL PERFORMANCE DEGRADATION AND MISMATCH

(75) Inventors: Sanjeev Kaushal, San Jose, CA (US); Sukesh Janubhai Patel, Cupertino, CA (US); Kenji Sugishima, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 511 days.

(21) Appl. No.: 12/416,018

(22) Filed: Mar. 31, 2009

(65) Prior Publication Data

US 2009/0240366 A1  Sep. 24, 2009

Related U.S. Application Data

(63) Continuation-in-part of application No. 12/044,958, filed on Mar. 8, 2008, now Pat. No. 8,190,543.

(51) Int. Cl.
*G06F 15/18* (2006.01)
*G06N 3/00* (2006.01)
*G06F 17/00* (2006.01)
*G06N 5/02* (2006.01)
*G06N 7/00* (2006.01)
*G06N 7/08* (2006.01)
*G06F 19/00* (2011.01)

(52) U.S. Cl.
USPC .......... 706/14; 706/13; 706/47; 706/55; 700/110

(58) Field of Classification Search
None
See application file for complete search history.

(56) References Cited

U.S. PATENT DOCUMENTS 5,495,417 A 2/1996 Fuduka et al.
5,644,686 A 7/1997 Hekmatpour
5,694,325 A 12/1997 Fukuda et al.
5,867,799 A 2/1999 Lang et al.

(Continued)

FOREIGN PATENT DOCUMENTS

CN 1734382 2/2006
CN 1791971 6/2006

(Continued)

OTHER PUBLICATIONS

Jonathan Chang Yung-Cheng; Fan-Tien Cheng, "Application development of virtual metrology in semiconductor industry," Industrial Electronics Society, 2005. IECON 2005. 31st Annual Conference of IEEE , vol., no., pp.6 pp.,, Nov. 6-10, 2005.*

(Continued)

*Primary Examiner* — Kakali Chaki
*Assistant Examiner* — Daniel Pellett
(74) *Attorney, Agent, or Firm* — Amin, Turocy & Watson, LLP

(57) ABSTRACT

Autonomous biologically based learning tool system(s) and method(s) that the tool system(s) employs for learning and analysis of performance degradation and mismatch are provided. The autonomous biologically based learning tool system includes (a) one or more tool systems that perform a set of specific tasks or processes and generate assets and data related to the assets that characterize the various processes and associated tool performance; (b) an interaction manager that receives and formats the data, and (c) an autonomous learning system based on biological principles of learning. Objectively generated knowledge gleaned from synthetic or production data can be utilized to determine a mathematical relationship among a specific output variable and a set of associated influencing variables. The generated relationship facilitates assessment of performance degradation of a set of tools, and performance mismatch among tools therein.

50 Claims, 21 Drawing Sheets

(56) References Cited

U.S. PATENT DOCUMENTS

| | | | |
|---|---|---|---|
| 6,122,397 | A | 9/2000 | Lee et al. |
| 6,201,999 | B1 | 3/2001 | Jevtic et al. |
| 6,496,746 | B2 | 12/2002 | Jevtic et al. |
| 6,678,572 | B1 | 1/2004 | Oh et al. |
| 6,725,114 | B1 | 4/2004 | Jevtic et al. |
| 6,876,894 | B1 | 4/2005 | Chen et al. |
| 7,127,304 | B1* | 10/2006 | Gould et al. ............... 700/20 |
| 7,133,804 | B2 | 11/2006 | Tonack et al. |
| 7,177,714 | B2 | 2/2007 | Giebels et al. |
| 7,218,980 | B1 | 5/2007 | Orshansky et al. |
| 7,246,039 | B2* | 7/2007 | Moorhouse ............... 702/185 |
| 7,373,216 | B1 | 5/2008 | Winkler et al. |
| 7,531,368 | B2 | 5/2009 | Winkler et al. |
| 7,571,019 | B2 | 8/2009 | Winstead et al. |
| 7,596,423 | B2 | 9/2009 | Winkler et al. |
| 7,596,718 | B2* | 9/2009 | Harvey et al. ............... 714/25 |
| 7,702,411 | B2 | 4/2010 | Bagchi et al. |
| 7,849,033 | B2 | 12/2010 | Sabe et al. |
| 8,005,634 | B2 | 8/2011 | Shanmugasundram et al. |
| 8,010,321 | B2* | 8/2011 | Lin et al. ............... 702/185 |
| 8,396,582 | B2 | 3/2013 | Kaushal et al. |
| 2003/0061212 | A1* | 3/2003 | Smith et al. ............... 707/6 |
| 2003/0199112 | A1 | 10/2003 | Shanmugasundram et al. |
| 2004/0254762 | A1* | 12/2004 | Hopkins et al. ............... 702/182 |
| 2005/0114829 | A1 | 5/2005 | Robin et al. |
| 2005/0144624 | A1 | 6/2005 | Riosa et al. |
| 2005/0288812 | A1* | 12/2005 | Cheng et al. ............... 700/109 |
| 2006/0042543 | A1 | 3/2006 | Funk et al. |
| 2006/0047356 | A1 | 3/2006 | Funk et al. |
| 2006/0129257 | A1* | 6/2006 | Chen et al. ............... 700/96 |
| 2006/0195409 | A1 | 8/2006 | Sabe et al. |
| 2006/0247915 | A1* | 11/2006 | Bradford et al. ............... 704/1 |
| 2007/0100487 | A1 | 5/2007 | Cheng et al. |
| 2007/0122921 | A1 | 5/2007 | Shanmugasundram et al. |
| 2007/2005341 | | 6/2007 | Burges et al. |
| 2007/0219738 | A1* | 9/2007 | Weiher et al. ............... 702/82 |
| 2007/0282767 | A1 | 12/2007 | Cheng et al. |
| 2007/0288419 | A1 | 12/2007 | Strasshere |
| 2008/0051929 | A1 | 2/2008 | Hongkham et al. |
| 2008/0051930 | A1 | 2/2008 | Oh et al. |
| 2008/0275586 | A1* | 11/2008 | Ko et al. ............... 700/110 |
| 2009/0138418 | A1 | 5/2009 | Hidai et al. |
| 2009/0222123 | A1 | 9/2009 | Nevills et al. |
| 2009/0240366 | A1 | 9/2009 | Kaushal et al. |
| 2009/0271344 | A1 | 10/2009 | Schafer et al. |

FOREIGN PATENT DOCUMENTS

| | | |
|---|---|---|
| CN | 101067742 | 11/2007 |
| JP | H04-112204 | 4/1992 |
| JP | 05-256495 | 10/1993 |
| JP | H11-329941 | 11/1999 |
| JP | 2006-024195 | 1/2006 |
| JP | 2006-500654 A | 1/2006 |
| JP | 2007-18490 | 1/2007 |
| JP | 2008-517362 | 5/2008 |
| JP | 4-123231 B2 | 7/2008 |
| JP | 2008-158748 | 7/2008 |

OTHER PUBLICATIONS

"A Tutorial on Learning with Bayesian Networks", David Heckerman, Microsoft Technical Report MSR-TR-95-06, 1995. http://research.microsoft.com/research/pubs/view.aspx?msr_tr_id=MSR-TR-95-06.

"Learning Probabilistic Networks", Paul J Krause, Phillips Research Laboratory, Technical Report, 1998.

International Search Report and Written Opinion for PCT Application No. PCT/US/09/36163, completed Apr. 15, 2009 and mailed Apr. 27, 2009, 10 pages.

International Search Report & Written Opinion dated May 5, 2009 for PCT Application Serial No. PCT/US09/36149, 11 Pages.

International Search Report & Written Opinion dated Mar. 18, 2010 for PCT Application Serial No. PCT/US10/23113, 11 Pages.

Kopetz, "Chapter 1: The Real Time Environment" in "Real-time systems: Design Principles for Distributed Embedded Applications," Springer Science+Business Media, LLC 2011, pp. 21-48.

Office Action mailed Oct. 13, 2011 for U.S. Appl. No. 12/044,958, 45 pages.

He. "Dynamically Self-Reconfigurable Systems for Machine Intelligence", Dissertation presented to the faculty of the Russ College of Engineering and Technology of Ohio University, Aug. 2006. 166 pages.

Hayes-Roth, et al. "A Doman-Specific Software Architecture for Adaptive Intelligent Systems", IEEE Transactions on Software Engineering, Apr. 1995. 43 pages.

Stirrup, et al. "Improved MOGA-tuning and visualization for a hybrid control system" Proceedings of the 16th IFAC World Congress, 2005. 6 pages.

Office Action dated Jan. 19, 2012 for U.S. Appl. No. 12/697,121, 22 pages.

OA dated Jul. 31, 2012 for U.S. Appl. No. 12/697,121, 31 pages.

OA dated Jun. 8, 2012 for U.S. Appl. No. 12/697,121, 29 pages.

Shin et al., "A machine learning approach to yield management in semiconductor manufacturing", J.Pro. Res., 2000, vol. 38, No. 17, pp. 4261-4271.

Kopetz, "The Real Time Environment" in Real-time systems: design principles for distributed embedded applications, (Kopetz), Kluwer, 2002, vol. 395, pp. 1-28.

OA dated Apr. 20, 2011 for U.S. Appl. No. 12/044,959, 25 pages.

International Search Report & Written Opinion dated Apr. 12, 2011 for PCT Application Serial No. PCT/US1122997, 13 Pages.

Office Action for Chinese Patent Application No. 200980104562.8 dated May 28, 2012, 19 pgs.

Office Action for Chinese Patent Application No. 200980104564.7 dated Jul. 3, 2012, 24 pgs.

Office Action dated Aug. 14, 2013 for U.S. Appl. No. 13/763,797, 47 pages.

Japanese Office Action mailed Jun. 11, 2013 for JP Patent Application No. 2010-549880, 4 pages.

Taiwanese Office Action mailed Sep. 26, 2013 for Taiwanese Patent Application No. 098107266, 16 pages.

Japanese Office Action mailed Oct. 15, 2013 for Japanese Patent Application No. 2012-503438, 23 pages.

Chinese Office Action mailed Oct. 8, 2013 for Chinese Patent Application No. 200980104562.8, 11 pages.

Chinese Office Action dated Feb. 28, 2013 for Chinese Patent Application No. 200980104562.8, 4 pages.

Japanese Office Action dated Mar. 26, 2013 for Japanese Patent Application No. 2010-549876, 4 pages.

Japanese Office Action mailed on Jan. 7, 2014 for Japanese Application No. 2010-549880, 4 pages.

Japanese Office Action mailed on Jan. 21, 2014 for Japanese Application No. 2012-503438, 3 pages.

\* cited by examiner

METHOD AND SYSTEM FOR DETECTION OF TOOL PERFORMANCE DEGRADATION AND MISMATCH

CROSS-REFERENCE TO RELATED APPLICATION

The subject application is a continuation-in-part of co-pending U.S. patent application Ser. No. 12/044,958, entitled "AUTONOMOUS BIOLOGICALLY BASED LEARNING TOOL," filed on Mar. 8, 2008. The subject application is also related to co-pending U.S. patent application Ser. No. 12/044,959, entitled "AUTONOMOUS ADAPTIVE SEMICONDUCTOR MANUFACTURING," filed on Mar. 8, 2008. The entireties of these applications are incorporated herein by reference.

BACKGROUND

Technological advances have lead to process-driven automated equipment that is increasingly complex. A tool system to accomplish a specific goal or perform a specific, highly technical process can commonly incorporate multiple functional elements to accomplish the goal or successfully execute the process, and various sensors that collect data to monitor the operation of the equipment. Such automated equipment can generate a large volume of data. Data can include substantial information related to a product or service performed as a part of the specific task, but it can also comprise sizable log information related to the execution of the process itself.

While modern electronic storage technologies can afford retaining constantly increasing quantities of data, utilization of the accumulated data remains far from optimal. Examination and interpretation of collected information generally requires human intervention, and while advances in computing power such as multiple-core processors, massively parallel platforms and processor grids, as well as advances in computing paradigms like object-oriented programming, modular code reuse, web based applications and more recently quantum computing, the processing of the collected data remains to be a non-autonomous, static programmatic enterprise wherein the data is operated upon. More importantly, in non-autonomous data processing, the data fails to drive the analysis process itself. As a consequence of such data processing paradigm, much of the rich relationships that can be present among data generated in automated equipment during a highly technical process can be unnoticed unless a specific analysis is designed and focused on a specific type of relationship. More importantly, emergent phenomena that can originate from multiple correlations among disparate data generated by disparate units in the equipment, and that can determine optimal performance of a complex automated tool or machine, can remain unnoticed.

In addition, the various correlations among data and variables associated with a process performed in a machine can deliver substantial information related to the actual operational performance of a set of tools or machines. It should be appreciated that specific calibration correlations can develop during synthetic operation of the set of tools, and disparate production correlations can develop as a result of the operation in production mode. The disparity in the correlations can arise from evolution or adjustment of a tool (e.g., wear and tear, fault(s) in operation like utilization of an instrument outside prescribed conditions, etc.). Conventional systems and approaches that monitor performance of one or more instruments in a process typically utilize data that fails to capture and exploit such production correlations.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An autonomous biologically based learning tool system and a method that the tool system employs for learning and analysis of performance degradation and mismatch are provided. The autonomous biologically based learning tool system includes (i) one or more tool systems that are either individual systems or hierarchically deployed group and conglomerated systems, which perform a specific task, e.g., a semiconductor manufacturing task, or process, such as oxide etching or ion implantation, and generates data that reflects the process and a tool performance, (ii) an interaction manager that receives data and packages the data for further utilization, and (iii) an autonomous learning system based on biological principles of learning; the learning implemented through spread activation of concepts in a set of semantic networks. The autonomous learning system comprises a functional structure that can be defined recursively from a group of three functional blocks: a memory platform, a processing platform, and a knowledge communication network, through which information is communicated among the memory and processing platforms, as well as the tool system and an external actor (e.g., a computer or a human agent). Memory platform includes a hierarchy of memories, including an episodic memory to receive data impressions and associated learning instructions, a short term memory that is employed for knowledge development, and a long term memory that stores knowledge, casting the knowledge into semantic networks. Functional units in the processing platform operate on the information stored in the memory platform, facilitating learning. Such building blocks and associated functionality are inspired by the biological structure and behavior of the human brain.

Learning is accomplished through concept activation in the defined semantic networks, with activation thresholds dictated through combination of priorities associated with each concept. Priorities depend on the type of concept that is manipulated; namely, a procedural concept possesses a priority based on activation and inhibition energies. Learning proceed through production or synthetic data associated with tool process(es) that generate one or more assets (e.g., semiconductor wafer, lithographically etched electronic circuitry, advanced thin-film devices for light and heat management, and so forth). Generated knowledge is cast as a mathematical relationship among a selected specific target, or reference, variable and set of selected influencing variables. Various approaches are employed for variable, and parameter, selection: (1) Universal selection. Substantially all variables other than a reference variable are adopted as influencing variables. (2) Semi-universal selection. Once a target or reference variable is selected, substantially all variables that can affects to substantially any degree the target variable are selected as influencing variables. (3) Knowledge based selection. Variables related through theory and simulation with a target variable are selected as influencing variables. (4) Empirical selection. Variables that exceed specific thresholds for correlation coefficients or substantially any other statistical metric are selected as influencing variables. (5) Actor-driven selection.

Mathematical relationships among reference variables and influencing variables facilitate assessment of performance degradation for a tool, or performance mismatch among a reference tool and a deployed production tool. Performance degradation can be evaluated through key performance indicators (KPIs) determined by an actor (e.g., a human operator, or an intelligent machine) that operates or configures analyzed set of tools. Evaluation of performance degradation and identification thereof also can be performed autonomously through an initial input, e.g., a set of reference KPIs, provided by an actor. Alternatively, or in addition, performance degradation can be determined by an actor through analysis and inspection of a set of predetermined KPIs.

To the accomplishment of the foregoing and related ends, the following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION OF THE DRAWINGS

Figure 17:
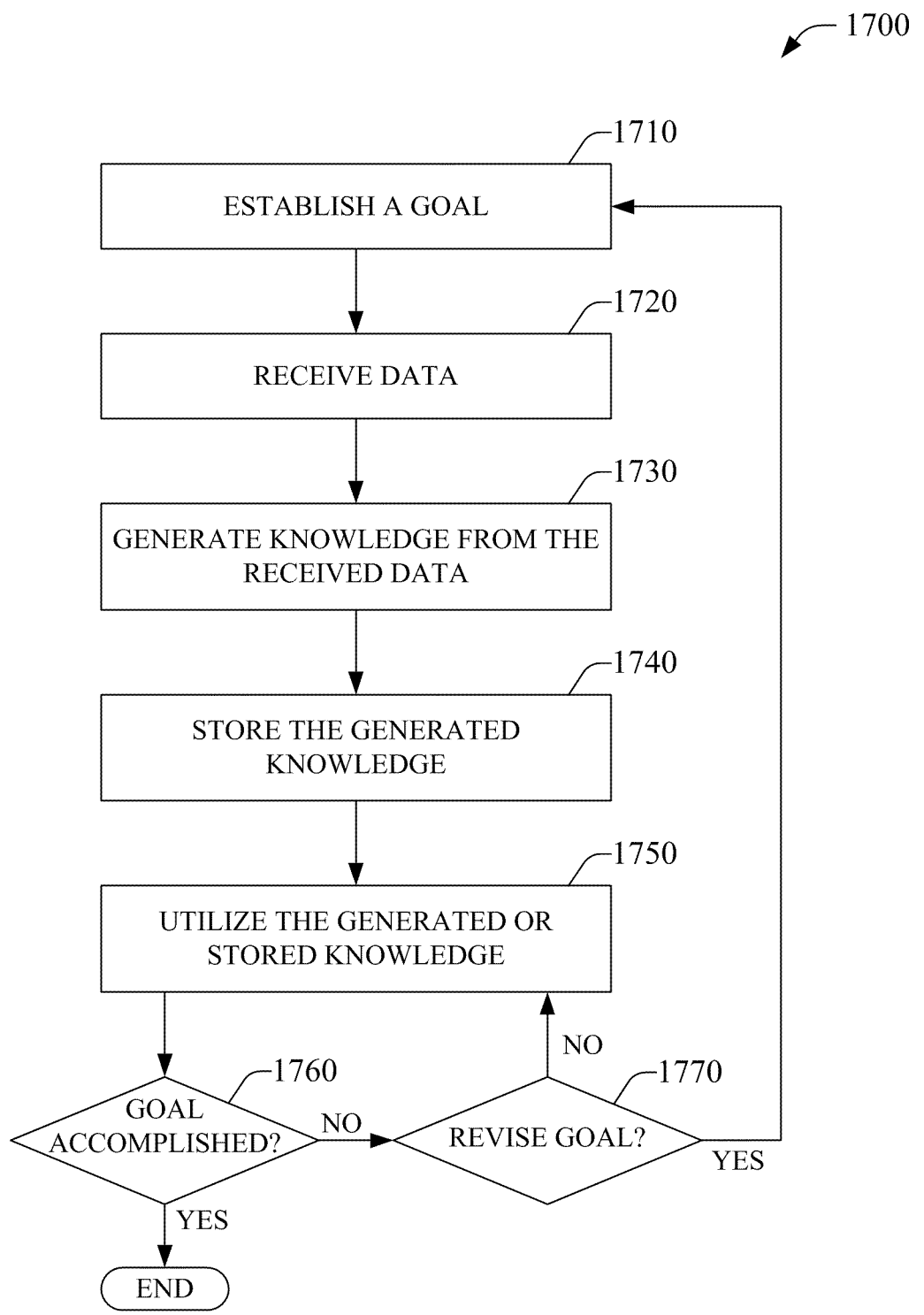

FIG. 17 presents a flowchart of an example method for biologically based autonomous learning according to aspects described herein.

Figure 18:
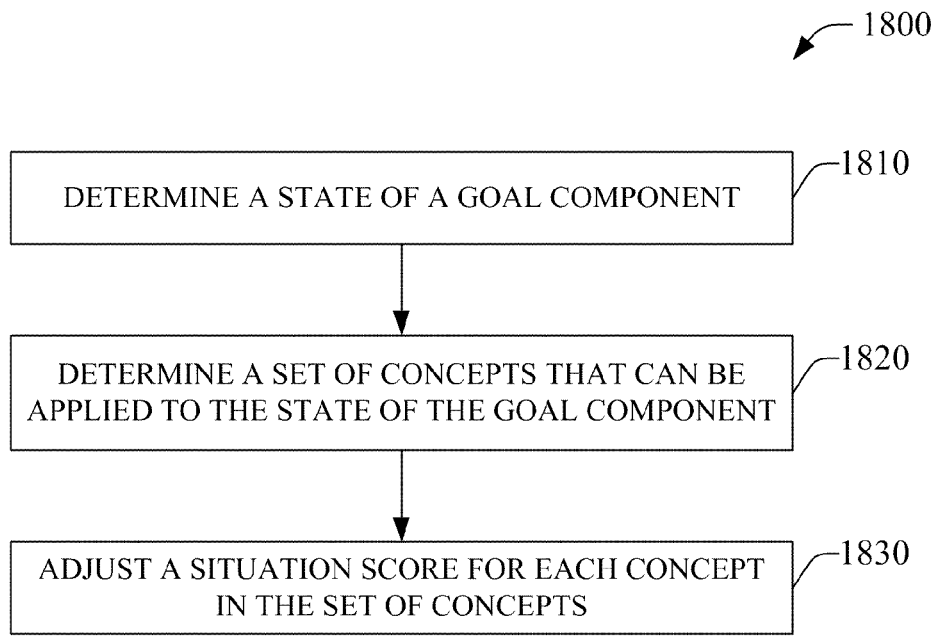

FIG. 18 presents a flowchart of an example method for adjusting a situation score of a concept according to an aspect described in the subject specification.

Figure 19:
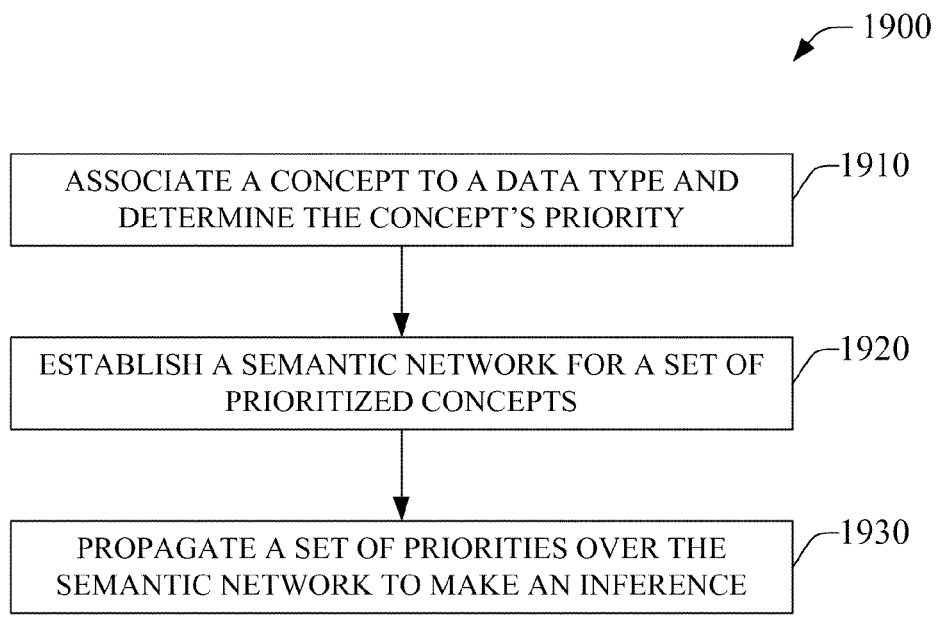

FIG. 19 presents a flowchart of an example method for generating knowledge in accordance with an aspect set forth herein.

Figure 20:
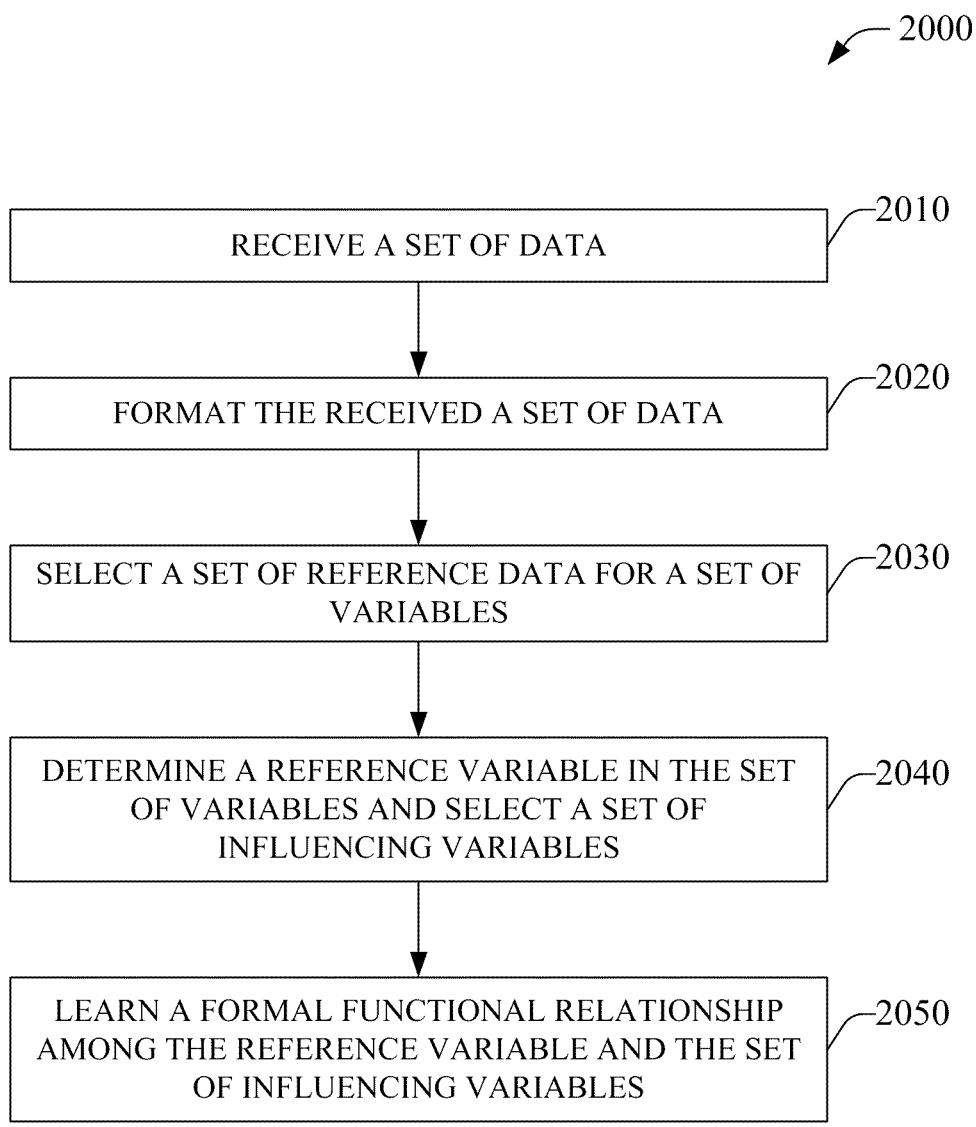

FIG. 20 presents a flowchart of an example method for learning a relationship among a set of variables associated with production data generated by one or more tools according to aspects described herein.

Figure 21:
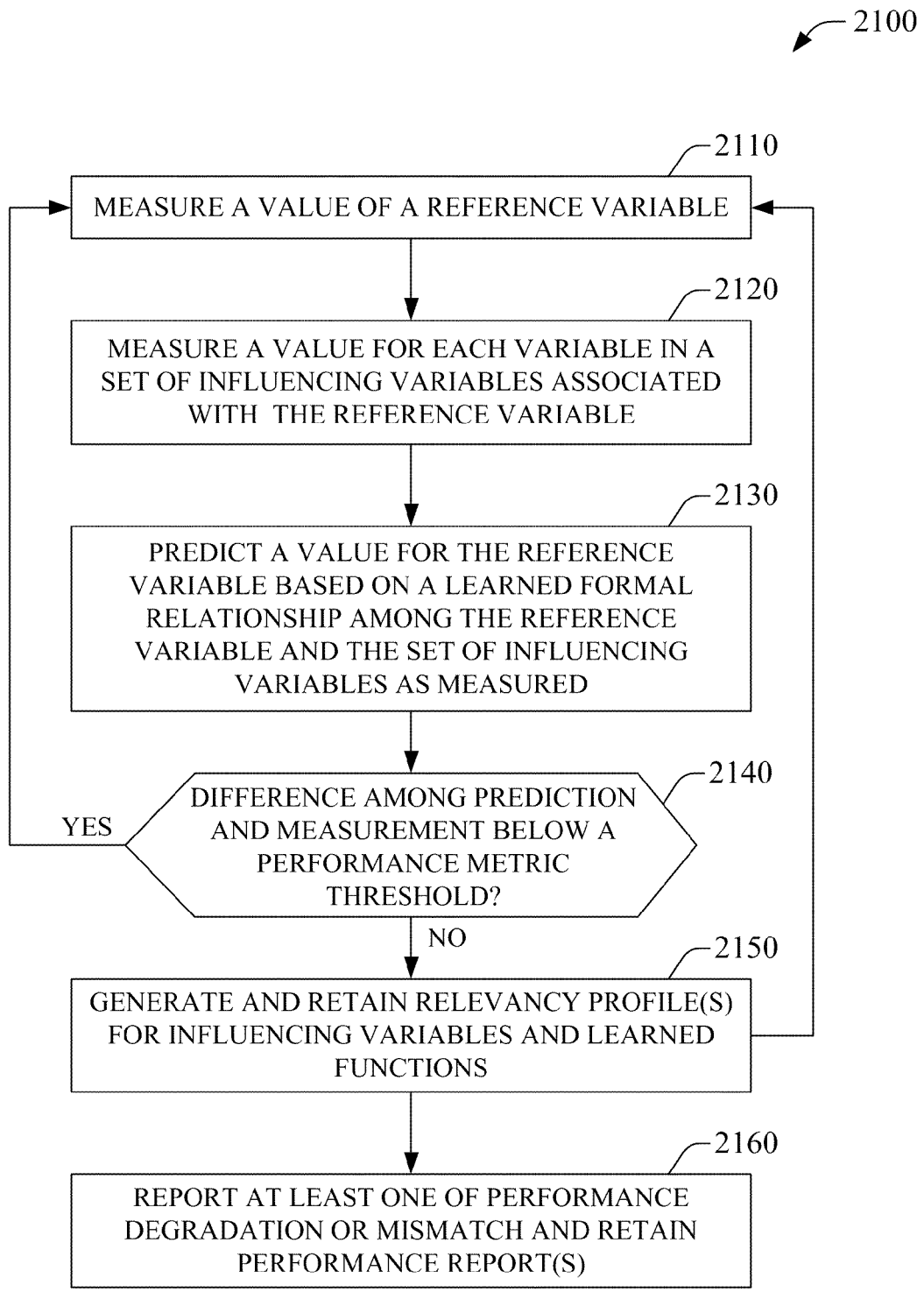

FIG. 21 presents a flowchart of an example method for establishing a performance degradation or mismatch of one or more tools according to aspects described herein.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification, the terms "object," "module," "interface," "component," "system," "platform," "engine," "selector," "unit," "store," "network" and the like are intended to refer to a computer-related entity or an entity related to an operational machine or apparatus with a specific functionality, the entity can be either hardware, a combination of hardware and firmware, firmware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
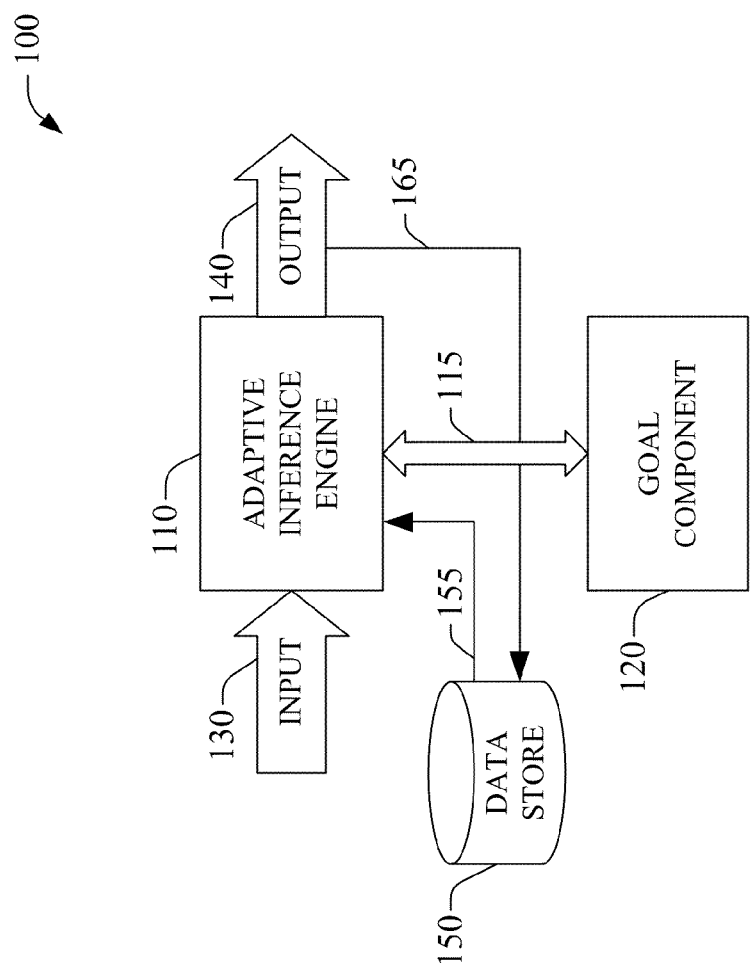
FIG. 1 illustrates a high level block diagram of an autonomous biologically based learning tool.

Referring to the drawings, FIG. 1 illustrates an example autonomous biologically based learning system 100. An adaptive inference engine 110 is coupled to a goal component 120. A wired or wireless communication link 115 couples such components. For a specific goal established or pursued by goal component 120, adaptive inference component 110 receives an input 130 that can be employed to accomplish the goal and conveys output 140 that can represent or record aspects of the pursued or accomplished goal. In addition, adaptive inference engine 110 can receive data from a data store 150 through link 155, and can store data or information in such data store, e.g., stored information can be a portion of output 140 that is conveyed through a wired or wireless link 165. It should be appreciated that (i) input 130, output 140, and data in data store 150 (as well as the history of input, output, and data in the data store) comprise a context for the operation of adaptive inference engine 110, and (ii) a feedback of that context into the engine via links 115, 155, and 165 facilitates adaptation based on context. In particular, goal component 120 can exploit feed back context to adapt a specific, initial goal and thus establish and pursue the adapted goal.

Input 130 can be regarded as extrinsic data or information, which can include (1) sounds, e.g., voice commands, environment noises or voices, alarms; (2) images captured by a static or mobile earth-based camera, or an airborne (e.g., plane, satellite) camera, wherein cameras can operate in multiple intervals of the radiation spectrum; (3) biometric indicators; (4) tokens such as batches of manufactured products, samples of materials; data which can include instructions, records, results of measurements; and so on. Output 140 can be substantially the same in nature as input 130, and it can be regarded as intrinsic data. Input and output 140 can be received and conveyed, respectively, by input and output interfaces, e.g., cameras, input pads, media docks (e.g., universal serial bus (USB) ports, infrared (IR) wireless inputs), that can reside in adaptive inference component 110. As indicated above, input 130 and output 140 can be a portion of a context for adaptive inference engine 110. Additionally, adaptive inference component 110 can request input 130 as a result of pursuing a goal.

Components in autonomous biologically based system 100 can be defined recursively, which can confer the autonomous system 100 a substantial degree of competent learning complexity with basic elementary components.

Each link 115, 155, or 165 can include a communication interface that can facilitate manipulation of data or information to be transmitted or received; can utilize databases for data storage and data mining; and can receive and convey information from and to an actor. Wired embodiments of links 115, 155, or 165 can include a twisted-pair line, a T1/E1 phone line, an AC line, an optical fiber line, and corresponding circuitry, whereas wireless embodiments can comprise an ultra-mobile wide band link, a long-term evolution link, or an IEEE 802.11 link, and associated electronics. Regarding data store 150, although it is illustrated as a single element, it can be a distributed data warehouse, wherein set of data memories are deployed in disparate physical or logical locations In example system 100, the adaptive inference engine 110 and the goal component 320 are illustrated as separate components, however, it should be appreciated that one of such components can reside within the other.

Goal component 120 can belong to one or more disciplines (e.g., a scientific discipline, a commercial discipline, an artistic discipline, a cultural discipline, and so on) or enterprise sectors (e.g., a market sector, an industry sector, a research sector, energy sector, public policy sector, and so on). Additionally, as goals can typically be multidisciplinary and focus on multiple markets, a goal component can establish multiple disparate goals within one or more particular disciplines or sectors. To pursue a goal, a goal component can comprise a functional component and a monitor component. Specific operations to accomplish a goal are effected through the functional component(s), whereas conditions of variables related to the accomplishment of the goal are determined by the monitor component. Additionally, the functional component(s) can determine a space of goals that can be accomplished by the goal component 120. A space of goals comprises substantially all goals that can be attained with a specific functionality. It should be appreciated that, for such specific functionality afforded by a functional component, a contextual adaptation of a specific goal can adapt a first goal to a second goal within a space of goals. An initial goal within a space of goals can be determined by one or more actors; wherein an actor can be a machine or a human agent (e.g., an end user). It should be noted that an initial goal can be a generic, high-level objective, as the adaptation inference engine 110 can drive goal component 120 towards a complex detailed objective through goal drifting. Goals, goal components and goal adaptation are illustrated next.

In example system 100, one or more processors (not shown) configured to confer, and that confer, at least in part, the described functionality of the various components can be included. To confer such functionality, the one or more processors (not shown) can exploit links 155, 115, and 165 for data or any other information exchange. The one or more processors (not shown) can execute code instructions (not shown) stored in data storage 150, or a memory component or element therein, to provide the described functionality of example system 100 and component therein.

Figure 2:
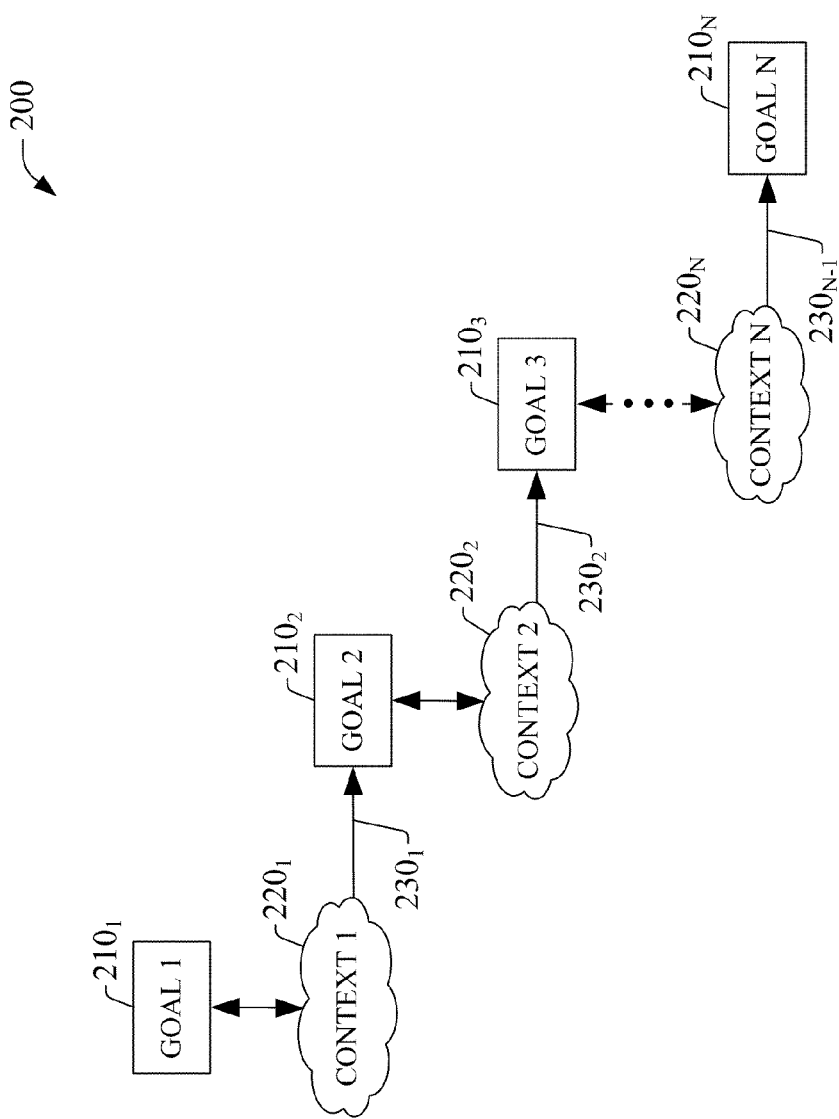
FIG. 2 is a diagram that delineates contextual goal adaptation according to aspects described herein.

FIG. 2 is a diagram 200 that delineates contextual goal adaptation. A goal (e.g., goal $210_1$, or goal $210_3$) can typically be an abstraction that is associated with the functionality of a goal component (e.g., component 120). A goal can be a high level abstraction: "Save for retirement," "secure a profit," "be entertained," "learn to cook," "to travel to a locale," "develop a database," "manufacture a product," and so on. Additionally, goals can be more specific refinements such as "save to retire early with an annual income in the range of $60,000-$80,000," "travel from the United States to Japan in low season, with travel costs including housing not to exceed $5000," or "reach a job interview site to deliver a 35 minute presentation to a group of associates of the prospective employer." Furthermore, a goal (e.g., $210_1$) possesses an associated context (e.g., $220_1$). As indicated above, goal component 120 coupled to adaptive inference engine 110 generally is compatible with an established goal (e.g., goal $210_1$, or goal $210_3$). For instance, the goal "manufacture a product" (e.g., goal $210_1$) can rely on a manufacturing tool system such as a molecular beam epitaxy reactor (an example goal component 120) that adopts standard or custom specifications to manufacture the product. During the accomplishment of such a goal (e.g., goal $210_1$), output 140 can include the manufactured product. In addition, an adaptive inference component (e.g., component 110) can adapt (e.g., adaptation $230_1$) the "manufacture a product" goal (e.g., goal $210_1$) based on context (e.g., context $220_1$) like the one that can be generated by tool system specifications or data gathered by a monitor component in the goal component. In particular, the initial high-level goal (e.g., goal $210_1$) can be adapted to "manufacture a semiconductor device" (e.g., goal $210_2$). As indicated above, a goal component 120 can be composed of multiple functional components in order to accomplish a goal. Additionally, goal component 120 can be modular, wherein goal sub-component can be incorporated as a goal is adapted. As an example, a goal component that pursues the "manufacture a product" goal can comprise a multi-market evaluation and forecast component that is coupled to a massively parallel, intelligent computing platform which can analyze market conditions in various markets in order to adapt (e.g., $230_1$) the goal to "manufacture a multicore-processor that utilizes molecular electronics components" (e.g., goal $210_N$). It should be noted that such an adaptation can involve a number of intermediate adaptations $230_1$-$230_{N-1}$, as well as intermediate adapted goals $210_2$-$210_{N-1}$ wherein intermediated adaptation is based on intermediate contexts $220_2$-$220_N$ generated from a previously pursued goals.

In another illustration of goal, goal component and goal adaptation, a goal can be to "purchase a DVD of movie A at store B," the goal component 120 can be a vehicle with a navigation system that comprises an adaptive inference engine 110. (It should be noted that in this illustration the adaptive inference engine 110 resides in the goal component 120.) An actor (e.g., a vehicle operator) can enter or select the location of store B and goal component can generate directions to accomplish the goal. In the instance that the adaptive inference engine 110 receives input 130 that store B has ceased to carry in inventory movie A (e.g., an RFID reader has updated an inventory database and an update message has been broadcasted to component 110) while the actor is traveling to the store, adaptive inference engine 110 can (i) request additional input 330 to identify a store C with movie A in stock, (ii) evaluate the resources available to the actor to reach store C, and (iii) assess the level of interest of the actor in accomplishing the goal. Based on the modified context developed through input 130 as illustrated in (i)-(iii), goal component can receive an indication to adapt the goal "to purchase a DVD of movie A at store C."

It should be appreciated that adaptive inference engine 110 can establish sub-goals associated with a goal determined by goal component 120. A sub-goal can facilitate accomplishing the goal by enabling adaptive inference engine to accomplish complementary task or to learn concepts associated with the goal.

As a summary, autonomous biologically based system 100 is a goal-driven system with contextual goal-adaptation. It should be appreciated that goal adaptation based on received context introduces an additional layer of adaptation to the analysis of input information to generate actionable information output 140. The capabilities of (a) adapting the process of information or data analysis and (b) adapting an initial goal based on context render the system massively adaptive or autonomous.

Figure 3:
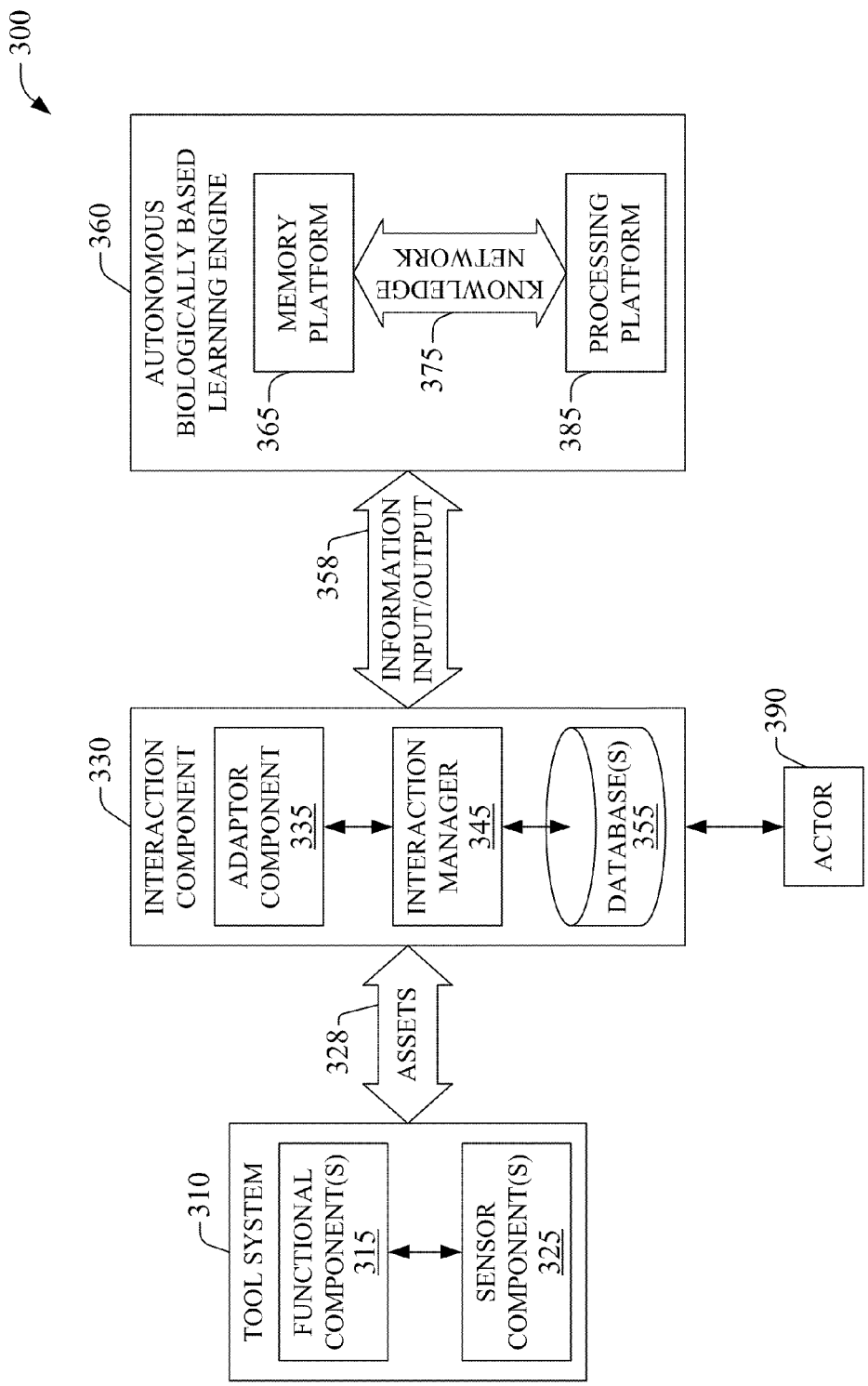
FIG. 3 illustrates a high level block diagram of an example autonomous biologically based learning tool.

FIG. 3 illustrates a high level block diagram of an example autonomous biologically based learning tool 300. In embodiment 300, the autonomous learning system includes a tool system 310 that comprises a functional component 315 which confers the tool system its specific functionality and can comprise a single functional tool component or a collection of substantially identical or diverse functional tool components, and a sensor component 325 that can probe several observable magnitudes related to a process performed by the tool, like a thermal treatment of a semiconductor wafer, and generates assets 328 associated with the process. Assets can include devices of varying degrees of complexity; for instance, assets 328 can include plasma-discharge based flat panel display(s) (FPD(s)), organic light emitting diode (OLED)-based FPD(s), liquid crystal display (LCD)-based FPD(s), or elements thereof such as for example thin-film-transistor active matrix array, color filters, polarizers, etc. Collected assets 328, which include data assets such as production process data or test run data, can be conveyed to an interaction component 330 which includes an adaptor component 335 that can serve as an interface to receive assets 328, an interaction manager 345 which can process the received assets 328, and database(s) 355 that can store the received and processed data. Data assets 328 can be conveyed to interaction component 330 in accordance with various communication protocols such as SECS (Semiconductor Equipment and Materials International Equipment Communication Standards)/GEM (Generic Equipment Model), hypertext transfer protocol (HTTP), etc. Interaction component 330 facilitates interaction of tool system 310 with autonomous biologically based learning engine 360. Information associated with the data generated in the process performed by tool system 310 which can be received and incrementally supplied to autonomous learning system 360.

Autonomous biologically based learning engine 360 includes a memory platform 365 that stores received information 358 (e.g., data, variables and associated relationships, causal graphs, templates, and so on) which can be communicated via a knowledge network 375 to a processing platform 385 that can operate on the received information, and can communicate back a processed information through the knowledge network 375 to the memory platform 365. The constituent components of autonomous learning system 360 can generally resemble biological aspects of the brain, in which a memory is networked with processing components to manipulate information and generate knowledge. Additionally, knowledge network 375 can receive information from, and convey information to, interaction component 330, which can communicate the information to tool system 310, or an actor 390 via interaction manager 345. As information 358 is received, stored, processed and conveyed by the autonomous learning system 360, multiple improvements can be effected in tool system 310 and actors that rely on it. Namely, improvements include (a) the autonomous learning system 360 and tool system 310 become increasingly independent as time progresses, and require lesser actor intervention (e.g., human direction and supervision), (b) the autonomous system improves the quality of its outputs to actors (for example, better identification of root causes of failures, or prediction of system failure before occurrence thereof), and (c) the autonomous learning system 360 improves its performance over time—the autonomous system 360 delivers improved results at a faster rate and with fewer resources consumed.

Memory platform 365 comprises a hierarchy of functional memory components, which can be configured to store knowledge (e.g., information 358) received during initialization or configuration of tool system 310 (e.g., a priori knowledge). A priori knowledge can be conveyed as information input 358 through the interaction component 330. In addition, memory platform 365 can store (a) training data (e.g., information input 358) employed to train the autonomous learning system 360 after initialization/configuration of tool system 310, and (b) knowledge generated by the autonomous learning system 360; the knowledge can be conveyed to tool system 310 or actor 390 through interaction component 330, via interaction manager 345.

Information input 358 (e.g., data) supplied by an actor 390, e.g., a human agent, can comprise data identifying a variable associated with a process, a relationship between two or more variables, a causal graph (e.g., a dependency graph), or an episode information. Such information can facilitate to guide the autonomous biologically based system 360 in a learning process. Additionally, in one aspect, such information input 358 can be deemed important by actor 390, and the importance can be related to the relevance of the information to a specific process performed by tool system 310. For instance, an operator (e.g., actor 390 is a human agent) of an oxide etch system can determine that etch rate is critical to the outcome of the manufacturing process; thus, etch rate can be an attribute communicated to autonomous learning system 360. In another aspect, information input 358 supplied by actor 390 can be a hint, whereby an indication to learn a particular relationship among process variables is made. As an example, hint can convey a suggestion to learn the behavior of pressure in a deposition chamber in tool system 310, within a specific deposition step, as a function of chamber volume, exhaust pressure and incoming gas flow. As another example, a hint can indicate to learn a detailed temporal relationship for a chamber pressure. Such example hints can activate one or more functional processing units in the autonomous learning system that can learn the functional dependence of pressure on multiple process variables. Moreover, such hints can activate one or more functional units that can apply and compare a learnt functionality with respect to model or empirical functionalities available to actor 390.

A tool system 310, e.g., a semiconductor manufacturing tool such as a plasma-enhanced vapor deposition (PECVD) system, a sputter system, or a metalorganic chemical vapor deposition (MOCVD) system, can be complex and therefore disparate actors can specialize in manipulating and operating the tool system through disparate types of specific, complete or incomplete knowledge. As an example, a human agent, e.g., a tool engineer can know that different gases have different molecular weight and thus can produce different pressures, whereas a process/tool engineer can know how to convert a pressure reading resulting from a first gas to an equivalent pressure resulting from a second gas; an elementary example of such knowledge can be to convert a pressure reading from a unit (e.g., Pa) to another (e.g., lb/in$^2$, or PSI). An additional type of general, more complex knowledge present in the autonomous biologically based learning system can be functional relationships between properties of a tool system (e.g., volume of a chamber) and measurements performed in the tool system (e.g., measured pressure in the chamber). For example, etch-engineers know that the etch rate is dependent on the temperature in the etch chamber. To allow for the diversity of knowledge and the fact that such knowledge can be incomplete, an actor (e.g., a human agent such as an end-user) can guide an autonomous learning system 360 through multiple degrees of conveyed knowledge: (i) No knowledge specified. Actor delivers no guidance for the autonomous learning system. (ii) Basic knowledge. Actor can convey a valid relationship between properties of a tool system and measurements in the tool system; for instance, actor conveys a relationship (e.g., relationship ($\kappa_E$, T)) between an etch rate ($\kappa_E$) and process temperature (T) without further detail. (iii) Basic knowledge with identified output. Further to a relationship between a tool system property and a tool system measurement, actor can provide specific output for a dependent variable in a relationship (e.g., relationship (output ($\kappa_E$), T). (iv) Partial knowledge about a relationship. Actor knows the structure of a mathematical equation among a tool system property and a measurement, as well as relevant dependent and independent variables (e.g., $\kappa_E = k_1 e^{-k2/T}$ without concrete values for $k_1$ or $k_2$). The actor, however, can fail to know a precise value of one for more associated constants of the relationship. (v) Complete knowledge. Actor possesses a complete mathematical description of a functional relationship. It should be noted that such guidance can be incrementally provided over time, as the autonomous learning system 360 evolves and attempts to learn tool functional relationships autonomously.

Knowledge network 375 is a knowledge bus that communicates information (e.g., data) or transfers power according to an established priority. The priority can be established by a pair of information source and information destination components or platforms; for instance, communication from awareness working memory 710 to awareness knowledge memory 730 can be assigned a higher priority than communication from conceptualization knowledge memory 910 to conceptualization working memory 940. Moreover, communication from source to destination can occur within a global functional component like self-awareness component 550, e.g., intra-communication, or communication enabled by network component 375 can occur between self-awareness component 550 and self-optimization component 570, e.g., inter-communication. Additionally, priority can be based on the information being transmitted (e.g., a specific information must be dispatched in real-time); it should be appreciated that communication priority determines at least in part a degree of communication urgency for transmitted or received communications. It should be noted that priorities can be dynamic instead of static and change as a function of learning development in the autonomous learning system 360, and in view of one or more demands in the one or more components present in the autonomous biologically based learning tool 300—e.g., a problem situation can be recognized and a communication can be warranted and effected in response. Communication, and power transfer, via knowledge network 375 can be effected over a wired link (e.g., a twisted pair link, a T1/E1 phone line, an AC line, an optical fiber line, a coaxial cable) and related protocols such as internet protocol (IP) packet-based communication, or a wireless link (e.g., Ultra Mobile Broadband (UMB), Long Term Evolution (LTE), IEEE 802.11), and can occur among components (not shown) within a functional platform (e.g., memory platform 365 and processing platform 385) or among components in disparate platforms (e.g., a component in memory platform of self-awareness communicating with another sub-component of self-awareness) or the communication can be between components (e.g., a component of awareness communicates with a component in conceptualization).

Processing platform 385 comprises functional processing units that operate on information: Input information of a specific type (e.g., specific data types such as a number, a sequence, a time sequence, a function, a class, a causal graph, and so on) is received or retrieved and a computation is performed by a processing unit to generate output information of a specific type. Output information can be conveyed to one or more components in memory platform 365 via knowledge network 375. In an aspect, the functional processing units can read and modify data structures, or data type instance, stored in memory platform 335, and can deposit new data structures therein. In another aspect, functional processing units can provide adjustments to various numeric attributes like suitability, importance, activation/inhibition energy, and communication priority. Each functional processing unit has a dynamic priority, which determines a hierarchy for operating on information; higher priority units operate on data earlier than lower priority units. In case a functional processing unit that has operated on specific information fails to generate new knowledge (e.g., learn), like generating a ranking number or ranking function that distinguishes a bad run from a good run associated with operation of a tool system 310, the priority associated with the functional processing unit can be lowered. Conversely, if new knowledge is generated, the processing unit's priority is increased.

It should be appreciated that processing platform 385, through prioritized functional processing units, emulates a human tendency to attempt a first operation in a specific situation (e.g., a specific data type), if the operation generates new knowledge, the operation is exploited in a subsequent substantially identical situation. Conversely, when the first operation fails to produce new knowledge, a tendency to employ the first operation to handle the situation is reduced and a second operation is utilized (e.g., spread activation). If the second operation fails to generate new knowledge, its priority is reduced, and a third operation is employed. Processing platform 385 continues to employ an operation until new knowledge is generated, and another operation(s) acquire higher priority.

In an aspect, actor 390 can provide process recipe parameters, instructions (e.g., a temperature profile for an annealing cycle of an ion implanted wafer, a shutter open/close sequence in a vapor deposition of a semiconductor, an energy of an ion beam in an ion implantation process, or an electric field magnitude in a sputtering deposition), as well as initialization parameters for the autonomous learning system 360. In another aspect, an actor can supply data associated with maintenance of tool system 310. In yet another aspect, actor 390 can generate and provide results of a computer simulation of the process performed by tool system 310. Results generated in such a simulation can be employed as training data to train the autonomous biologically based learning system. Additionally, a simulation or an end-user can deliver optimization data associated with a process to tool system 370.

Autonomous learning system 360 can be trained through one or more training cycles, each training cycle can be utilized to develop the autonomous biologically based learning tool 300 to (i) be able to perform a larger number of functions without external intervention; (ii) provide better response such as improved accuracy, or correctness, when diagnosing root cause of manufacturing system health root causes; and (iii) increase performance such as faster response time, reduced memory consumption, or improved quality of product. Training data can be supplied to the autonomous learning system via adaptor component 335, in case training data is collected from data 328 associated with a process calibration or standard run in tool system 310—such data can be deemed to be internal—or through interaction manager 345. When training data is retrieved from database(s) 365 (e.g., data related to external measurements conducted through an external probe, or records of repair intervention in tool system 310); such training data can be deemed external. When training data is supplied by an actor, data is conveyed through interaction manager 345 and can be deemed external. In an aspect of the subject innovation, a training cycle based on internal or external training data facilitates autonomous learning system 360 to learn an expected behavior of tool system 310.

As indicated above, functional component 315 can comprise multiple functional tool components (not shown) associated with the tool specific semiconductor manufacturing capabilities and that enable the tool to be used to (a) manufacture semiconductor substrates with various degrees of complexity (e.g., wafers, flat panel displays and related TFT active matrix array, liquid crystal displays (LCDs), OLEDs, and so forth), (b) conduct epitaxial vapor deposition or non-epitaxial vapor deposition, (c) facilitate ion implantation or gas cluster ion infusion, (d) perform a plasma or non-plasma (dry or wet) an oxide etch treatment, (e) implement a lithographic process (e.g., photo-lithography, e-beam lithography, etc.), and so on. The tool system 310 can also be embodied in a furnace; an exposure tool for operation in a controlled electrochemical environment; a planarization device; an electroplating system; a test device for optical, electrical, and thermal properties, which can included lifespan (through operation cycling) measurements; a metrology tool, a wafer cleaning machine, and the like.

In the process conducted by tool system 310, sensors and probes comprising sensor component 325 can collect data (e.g., data assets) on different physical properties (e.g., pressure, temperature, humidity, mass density, deposition rate, layer thickness, surface roughness, crystalline orientation, doping concentration, defect density, electro-photoluminescence yield, etc.) as well as mechanical properties (valve aperture or valve angle, shutter on/off operation, gas flux, substrate angular velocity, substrate orientation, and the like) through various transducers and techniques with varying degrees of complexity depending on the intended use of the gathered data. Such techniques can include, but are not limiting to including, X-ray diffraction, transmission electron microscopy (TEM), scanning electron microscopy (SEM), mass spectrometry, light-exposure assessment, magnetoelectric transport measurements, optical properties measurements, and so on. Additional data assets that are relevant to a product (e.g., a semiconductor substrate) are development inspection (DI) critical dimension (CD), and final inspection (FI) CI. It should be appreciated that probes can be external to tool system 310 and can be accessed through an interface component (not shown). For instance, such external probes can provide DI CI and FI CI. It should be appreciated that such data assets 328 effectively characterize output assets, or physical products manufactured or fabricated by tool system 310.

In an aspect, data sources in sensor component 325 can be coupled to adaptor component 335, which can be configured to gather data assets 328 in analog or digital form. Data assets 328 can be conveyed to adaptor component 335 in accordance with various communication protocols such as SECS/GEM protocol, HTTP, etc. Adaptor component 335 can facilitate data 368 collected in a process run to be composed or decomposed according to the intended utilization of the data in autonomous learning system 360 before the data is deposited into memory platform 365. Adaptors in adaptor component 335 can be associated with one or more sensors in sensor component 325 and can read the one or more sensors at specific frequencies, or in other specific conditions. An external data source adapter may have the ability to pull data as well as pass through data that is pushed from outside the tool. For example, an MES/historical database adaptor can consult an MES database to extract information and package/deposit the extracted data into working memory for one or more components of the autonomous learning system 360. Particularly, as an illustration, adaptor component 335 can gather wafer-level run data one wafer at a time as the tool processes the wafer. Then, adaptor component 335 can consolidate individual runs in a batch to form "lot-level-data," "maintenance-interval-data", etc. Alternatively, if tool system 310 outputs a single file (or computer product asset) for lot-level data, adaptor component 335 can extract wafer-level data, step-level data, and the like. Furthermore, decomposed data elements can relate to one or more components of tool system 300; e.g., variables during times at which a pressure controller in sensor component 325 is operating. Subsequent to processing, or packaging, received data 328 as described above, adaptor component 335 can store processed data in database(s) 355.

Database(s) 355 can include data originated in (i) tool system 310, through measurements performed by sensors in sensor component 325, (ii) a manufacturing execution system (MES) database or a historical database, or (iii) data generated in a computer simulation of tool system 310, e.g., a simulation of semiconductor wafer manufacturing performed by actor 390. In an aspect, an MES is a system that can measure and control a manufacturing process, can track equipment availability and status, can control inventory, and can monitor for alarms.

It is to be appreciated that products, or product assets, fabricated by tool system 310 can be conveyed to actor 390 through interaction component 330. It should be appreciated that product assets can be analyzed by actor 390 and the resulting information, or data assets, conveyed to autonomous learning system 360. In another aspect, interaction component 330 can perform analysis of a product asset 328 via adaptor component 335.

In addition it is to be noted that in embodiment 300 the interaction component 340 and autonomous learning system 360 are externally deployed with respect to tool system 310. Alternative deployment configurations of autonomous biologically based learning tool 300 can be realized, such as embedded deployment wherein interaction component 330 and autonomous biologically based learning system 310 can reside within tool system 310, in a single specific tool component; e.g., single embedded mode, or in a cluster of tool components; e.g., multiple embedded mode. Such deployment alternatives can be realized in a hierarchical manner, wherein an autonomous learning system supports a set of autonomous learning tools that form a group tool, or a tool conglomerate.

Next, an illustrative tool system 310 is discussed in connection with FIG. 4, and an example architecture for the autonomous biologically based learning engine 360 is presented and discussed in detail with respect to FIGS. 5-9.

Figure 4:
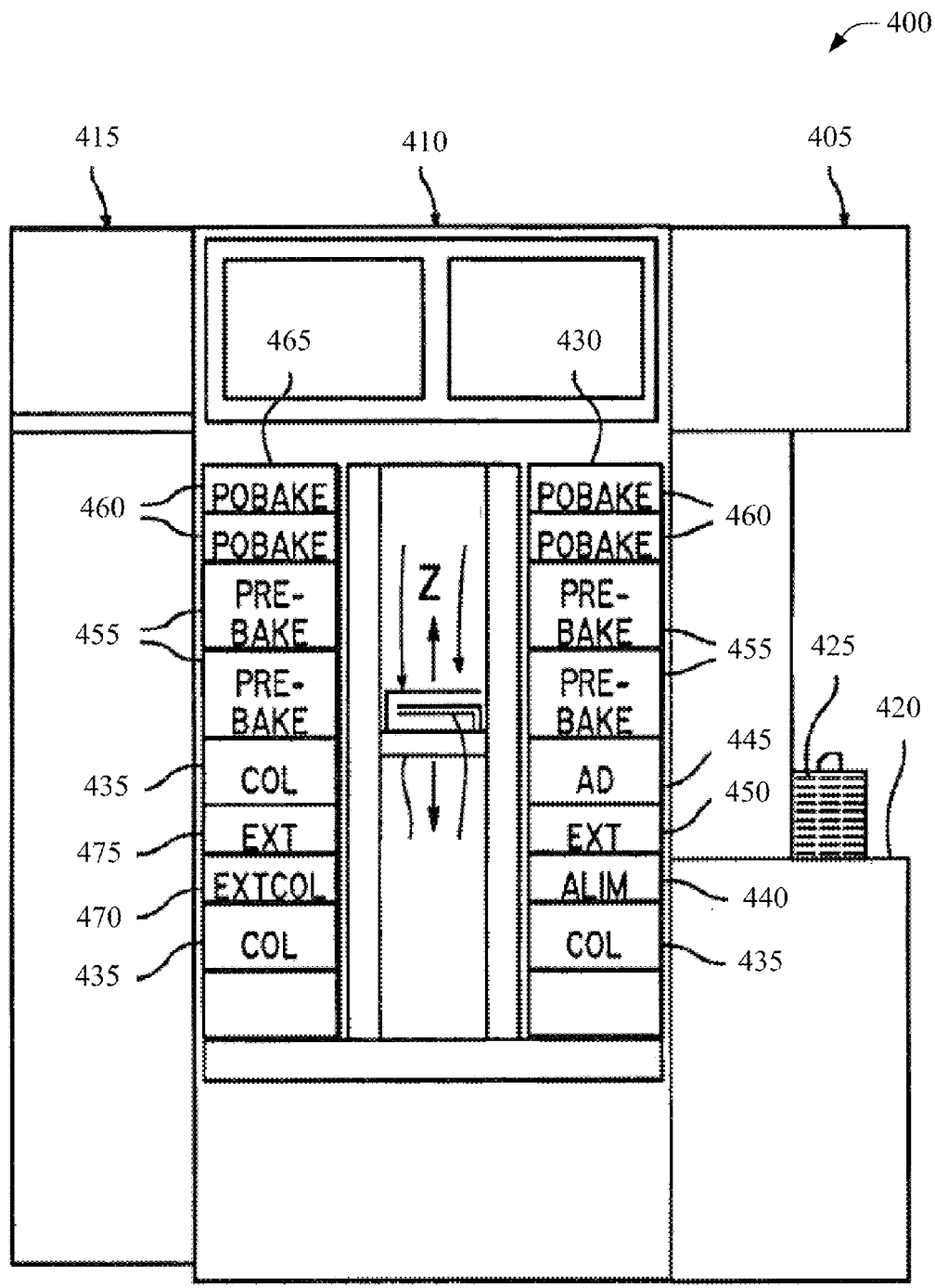
FIG. 4 is a diagram of an example tool system for semiconductor manufacturing that can exploit an autonomous biologically based learning system.

FIG. 4 is a diagram of an example semiconductor manufacturing system 400 that can exploit an autonomous biologically based learning engine 360 to monitor, analyze, and improve operation. In particular, example system 400 is a thermal development and coating system that illustrates a tool system 310 discussed above in connection with FIG. 3. The system 400 includes a load/unload section 405, a process section 410, and an interface section 415. In an aspect the load/unload section 405 has a cassette table 420 on which cassettes 425 each storing a plurality of semiconductor substrates are loaded into and unloaded from the system 400. It is noted that cassette table 420 can also enable loading/unloading of glass or plastic substrates for flat panel display manufacturing. The process section 410 has various single substrate processing units for processing substrates sequentially one by one. The interface section 415 can facilitate access to multiple probes and sensors for quality assurance, process development, in situ root cause analysis. Collected data (e.g., data 368) can be conveyed to the autonomous biologically based learning engine 360, through an interface component.

In an aspect, process unit 410 comprises a first process unit group 430 which possesses a cooling unit (COL) 435, an alignment unit (ALIM) 440, an adhesion unit (AD) 445, an extension unit (EXT) 450, two prebaking units (PREBAKE) 455, and two postbaking units (POBAKE) 460, which are stacked sequentially from the bottom. Additionally, a second process unit group 465 includes a cooling unit (COL) 435, an extension-cooling unit (EXTCOL) 470, an extension unit (EXT) 475, a second cooling unit (COL) 435, two prebaking units (PREBAKE) 455 and two postbaking units (POBAKE) 460. Cooling unit (COL) 435 and the extension cooling unit (EXTCOL) 470 may be operated at low processing temperatures and arranged at lower stages, and the prebaking unit (PREBAKE) 455, the postbaking unit (POBAKE) 460 and the adhesion unit (AD) 445 are operated at high temperatures and arranged at the upper stages. With this arrangement, thermal interference between units can be reduced. Alternatively, these units can have alternative or additional arrangements. The prebaking unit (PREBAKE) 455, the postbaking unit (POBAKE) 460, and the adhesion unit (AD) 445 each comprise a heat treatment apparatus in which substrates are heated to temperatures above room temperature. Postbaking units 460 can be utilized for curing photoresist materials employed for photolithographic masking for preparation of devices such as TFTs. In an aspect, temperature and pressure data can be supplied to the autonomous biologically based learning engine 360 through interface component 340, from prebaking unit 455, postbaking unit 460, and adhesion unit 445. Rotational speed and positional data for a substrate can be conveyed from alignment unit 440.

Figure 5:
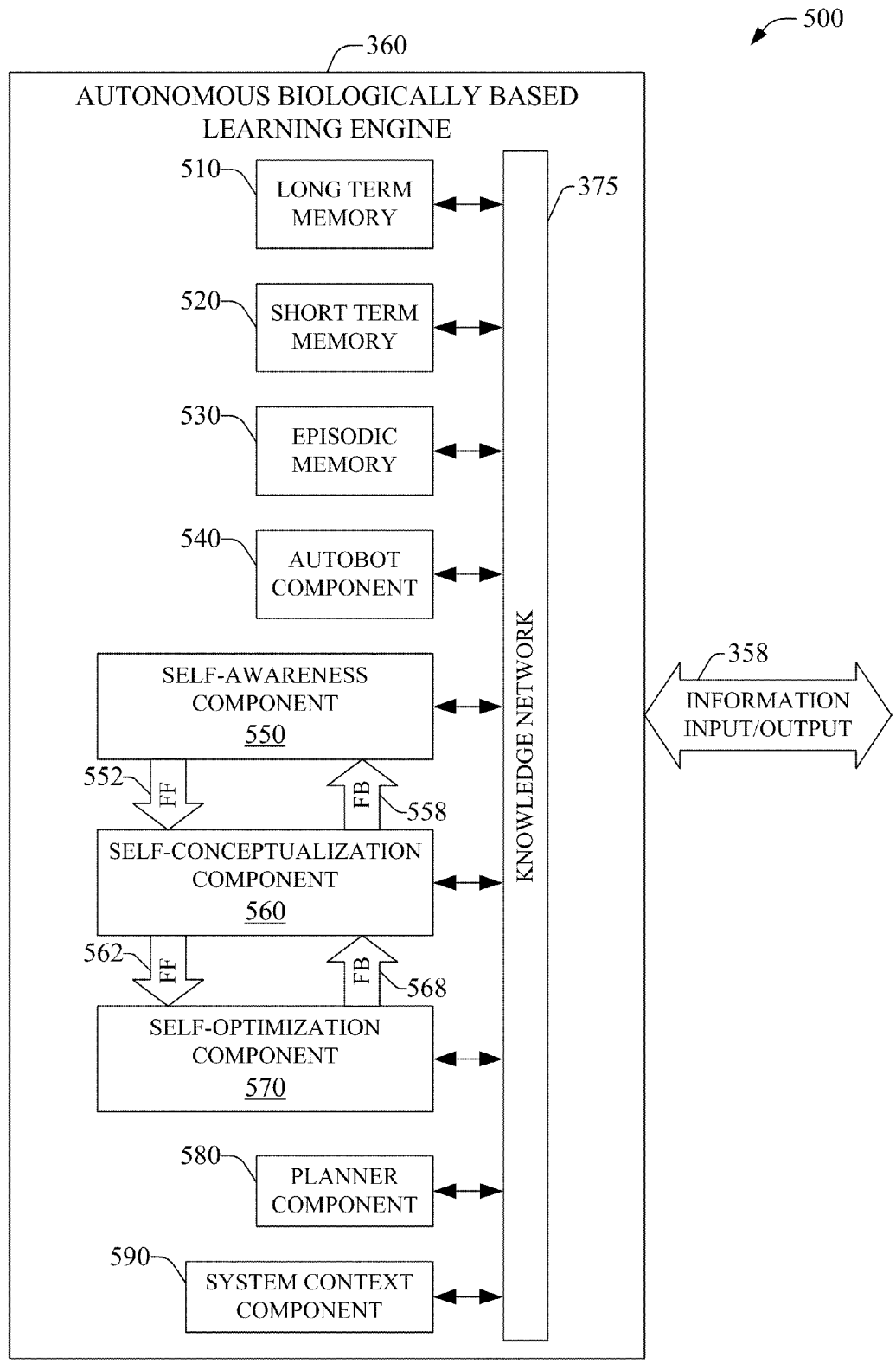
FIG. 5 illustrates a high level block diagram of example architecture of autonomous biologically based learning system.

FIG. 5 illustrates a high level block diagram of example architecture 500 of an autonomous biologically based learning engine. In embodiment 500, autonomous biologically based learning engine 360 comprises a hierarchy of functional memory components that include a long term memory (LTM) 510, a short term memory (STM) 520, and an episodic memory (EM) 530. Each of such functional memory components can communicate through knowledge network 375, which operates as described in discussed in connection with FIG. 3. In addition, autonomous biologically based learning engine 360 can include an autobot component 540 that includes functional processing units identified as autobots, which can include a processor, with substantially the same characteristics as those functional units described in connection with processing platform 385. It is to be noted that that autobot component 540 can be a part of processing platform 385.

Furthermore, autonomous learning system 360 can comprise one or more primary functional units which include a self-awareness component 550, a self-conceptualization component 560, and a self-optimizing component 570. A first feed forward (FF) loop 552 can act as a forward link and can communicate data among self-awareness component 550 and self-conceptualization 560. In addition, a first feed back (FB) loop 558 can act as a reverse link and can communicate data among self-conceptualization component 560 and self-awareness component 550. Similarly, forward link and reverse link data communication among self-conceptualization component 560 and self-optimization component 570 can be accomplished, respectively, through a second FF loop 562 and a second FB loop 568. It should be appreciated that in a FF link, data can be transformed prior to communication to the component that receives the data to further process it, whereas in a FB link a next data element can be transformed by the component that receives the data prior to process it. For example, data transferred through FF link 552 can be transformed by self awareness component 550 prior to communication of the data to self-conceptualizing component 560. It should further be appreciated that FF links 552 and 562 can facilitate indirect communication of data among components 550 and component 570, whereas FB links 568 and 558 can facilitate an indirect communication of data among components 570 and 550. Additionally, data can be conveyed directly among components 550, 360, and 370 through knowledge network 375.

Long term memory 510 can store knowledge supplied through interaction component 330 during initialization or configuration of a tool system (e.g., a priori knowledge) to train the autonomous learning tool system 300 after initialization/configuration. In addition, knowledge generated by autonomous learning system 360 can be stored in long term memory 510. It should be appreciated that LTM 510 can be a part of a memory platform 365 and thus can display substantially the same characteristics thereof. Long term memory 510 can generally comprise a knowledge base that contains information about tool system components (e.g., manufacturing components, probe components, and so on), relationships, and procedures. At least a portion of the knowledge base can be a semantic network that describes or classifies data types (for example as a sequence, an average, or a standard deviation), relationships among the data types, and procedures to transform a first set of data types into a second set of data types.

A knowledge base may contain knowledge elements, or concepts. In an aspect, each knowledge element can be associated with two numeric attributes: a suitability ($\xi$) and an inertia ($\iota$) of a knowledge element, or concept; collectively such attributes determine a priority of a concept. A well-defined function, e.g., a weighted sum, a geometric average, of these two numeric attributes can be a concept's situation score ($\sigma$). For example, $\sigma = \xi + \iota$. The suitability of a knowledge element can be defined as a relevance of the knowledge element (e.g., concept) to a tool system or a goal component situation at a specific time. In an aspect, a first element, or concept, with a higher suitability score than a second element can be more relevant to a current state of the autonomous learning system 360 and a current state of a tool system 310 than the second element with a lower suitability score. The inertia of a knowledge element, or concept, can be defined as the difficulty associated with utilization of the knowledge element. For example, a low first value of inertia can be conferred to a number element, a list of numbers can be attributed a second inertia value higher than the first value, a sequence of numbers can have a third value of inertia that is higher than the second value, and a matrix of numbers can have a fourth value of inertia which can be higher than the third value. It is noted that inertia can be applied to other knowledge or information structures like graphs, tables in a database, audio files, video frames, code snippets, code scripts, and so forth; the latter items can substantially all be a portion of input 130. The subject innovation provides for a well defined function of the suitability and the inertia that can influence the likelihood that a knowledge element is retrieved and applied. Concepts that have the highest situational score are the most likely concepts to be rendered to short term memory 520 for processing by processing units.

Short term memory 520 is a temporary storage that can be utilized as a working memory (e.g., a workspace or cache) or as a location where cooperating/competing operations, or autobots, associated with specific algorithms or procedures, can operate on data types. Data contained in STM 520 can possess one or more data structures. Such data structures in STM 520 can change as a result of data transformations effected by autobots and planner uiberbots (e.g., autobots dedicated to planning). The short term memory 305 can comprise data, learning instructions provided by the interaction manager 345, knowledge from the long term memory 310, data provided and/or generated by one or more autobots or überbots, and/or initialization/configuration commands provided by an actor 390. Short term memory 520 can track a state of one or more autobots and/or überbots used to transform data stored therein.

Episodic memory 530 stores episodes which can include an actor-identified set of parameters and concepts which can be associated with a process. In an aspect, an episode can comprise extrinsic data or input 130, and it can provide with a specific context to autonomous learning system 100. It is noted that an episode can generally be associated with a particular scenario identified or generated (e.g., by tool system 110, a goal component 120, or an autonomous learning system 160) while pursuing a goal. An actor that identifies an episode can be a human agent, like a process engineer, a tool engineer, a field support engineer, and so on, or it can be a machine. It should be appreciated that episodic memory 530 resembles a human episodic memory, wherein knowledge associated with particular scenario(s)—e.g., an episode—can be present and accessible without a recollection of the learning process that resulted in the episode. Introduction, or definition, of an episode typically is a part of a training cycle or substantially any extrinsic provision of input, and it can lead to an attempt by the autonomous biologically based learning system 360 to learn to characterize data patterns, or input patterns, that can be present in data associated with the episode. A characterized pattern of data associated with an episode can be stored in episodic memory 530 in conjunction with the episode and an episode's name. The addition of an episode to episodic memory 530 can result in a creation of an episode-specific autobot that can become active when a set of parameters in a process conducted by a tool system 310, or a generally a goal component 120, enter an operating range as defined in the episode; the episode-specific autobot receives sufficient activation energy when the first feature associated with a pursued goal or process is recognized. If the parameters meet the criteria established through a received episode, the episode-specific autobot compares the pattern of data in the episode with the current data available. If the current situation (as defined by the recognized pattern of data) of the tool system 310, or a goal component, matches the stored episode, an alarm is generated to ensure the tool maintenance engineers can become aware of the situation and can take preventive action(s) to mitigate additional damage to functional component 315 or sensor component 325 or material utilized in a tool process.

Autobot component 540 comprises a library of autobots that perform a specific operation on an input data type (e.g., a matrix, a vector, a sequence, and so on). In an aspect, autobots exist in an autobot semantic net, wherein each autobot can have an associated priority; a priority of an autobot is a function of its activation energy ($E_A$; e.g., $617_1$) and its inhibition energy ($E_I$; e.g., $619_1$). Autobot component 540 is an organized repository of autobots that can include autobots for the self-awareness component 550, self-conceptualization component 560, self-optimization component 570, and additional autobots that can participate in transforming and passing data among components and among the various memory units. Specific operations that can be performed by an autobot can include a sequence average; a sequence ordering; a scalar product among a first and a second vector; a multiplication of a first matrix and a second matrix; a time sequence derivative with respect to time; a sequence autocorrelation computation; a cross-correlation operation between a first and a second sequence; a decomposition of a function in a complete set of basis functions; a wavelet decomposition of a time sequence numeric data stream, or a Fourier decomposition of a time sequence. It should be appreciated that additional operations can be performed depending on input data; namely, feature extraction in an image, sound record, or biometric indicator, video frame compression, digitization of environment sounds or voice commands, and so on. Each of the operations performed by an autobot can be a named function that transforms one or more input data types to produce one or more output data types. Each function for which there exists an autobot in autobot component 540 can possess an element in LTM, so that überbots can make autobot activation/inhibition energy decisions based on the total "attention span" and needs of the autonomous learning system 360. Analogously to the autonomous learning system 360, an autobot in autobot component 540 can improve its performance over time. Improvements in an autobot can include better quality of produced results (e.g., outputs), better execution performance (e.g., shorter runtime, capability to perform larger computations, and the like), or enhanced scope of input domain for a particular autobot (e.g., inclusion of additional data types that the autobot can operate on).

Knowledge—concepts and data—stored in LTM 510, STM 520 and EM 530 can be employed by primary functional units, which confer autonomous biologically based learning system 360 a portion of its functionality.

Self-awareness component 550 can determine a level of tool system degradation between a first acceptable operating state of the tool system 310 and a subsequent state, at a later time, in which tool system has degraded. In an aspect, autonomous learning system 360 can receive data that characterizes an acceptable operating state, and data associated with a product asset fabricated in such acceptable state; such data assets can be identified as canonical data. Autonomous biologically based learning system 360 can process the canonical data and the associated results (e.g., statistics about important parameters, observed drift in one or more parameters, predictive functions relating tool parameters, and so on) can be stored by self-awareness component 550 and employed for comparison to data supplied as information input 358; e.g., production process data or test run data. If a difference between generated, learnt results of the canonical data and the device process run-data is small, then the manufacturing system degradation can be considered to be low. Alternatively, if the difference between stored learnt results of the canonical data and the sample process data is large, then there can be a significant level of tool system (e.g., semiconductor manufacturing system) degradation. A significant level of degradation can lead to a process, or goal, contextual adjustment. Degradation as described herein can be computed from a degradation vector $(Q_1, Q_2, \ldots, Q_U)$ where each component $Q_\lambda(\lambda=1, 2, \ldots, U)$ of the degradation vector is a different perspective of an available data set—e.g., $Q_1$ may be a multivariate mean, $Q_2$ the associated multivariate deviation, $Q_3$ a set of wavelet coefficients for a particular variable in a process step, $Q_4$ may be the mean difference between a predicted pressure and measured pressure, etc. Normal training runs produce a specific set of values (e.g., a training data asset) for each component, which can be compared with component $Q_1$-$Q_U$ generated with run data (e.g., a run data asset) from each component. To assess degradation, a suitable distance metric can be to employed to compare the (e.g., Euclidean) distance of a run degradation vector from its "normal position" in $\{Q\}$ space; the large such Euclidean distance, the more a tool system is said to be degraded. In addition, a second metric can be to compute a cosine similarity metric among the two vectors.

Self-conceptualization component 560 can be configured to build an understanding of important tool system 310 relationships (e.g., one or more tool behavior functions) and descriptions (e.g., statistics regarding requested and measured parameters, influence of parameters on degradation, etc.). It is to be appreciated that relationships and descriptions are also data, or soft, assets. The understanding is established autonomously (e.g., by inference and contextual goal adaptation originated from input data; inference can be accomplished, for example, via multivariate regression or evolutionary programming, such as genetic algorithms) by autonomous learning system 360, or through an actor 390 (e.g., a human agent) supplied guidance. Self-conceptualization component 560 can construct a functional description of a behavior of a single parameter of a tool system 310, or generally a goal component like component 120, such as pressure in a deposition chamber in a semiconductor manufacturing system as a function of time during a specific deposition step. In addition, self-conceptualization component 560 can learn a behavior associated with a tool system, like a functional relationship of a dependent variable on a specific set of input information 358. In an aspect, self-conceptualization component 560 can learn the behavior of pressure in a deposition chamber of a given volume, in the presence of a specific gas flow, a temperature, exhaust valve angle, time, and the like. Moreover, self-conceptualization component 560 can generate system relationships and properties that may be used for prediction purposes. Among learnt behaviors, self-conceptualization component can learn relationships and descriptions that characterize a normal state. Such normal state typically is employed by autonomous learning system 360 as a reference state with respect to which variation in observer tool behavior is compared.

Self-optimization component 570 can analyze a current health or performance of an autonomous biologically based learning system 300 based on the level of a tool system 310 deviation between predicted values (e.g., predictions based on functional dependence or relationships learnt by self-conceptualization component 560 and measured values) in order to identify (a) a potential cause of failure of tool system 360, or (b) one or more sources of root cause of the tool system degradation based on information gathered by autonomous learning system 360. Self-optimizing component 570 can learn over time whether autonomous learning system 360 initially incorrectly identifies an erroneous root cause for a failure, the learning system 300 allows for input of maintenance logs or user guidance to correctly identify an actual root cause. In an aspect, the autonomous learning system 360 updates a basis for its diagnosis utilizing Bayesian inference with learning to improve future diagnosis accuracy. Alternatively, optimization plans can be adapted, and such adapted plans can be stored in an optimization case history for subsequent retrieval, adoption, and execution. Moreover, a set of adaptations to a process conducted by tool system 310, or generally a goal pursued by a goal component 120, can be attained through the optimization plans. Self-optimization component 570 can exploit data feedback (e.g., loop effected through links 565, 555, and 515) in order to develop an adaptation plan that can promote process or goal optimization.

In embodiment 500, autonomous biologically based learning system 360 can further comprise a planner component 580 and a system context component 590. The hierarchy of functional memory components 510, 520, and 530, and the primary functional units 550, 560, and 570 can communicate with planner component 580 and the system context component 590 through knowledge network 375.

Planner component 580 can exploit, and comprise, higher level autobots in autobot component 540. Such autobots can be identified as planner überbots, and can implement adjustments to various numeric attributes like a suitability, an importance, an activation/inhibition energy, and a communication priority. Planner component 580 can implement a rigid, direct global strategy; for instance, by creating a set of planner überbots that can force specific data types, or data structures, to be manipulated in short term memory 520 through specific knowledge available in short term memory 520 and specific autobots. In an aspect, autobots created by planner component 580 can be deposited in autobot component 540, and be utilized over the knowledge network 375. Alternatively, or in addition, planner component 580 can implement an indirect global strategy as a function of a current context of an autonomous learning system 360, a current condition of a tool system 310, a content of short term memory 520 (which can include associated autobots that can operate in the content), and a utilization cost/benefit analysis of various autobots. It should be appreciated that the subject autonomous biologically based learning tool 300 can afford dynamic extension of planner components.

Planner component 580 can act as a regulatory component that can ensure process, or goal, adaptation in an autonomous biologically based tool 300 does not result in degradation thereof. In an aspect, regulatory features can be implemented through a direct global strategy via creation of regulatory überbots that infer operational conditions based on planned process, or goal, adaptation. Such an inference can be effected through a semantic network of data types on which the regulatory überbots act, and the inference can be supported or complemented by cost/benefit analysis. It should be appreciated that planner component 580 can preserve goals drifting within a specific region of a space of goals that can mitigate specific damages to a goal component, e.g., a tool system 310.

System context component 590 can capture the current competency of an autonomous biologically based learning tool 300 that exploits autonomous learning system 360. System context component 590 can include a state identifier that comprises (i) a value associated with an internal degree of competency (e.g., a degree of effectiveness of a tool system 310 in conducting a process (or pursuing a goal), a set of resources employed while conducting the process, a quality assessment of a final product or service (or an outcome of a pursued goal), a time-to-delivery of devices, and so on), and (ii) a label, or identifier, to indicate the state of the autonomous learning tool 300. For instance, the label can indicate states such as "initial state," "training state," "monitoring state," "learning state," or "applying knowledge." The degree of competency can be characterized by a numerical value, or metric, in a determined range. Competency can be a measure of the total age of the autonomous system (e.g., example system 300), or a measure of the relative age, e.g., the age since the start of a current state of context. Thus, a context provided by system context component 590 can serves as a proxy for age or experience. Further, the system context component 590 can include a summary of learning performed by the autonomous learning system 360 over a specific time interval, as well as a summary of possible process or goal adaptations that can be implemented in view of the performed learning.

Figure 6A:
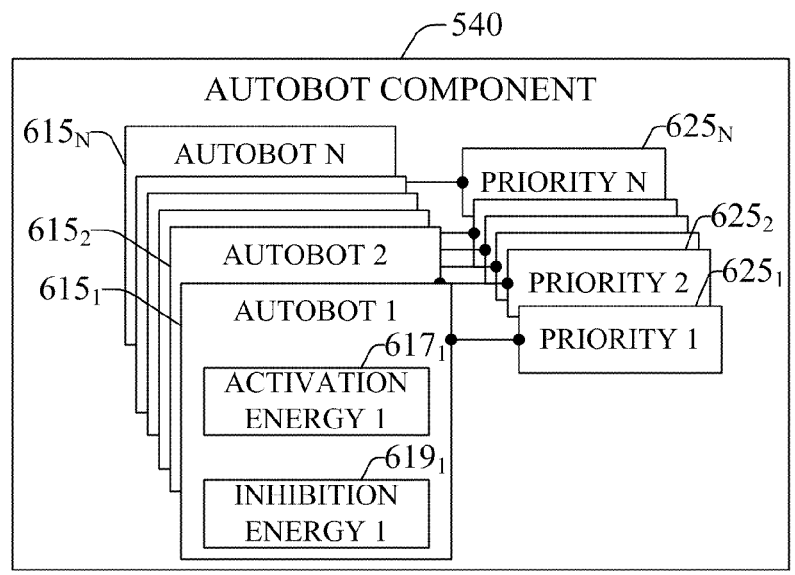
FIGS. 6A and 6B illustrate, respectively an example autobot component and an example autobot architecture.

FIG. 6A illustrates an example autobot component 540. Autobots $615_1$-$615_N$ represent a library of autobots and überbots, each with specific dynamics priority $625_1$-$625_N$, with N a natural number. Autobots $615_1$-$615_N$ can communicate with a memory (e.g., a long term or short term memory, or an episodic memory). As indicated supra, an autobot's priority is determined by the autobot's activation energy and inhibition energy. An autobot (e.g., autobot $615_1$, or $615_N$) gains activation energy (through überbots) when data that can be processed by the autobot is in STM. A weighted sum of an autobot (e.g., autobot $615_2$) activation energy and inhibition energy, e.g., $\Sigma = w_A E_A + w_I E_I$, can determine when the autobot can activate itself to perform its functional task: The autobot self-activate when $\Sigma > \psi$, where $\psi$ is a predetermined, inbuilt threshold. It should be appreciated that the subject autonomous biologically based learning tool 300 can afford dynamic augmentation of autobots.

Figure 6B:
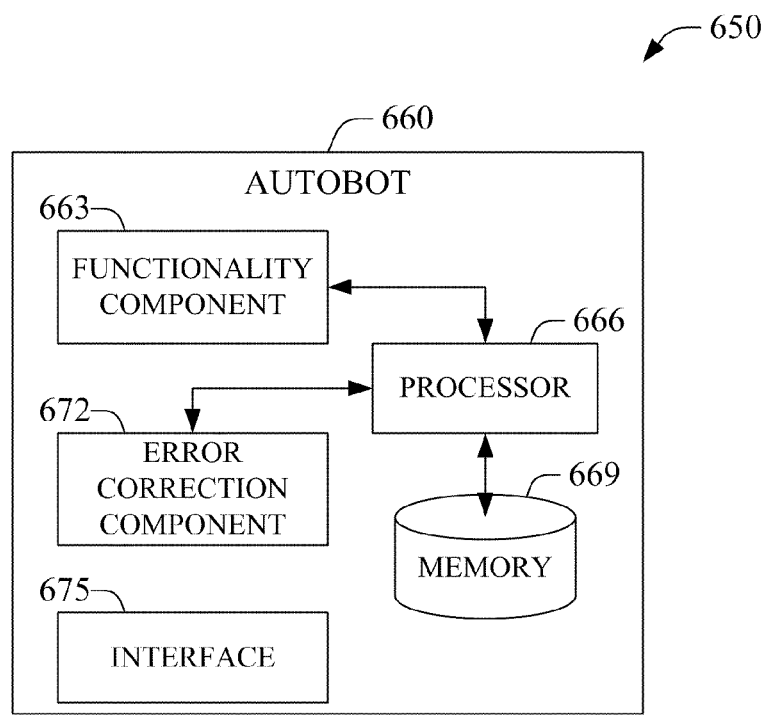

FIG. 6B illustrates an example architecture 650 of an autobot. The autobot 660 can be substantially any of the autobots included in an autobot component 540. A functionality component 663 determines and executes at least a portion of an operation that autobot 660 can perform on input data. Processor 666 can execute at least a portion of the operation(s) performed by the autobot 660. In an aspect, processor 666 can operate as a co-processor of functionality component 663. Autobot 660 can also comprise an internal memory 669 in which a set of results of previously performed operations are retained. In an aspect, internal memory operates as a cache memory that stores input data associated with an operation, current and former values of $E_A$ and $E_I$, a log of the history of operation of the autobot, and so on. Internal memory 669 can also facilitate autobot 660, e.g., via processor 666, to learn how to improve quality of forthcoming results when a specific type and quantity of error, as established, for example, through error correction component 672, is fed back or back propagated to the autobot 660. Therefore, autobot 660 can be trained through a set of training cycles to manipulate specific input data in a specific manner.

An autobot (e.g., autobot 660) can also be self-describing in that the autobot can specify (a) one or more types of input data the autobot can manipulate or require, (b) a type of data the autobot can generate, and (c) one or more constraints on input and output information; manipulation and generation can be accomplished at least in part through processor 666. In an aspect, interface 675 can facilitate autobot 660 to self-describe and thus express the autobot's availability and capability to überbots, in order for the überbots to supply activation/inhibition energy to the autobots according to a specific tool scenario. Interface can be functionally coupled to one or more components within autobot 660, including processor 666.

Figure 7:
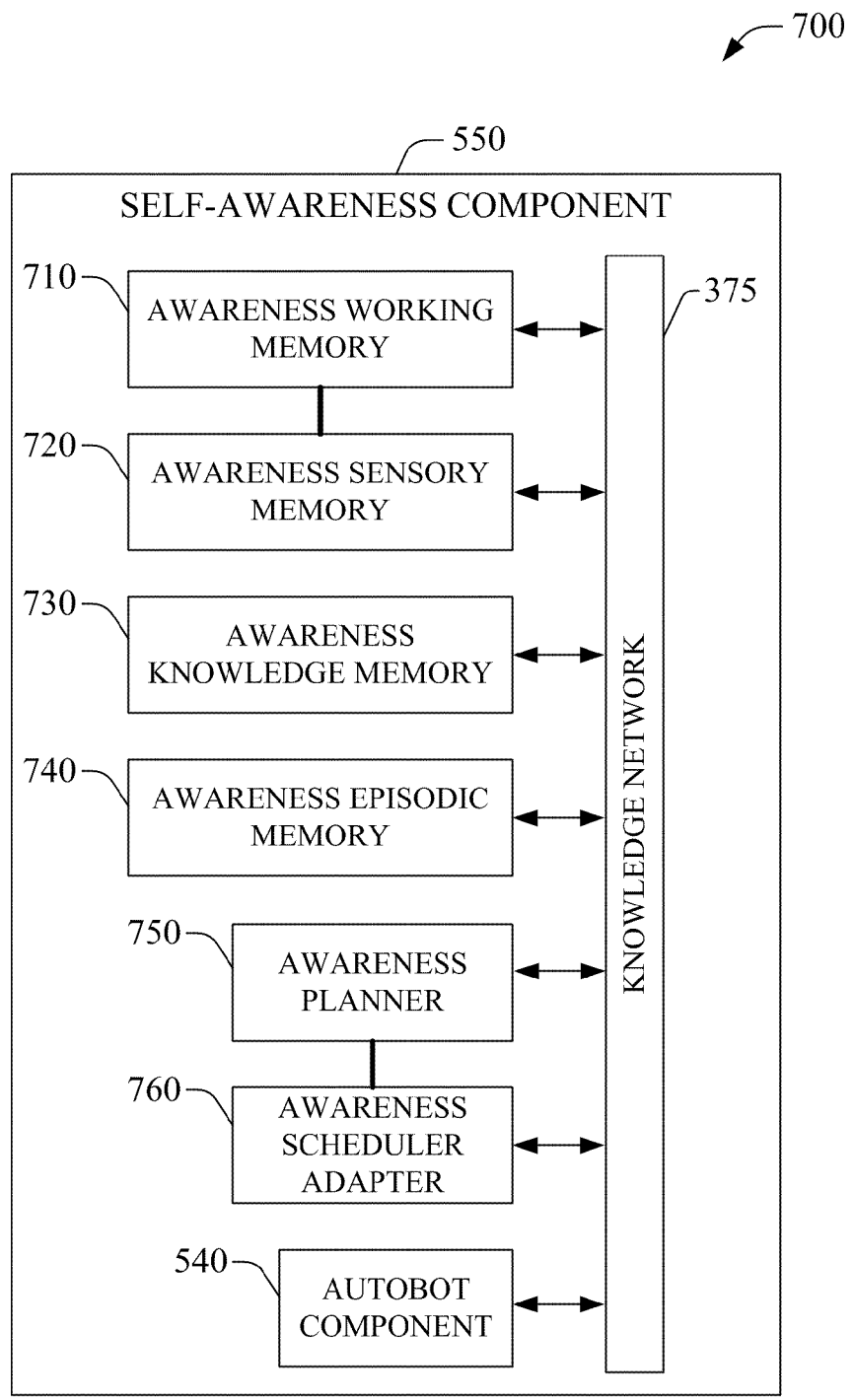
FIG. 7 illustrates an example architecture of a self-awareness component of an autonomous biologically based learning system.

FIG. 7 illustrates example architecture 700 of a self-awareness component 550 in an autonomous biologically based learning system. Self-awareness component 550 can determine a current level of degradation with respect to a learned normal state in a tool system (e.g., tool system 310). Degradation can arise from multiple sources such as wear-and-tear of mechanical parts in the tool system; improper operation or developmental operation to develop recipes (e.g., a data asset) or processes that can force tool system to operate outside one or more optimal ranges; improper customization of tool system; or inadequate adherence to maintenance schedules. Self-awareness component 550 can be recursively assembled, or defined, through (i) a hierarchy of memories, e.g., awareness memories (710-740) which can be part of memory platform 365, (ii) functional operational units such as awareness autobots that can reside in an autobot component 540 and be a part of processing platform 385, and (iii) a set of awareness planners 750. Based on the level of degradation, autonomous learning system 360 can analyze available data assets 328 as well as information 358 to rank the possible faults. In an aspect, in response to an excessive level of degradation, e.g. a tool system fault, an actor (e.g., a field engineer) can perform one or more maintenance activities like cleaning a chamber, replacing a focus ring, etc. In case of a successful repair of tool system, as confirmed, for example, by recovering degradation levels consistent with degradation prior to the system fault, and associated symptoms (e.g., data assets and patterns, relationships, and substantially any other type of understanding extracted from such combination) that preceded the maintenance activities can be retained by autonomous learning system 360. Thus, in forthcoming instances in which learned symptoms are identified through new understanding autonomously gleaned from data assets, and degradation analysis, a stored repair plan can be replayed reduce costs and improve mean time to repair (MTTR).

Awareness working memory (AWM) 710 is a S™ that can include a special region of memory identified as awareness sensory memory (ASM) 720 that can be utilized to store data, e.g., information input 358, that can originate in a sensor in sensor component 325 or in actor 390, can be packaged by one or more adaptors in adaptor component 335, and can be received by knowledge network 375. Self-awareness component 550 can also comprise multiple special functionality autobots, which can reside in autobot component 540 and include awareness planner überbots (APs).

In addition, self-awareness component 550 can comprise an awareness knowledge memory (AKM) 730 which is a part of a L™ and can include multiple concepts—e.g., an attribute; an entity such as a class or a causal graph; a relationship, or a procedure—relevant to the operation of self-awareness component 550. In an aspect, a self-awareness component 550 for a semiconductor manufacturing tool can include domain specific concepts like a step, a run, a batch, a maintenance-interval, a wet-clean-cycle, etc., as well as general purpose concepts like a number, a list, a sequence, a set, a matrix, a link, and so on. Such concepts can enter a higher level of abstraction; for instance, a wafer run can defined as an ordered sequence of steps where a step has both recipe parameter settings (e.g., desired values), and one or more step measurements. Furthermore, AKM 730 can include functional relationships that can link two or more concepts like an average, a standard deviation, a range, a correlation, a principal component analysis (PCA), a multi-scale principal component analysis (MSPCA), a wavelet or substantially any basis function, etc. It should be noted that multiple functional relationships can be applicable, and hence related, to a same concept; for example, a list of numbers is mapped to a real number instance by the average, which is a (functional) relation and a standard-deviation relation, as well as a maximum relation, and so forth). When a relationship from one or more entities to another entity is a function or a functional (e.g., a function of a function), there can be an associated procedure that can executed by an überbot in order to effect the function. A precise definition of a concept can be expressed in a suitable data schema definition language, such as UML, OMGL, etc. It should be further noticed that a content of AKM 730 can be augmented dynamically at (tool system) runtime without shutting the system down.

Each concept in AKM 730, as any concept in a knowledge base as described herein, can be associated with a suitability attribute and an inertia attribute, leading to the concept's specific situation score. Initially, before the autonomous system is provided with data, the suitability value for all elements in AKM 730 is zero, but the inertia for all concepts can be tool dependent and can be assigned by an actor, or based on historical data (e.g., data in database(s) 355). In an aspect, inertia of a procedure that produces an average from a set of numbers can be substantially low (e.g., $\iota=1$) because computation of an average can be regarded as a significantly simple operation that can be applicable to substantially all situations involved collected data sets, or results from computer simulations. Similarly, maximum and minimum value procedures, which transform a set of numbers into a single number, can be conferred a substantially low inertia value. Alternatively, compute a range and compute a standard deviation can be afforded higher inertia values (e.g., $\iota=2$) because such knowledge elements are more difficult to apply, whereas calculate a PCA can display a higher level of inertia and calculate a MSPCA can have a yet higher value of inertia.

A situation score can be employed to determine which concept(s) to communicate among from AKM 730 and AWM 710 (see below). Knowledge elements, or concepts, that exceed a situation score threshold are eligible to be conveyed to AWM 710. Such concepts can be conveyed when there is sufficient available storage in AWM 710 to retain the concept and there are no disparate concepts with a higher situation score that have not been conveyed to AWM 710. A concept's suitability, and thus a concept's situation score, in AWM 710 can decay as time progresses, which can allow new concepts with a higher suitability to enter awareness working memory 710 when one or more concepts already in memory are no longer needed or are no longer applicable. It is noted that the larger the concept's inertia the longer it takes the concept to both be conveyed to and be removed from AWM 710.

When a tool system state changes, e.g., a sputter target is replaced, an electron beam gun is added, a deposition process is finished, an in situ probe is initiated, an annealing stage is completed, and so on, awareness planner 550 überbots can document which concepts (e.g., knowledge elements) can be applied in the new state, and can increase a suitability value, and thus a situation score, of each such a concept in AKM 730. Similarly, the activation energy(ies) $617_1$-$617_N$ of autobots $615_1$-$615_N$ can be adjusted by überbots in order to reduce the activation energy of specific autobots, and to increase $E_A$ for autobots that are appropriate to a new situation. The increment in suitability (and situation score) can be spread by planner überbots to those concepts' first neighbors and then to second neighbors, and so forth. It should be appreciated that a neighbor of a first concept in AKM 730 can be a second concept that resides, in a topological sense, within a specific distance from the first concept according to a selected measure, e.g. number of hops, Euclidean distance, etc.) It is noted that the more distant a second concept is from a first concept that received an original increment in suitability, the smaller the second concept's increment in suitability. Thus, suitability (and situation score) increments present a dampened spread as a function of "conceptual distance."

In architecture 500, self-awareness component 550 comprises an awareness schedule adapter (ASA) 760 which can be an extension of awareness planner component 750 and can request and effect changes in collection extrinsic data or intrinsic data (e.g., via sensor component 325 through interaction component 330, via input 130, or via (feedback) link 155). In an aspect, awareness schedule adapter 760 can introduce data sampling frequency adjustments—e.g., it can regulate a rate at which different adaptors in adaptor component 335 can convey data to knowledge network 375 (e.g., information input 358) intended for ASM 720. Moreover, awareness schedule adapter 760 can sample at low frequency, or substantially eliminate, collection of data associated with process variables that are not involved in the description of normal patterns of data, or variables that fail to advance the accomplishment of a goal as inferred from data received in an adaptive inference engine. Conversely, ASA 760 can sample at higher frequency a set of variables extensively used in a normal pattern of data, or that can actively advance a goal. Furthermore, when the autonomous learning system 360 acknowledges a change of state tool system 310 (or a change in a situation associated with a specific goal) wherein data indicate that product quality or process reliability are gradually deviating from normal data patterns (or a goal drift is resulting in significant departure from an initial goal in the space of goals), the autonomous learning system can request, via ASA 760, a more rapid sampling of data to collect a larger volume of actionable information (e.g., input 130) that can effectively validate the degradation and trigger an appropriate alarm accordingly. In an aspect, a goal component can display a goal drift summary to an actor that entered an initial goal; e.g., a customer in an electronics store that has substantially departed from an initial expenditure goal when procuring a home entertainment system can be displayed a log with changes in a projected expense after budget adaptation; or a database architect can be shown costs associated with memory space and associated infrastructure upon adaptation of a goal to optimize a data warehouse.

An actor 390 (e.g., a human agent) can train self-awareness component 550 in multiple manners, which can include a definition of one or more episodes (including, for instance, illustrations of successfully adapted goals). A training of the autonomous learning system 360, through self-awareness component 550, for an episode can occur as follows. The actor 390 creates an episode and provides the episode with a unique name. Data for the newly created episode can then be given to autonomous learning system 360. The data can be data for a specific sensor during a single specific operation step of a tool system, a set of parameters during a single specific step, a single parameter average for a run, etc.

Alternatively, or additionally, more elementary guidance can be provided by actor 390. For example, a field support engineer can perform preventive tool maintenance (PM) on tool system 310. PM can be planned and take place periodically, or it can be unplanned, or asynchronous. It should be appreciated that preventive tool maintenance can be performed on the manufacturing system in response to a request by the autonomous learning system 360, in response to routine preventive maintenance, or in response to unscheduled maintenance. A time interval elapses between consecutive PMs, during such a time interval one or more processes (e.g., wafers/lots manufacturing) can take place in the tool system. Through data and product assets (e.g., data assets, flat panel display devices, wafer . . . ) and associated information, such as effected planner and unplanned maintenance, autonomous learning system can infer a "failure cycle." Thus, the autonomous learning system can exploit asset(s) 328 to infer a mean time between failures (MTBF). Such inference is supported through a model of time-to-failure as a function of critical data and product assets. Furthermore, autonomous learning system 360 can develop models, through relationships among disparate assets received as information input/output (I/O) 358 or through historical data resulting from supervised training sessions delivered by an expert actor. It should be appreciate that an expert actor can be a disparate actor that interacts with a trained disparate autonomous learning system.

Actor 390 can guide the autonomous system by informing the system that it can average wafer level run data and assess a drift in critical parameters across PM intervals. A more challenging exercise can also be performed by the autonomous system, wherein the actor 390 indicates through a learning instruction to autonomous learning system 360 to learn to characterize a pattern of data at the wafer average level before each unplanned PM. Such an instruction can promote the autonomous learning system 360 to learn a pattern of data prior to an unplanned PM, and if a pattern of data can be identified by an awareness autobot, the self-awareness component 550 can learn such a pattern as time evolves. During learning a pattern, awareness component 550 can request assistance (or services) from self-conceptualization component 560 or awareness autobots that reside in autobot component 540. When a pattern for the tool system is learned with a high degree of confidence (e.g. measured by a degree of reproducibility of the pattern as reflected in coefficients of a PCA decomposition, a size of a dominant cluster in a K-cluster algorithm, or a prediction of the magnitude of a first parameter as a function of a set of disparate parameters and time, and so forth), autonomous biologically based learning system 360 can create a reference episode associated with the malfunction that can lead to the need of tool maintenance so that an alarm can be triggered prior to occurrence of the reference episode. It is noted that awareness autobots, which can reside in autobot component 540, can fail to characterize completely a data pattern for the malfunction reference episode, or substantially any specific situation that can require unplanned maintenance, before it is necessary. It should be appreciated nonetheless that such a preventive health management of a tool system 310, which can include a deep behavioral and predictive functional analysis, can be performed by autobots in self-conceptualization component 560.

Figure 8:
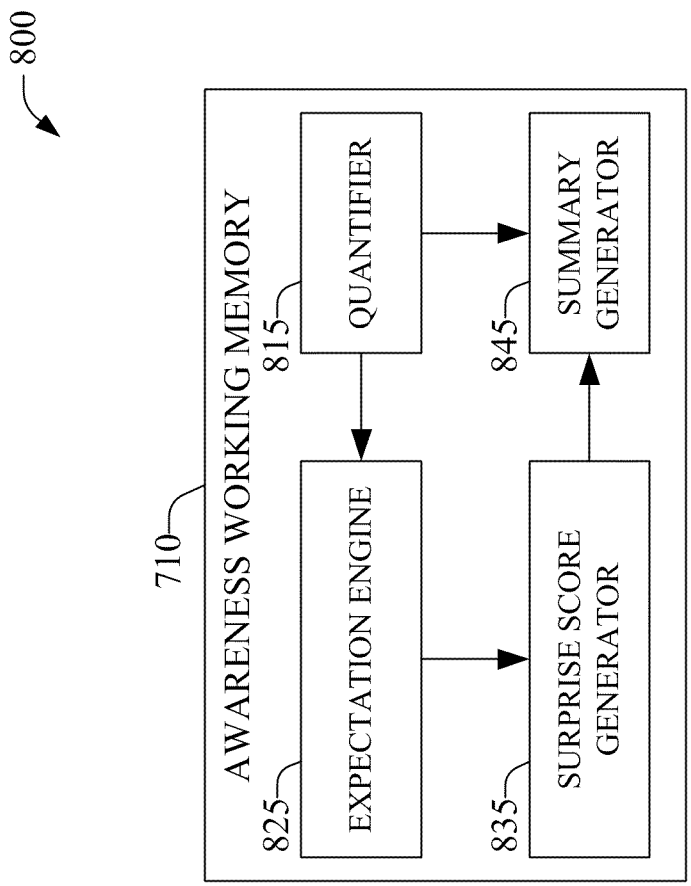
FIG. 8 is a diagram of example autobots that operate in an awareness working memory according to aspects described herein.

FIG. 8 is a diagram 800 of autobots that can operate in an awareness working memory 520. Illustrated autobots—quantifier 815, expectation engine 825, surprise score generator 835, and summary generator 845—can compose an awareness engine; a virtual emergent component, whose emergent nature arises from the concerted operation of elementary constituents, e.g., autobots 815, 825, 835, and 845. It should be appreciated that the awareness engine is an example of how one or more planning überbots can use a collection of coordinated autobots to perform a sophisticated activity. The planning überbots employ the various autobots (e.g., average, standard deviation, PCA, wavelet, derivative, etc.) or the services of self-conceptualization component 560 to characterize a pattern of the data received in an autonomous biologically based learning system. Data for each step, run, lot, etc. run can be labeled by an external entity as being normal or abnormal during training. Quantifier 815 can be employed by planning überbots to exploit normal data to learn a pattern of data for a prototypical, normal process. In addition, quantifier 815 can assess an unlabeled data set (e.g., information input 358) that is deposited into ASM 720 and compare the normal data pattern with a data pattern of unlabeled data. Expected patterns for normal data or equations to predict parameters with normal data can be stored and manipulated through expectation engine 825. It should be noted that the pattern of unlabeled data can differ from the normal data pattern in various ways, according to multiple metrics; for instance, a threshold for a Hotelling T2 statistic (as applied to PCA and MS-PCA and derived from training runs) can be exceeded; an average of a data subset of the unlabeled data set can differ by more than $3\sigma$ (or other predetermined deviation interval) from the average computed with normal, training run data; a drift of measured parameters can be substantially different from that observed in the data associated with a normal run; and so forth. Summary generator 845 thus generates a vector of components for normal data, whereas surprise score generator 835 can incorporate, and rank or weight substantially all such differences in components of the vector and compute a net degradation surprise score for the tool system that reflect a health condition of the tool system and reflect how far "away from normal" the tool system is. It should be appreciated that discrepancies among a normal and unlabeled metric can vary as a function of time. Thus, through collection of an increasing amount of normal data, the autonomous learning system 360 can learn various operational limits with greater level of statistical confidence as time evolves and can adjust manufacturing process recipes (e.g., a goal) accordingly Degradation condition, as measured through a surprise score, for example, can be reported to an actor via summary generator 845.

Figure 9:
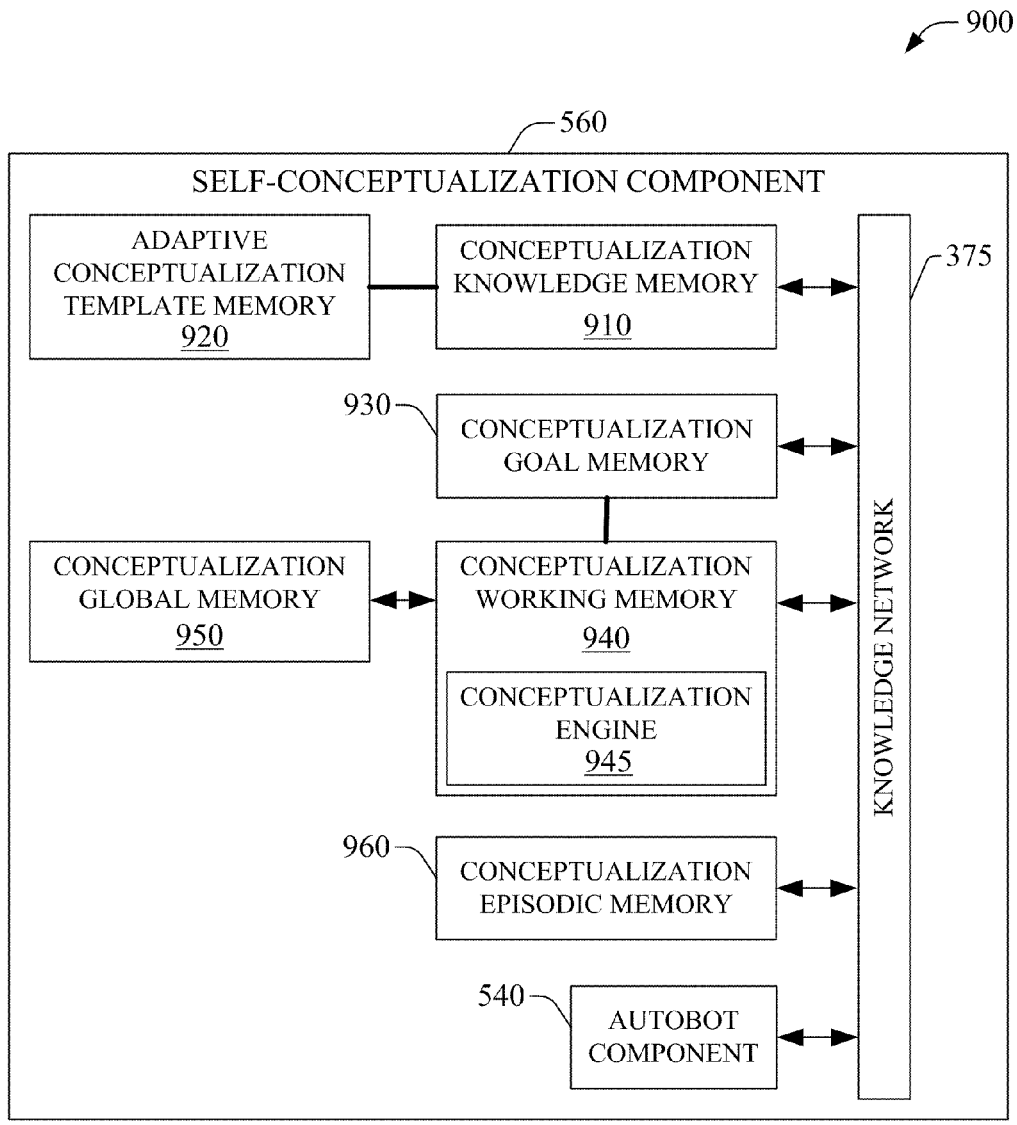
FIG. 9 illustrates an example embodiment of a self-conceptualization component of an autonomous biologically based learning system.

FIG. 9 illustrates and example embodiment 900 of a self-conceptualization component of an autonomous biologically based learning system. A functionality of self-conceptualization component is to build an understanding of important semiconductor manufacturing tool relationships and descriptions. Such an understanding can be employed to adjust a manufacturing process (e.g., a goal). This acquired understanding is built autonomously or in conjunction with end-user (e.g., actor 390) supplied guidance. Similarly to the other primary functional components 550 and 560, self-conceptualization component 570 is assembled or defined recursively in terms of a hierarchy of memories, operational units, or autobots, and planners; such components can communicate a priority-enabled knowledge network.

Embodiment 900 illustrates a conceptualization knowledge memory (CKM) 910 that includes concepts (e.g., attributes, entities, relationships, and procedures) necessary for operation of self-conceptualization component 570. Concepts in CKM 910 include (i) domain specific concepts such as a step, a run, a lot, a maintenance-interval, a wet-clean-cycle, a step-measurements, a wafer-measurements, a lot-measurements, a location-on-wafer, a wafer-region, a wafer-center, a wafer-edge, a first-wafer, a last-wafer, etc.; and (ii) general purpose, domain independent concepts like a number, a constant (e.g., e, Z), a variable, a sequence, a time-sequence, a matrix, a time-matrix, a fine-grained-behavior, a coarse-grained-behavior, etc. Self-conceptualization component also includes a vast array of general purpose functional relations such as add, subtract, multiply, divide, square, cube, power, exponential, log, sine, cosine, tangent, erf and so forth, as well as other domain specific functional relations that can present various levels of detail and reside in adaptive conceptualization template memory (ACTM) 920.

ACTM 920 is an extension of CKM 910 that can hold functional relationships that are either completely or partially known to an actor (e.g., an end user) that interacts with a tool system 310 (e.g., a semiconductor manufacturing tool). It should be noted that while ACTM is a logical extension of CKM, autobots, planners, and other functional components are not affected by such separation, as the actual memory storage can appear a single storage unit within self-conceptualization component 560. Self-conceptualization component 560 can also include a conceptualization goal memory (CGM) 930 which is an extension of a conceptualization working memory (CWM) 940. CGM 930 can facilitate autobots of a current goal, e.g., to learn (f, pressure, time, step); for a particular process step, learn a function f of pressure wherein the function depends on time. It should be noted that learning function f represents a sub-goal that can facilitate accomplishing the goal of manufacturing a semiconductor device utilizing tool system 310.

Concepts in ACTM 920 also have a suitability numeric attribute and an inertia numeric attribute, which can lead to a situation score. A value of inertia can indicate a likelihood of a concept to be learnt. For example, a higher inertia value for a matrix concept and a lower inertia for a time-sequence concept can lead to a situation where self-conceptualization component 560 can learn a functional behavior of time-sequences rather than a functional behavior of data in a matrix. Similarly to self-awareness component 550, concepts with lower inertia are more likely to be conveyed from CKM 910 to CWM 940.

Conceptual planners (CPs) provide activation energy to the various autobots and provide situation energy to various concepts in CKM 910 and ACTM 920, as a function of a current context, a current state of tool system 310 (or generally a goal component 120), a content of CWM 940, or current autobot(s) active in CWM 940. It should be appreciated that activation energy and situation energy alterations can lead to goal adaptation based on the knowledge generated (e.g., based on learning) as a result of the altered semantic network for concepts in CWM 940 or CKM 910—as inference by an adaptive inference engine can be based on propagation aspects of concepts.

Contents of CTM 920 are concepts which can describe the knowledge discussed above, and thus those concepts can have suitability and inertia numeric attributes. The contents of CTM 920 can be used by autobots to learn the functional behavior of the tool system 310 (subject to the constraint that concepts with lower inertia are more likely to be activated over concepts with higher inertia.). It is not necessary for all guidance to have the same inertia; for instance, a first complete function can be provided a lower inertia than a second complete function even though both concepts represent complete functions.

When partial knowledge like a partially-defined equation is uploaded in CWM 940, it can be completed, e.g., with existing knowledge-CPs coordinate autobots to employ available data to first identify values for unknown coefficients. A set of ad hoc coefficients can thus complete the partially-defined equation concept into a complete function concept. The complete equation concept can then be utilized in a pre-built functional-relation concept such as add, multiply, etc. Basic knowledge with output (e.g., relationship (output $(\kappa_E)$, T)) can facilitate autobots in CWM 940 to construct and evaluate various functional descriptions that involve data for $\kappa_E$ and T in order to identify the best function that can describe a relationship among $\kappa_E$ and T. Alternatively, basic knowledge without output can facilitate autobots, with assistance of CPs, to specify a variable as an output, or independent, variable and attempt to express it as a function of the remaining variables. When a good functional description is not found, an alternative variable can be specified as an independent variable the process is iterated until it converges to an adequate functional relationship or autonomous learning system 360 indicates, for example to actor 390, that an adequate functional relationship is not found. An identified good functional relationship can be submitted to CKM 910 to be utilized by autobots in autonomous biologically based learning engine 360 with a level of inertia that is assigned by the CPs. For instance, the assigned inertia can be a function of the mathematical complexity of the identified relationship—a linear relationship among two variables can be assigned an inertia value that is lower than the assigned inertia to a non-linear relationship that involve multiple variables, parameters, and operators (e.g., a gradient, a Laplacian, a partial derivative, and so on).

Conceptualization engine 945 can be a "virtual component" that can present coordinated activities of awareness autobots and conceptualization autobots. In an aspect, self-awareness component 550 can feed forward (through FF loop 552) a group of variables (e.g., variables in the group can be those that display good pairwise correlation properties) to self-conceptualization component 560. Forwarded information can facilitate self-conceptualization component 560 to check CKM 910 and ACTM 920 for function relation templates. The availability of a template can allow an autobot of a conceptualization learner (CL), which can reside in the conceptualization engine 945, to more quickly learn a functional behavior among variables in a forwarded group. It should be appreciated that learning such a functional behavior can be a sub-goal of a primary goal. A CL autobot with the assistance of a CP autobot can also use autobots of a conceptualization validator (CV). CV autobots can evaluate a quality of proposed functional relationships (e.g., average error between a predicted value and a measurement is within instrument resolution). A CL autobot can independently learn a functional relationship either autonomously or through actor-supplied guidance; such actor supplied guidance can be regarded as extrinsic data. Functions learned by a CL can be fed back (e.g., via FB link 558) to self-awareness component 550 as a group of variables of interest. For example, after learning the function $\kappa_E = \kappa_0 \exp(-U/T)$, wherein $\kappa_0$ (e.g., an asymptotic etch rate) and U (e.g., an activation barrier) possess specific values known to the CL, self-conceptualization component 560 can feed back the guidance group (output ($\kappa_E$, T) to self-awareness component 550. Such feed back communication can afford self-awareness component 550 to learn patterns about such group of variables so that degradation with respect to the group of variables can be quickly recognized and, if necessary, an alarm generated (e.g., an alarm summary, an alarm recipient list verified) and triggered. Memory 960 is a conceptualization episodic memory.

The following two aspects related to CL and CV should be noted. First, CL can include autobots that can simplify equations (e.g., through symbolic manipulation), which can facilitate to store a functional relationships as a succinct mathematical expression. As an example, the relationship $P=((2+3)\Phi)((1+0)\div\theta)$ is simplified to $P=3\Phi\div\theta$, where P, $\Phi$ and $\theta$ indicate, respectively, a pressure, a flow and an exhaust valve angle. Second, CV can factor in the complexity of the structure of an equation when it determines a quality of the functional relationship—e.g., for parameters with substantially the same characteristics, like average error of predicted values versus measurements, a simpler equation can be preferred instead of a more complicated equation (e.g., simpler equation can have lower concept inertia).

Additionally, important FF 552 communication of information from self-awareness component 550 to self-conceptualization component 560, and FB 558 communication from self-conceptualization component 560 to self-awareness component 550, can involve cooperation of awareness autobots and conceptualization autobots to characterize a pattern of data for an episode. As discussed above in connection with FIG. 5, when self-awareness component 550 fails to learn an episode, self-conceptualization component 560 can assist self-awareness component 550 through provision of a set of relevant functional relationships. For example, characterization of an episode can require a fine-grained description of time dependence of a pressure in a stabilization step in a process run in a tool system 310. Self-conceptualization component 560 can construct such a detailed (e.g., second by second) time dependence of the pressure in the stabilization step. Thus, through FB loop 558, self-awareness component 550 can learn to characterize the pattern of pressure during the stabilization step in a normal tool situation and to compare the learnt pressure time dependence with a pattern of pressure in a specific episode data. As an illustration, presence of a spike in a measured pressure prior to a stabilization step for data in an episode, and the absence of the spike in pressure data during normal tool operation can be detected as a data pattern that identifies the occurrence of the episode in an autonomous biologically based learning tool 300.

Similarly, a prediction of an unscheduled PM can rely on knowledge of temporal fluctuations of critical measurements of tool system data and the availability of a set of predictive functions conveyed by self-conceptualization component 570. The predictive functions can assist a self-awareness component (e.g., component 550) to predict an emerging situation of an unplanned PM in cases where the prediction depends on projected values of a set of variables as a function of time.

Figure 10:
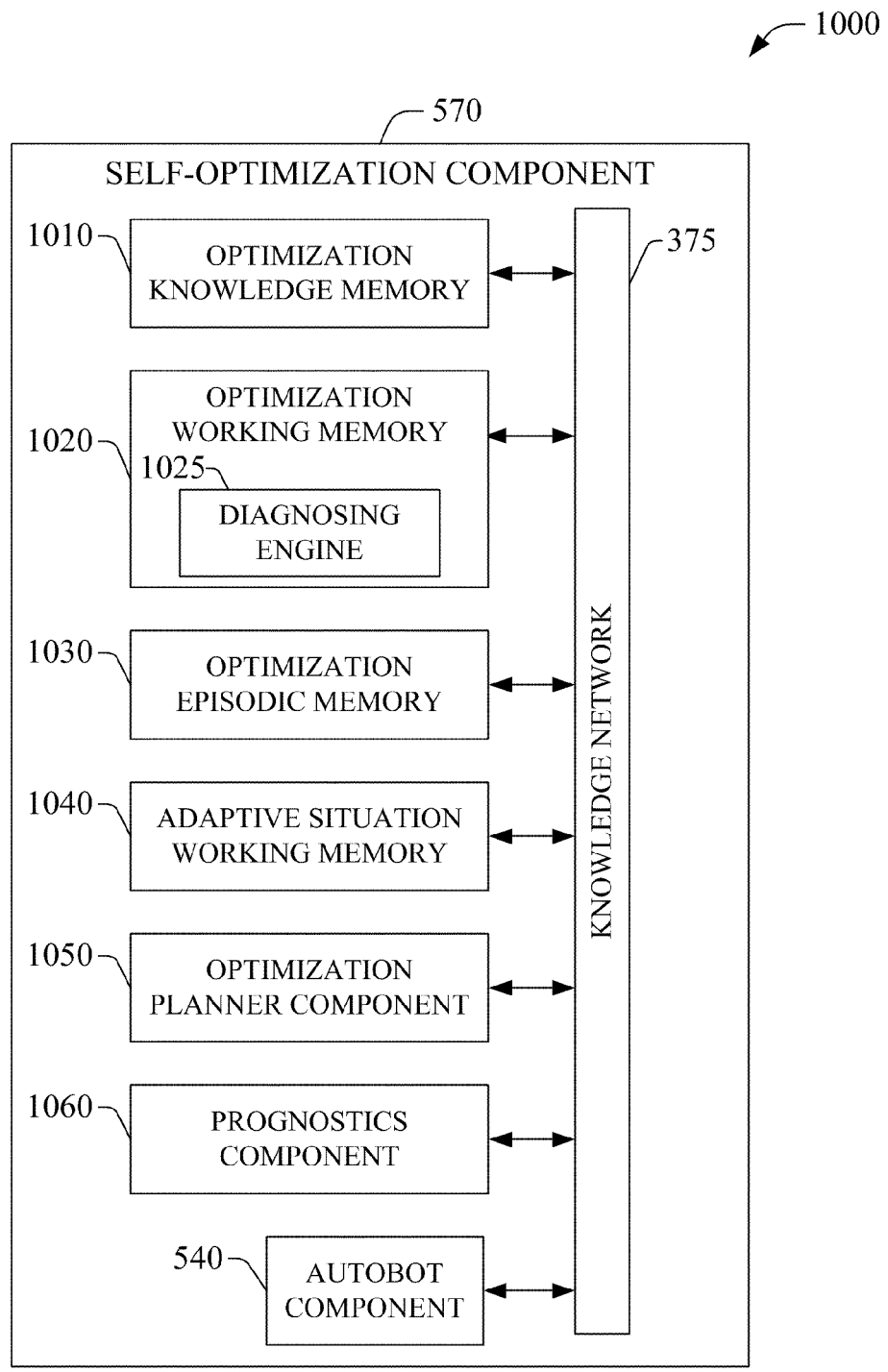
FIG. 10 illustrates and example embodiment of a self-optimization component in an autonomous biologically based learning system.

FIG. 10 illustrates and example embodiment 1000 of a self-optimization component in an autonomous biologically based learning system. As indicated above, self-optimization component functionality is to analyze the current health (e.g., performance) of a tool system 310 and, based on the results of the current health analysis, diagnose or rank substantially all potential causes for health deterioration of the tool system 310, and identify a root cause based on learning acquired by autonomous learning system 360. Analogously to the other primary functional components 550 and 560, self-optimization component 570 is built recursively from a hierarchy of memories that can belong to a memory platform 365, and autobots and planners which can be a part of a processing platform 385.

Optimization knowledge memory (OKM) 1010 contains concepts (e.g., knowledge) related to diagnosis and optimization of the behavior of tool system 310. It should be appreciated that a behavior can include a goal or a sub-goal. Accordingly, OKM 1010 contains domain, or goal, specific concepts such as step, step-data, run, run-data, lot, lot-data, PM-time-interval, wet-clean-cycle, process-recipe, sensor, controller, etc. The latter concepts are associated with a tool system 310 that manufactures semiconductor devices. In addition, OKM 1010 comprises domain independent concepts, which can include a reading (e.g., readings from a pressure sensor in sensor component 325), a sequence, a comparator, a case, a case-index, a case-parameter, a cause, an influence, a causal-dependency, an evidence, a causal-graph, etc. Furthermore, OKM 1010 can comprise a set of functional relations like compare, propagate, rank, solve, etc. Such functional relations can be exploited by autobots, which can reside in autobot component 540 and can confer OKM 1010 at least a portion of its functionality through execution of procedures. Concepts stored in OKM 1010 possess a suitability numeric attribute and an inertia numeric attribute, and a situation score attribute derived there from. The semantics of suitability, inertia and situation score is substantially the same as that for self-awareness component 550 and self-conceptualization component 560. Therefore, if a run-data is provided with a lower inertia than step-data, self-optimization component 570 planners (e.g., überbots) are more likely to communicate the concept of run-data from OMK 1010 to optimizing working memory (OWM) 1020. In turn, such inertia relationship between run-data and step-data can increase the activation rate of optimization autobots that work with run related concepts.

It should be noted that through FF links 552 and 562, self-awareness component 550 and self-conceptualization component 560 can influence the situation score of concepts stored on OKM 1010, and the activation energy of optimization autobots through optimization planners (OPs), which can reside in optimization planner component 1050. It should be appreciated that concepts which are stored in OKM 1010, and are influenced through self-awareness component 550 and self-conceptualization component 560, can determine aspects of a specific goal to be optimized as a function of a specific context. As an illustration, if self-awareness component 550 recognizes that a pattern of data for a process step has degraded significantly, the situation score of the associated step concept can be increased. Accordingly, OPs can then supply additional activation energy to optimizing autobots related to the step concept in order to modify a set of steps executed during a process (e.g., while pursuing a goal). Similarly, if self-conceptualization component 560 identifies a new functional relationship among tool measurements for a product lot, FF information received from self-conceptualization component 560 (via FF 562, for example) self-optimization component 570 can increase (1) a situation score of a lot concept and (2) an activation energy of an optimization autobot with a functionality that relies on a lot concept; therefore, modifying aspects of the lot concept (e.g., number or type of wafers in a lot, number of TFTs in an active matrix array or a set of arrays, cost of a lot, cost of a set of active matrix arrays, resources utilized in a lot, resources utilized in one or more TFT active matrix arrays, and so on). Adaptive situation working memory 1040 can enable adaptive adjustment of situation scores and retain data for operation of self-optimization component 570. Optimization episodic memory 1030 can retain data impressions and knowledge collected through various optimizations such as self-optimization.

Health assessment of a tool system 310 can be performed through diagnosing engine 1025 as discussed next. It should be noted that a health assessment can be a sub-goal of a manufacturing process. Diagnosing engine 1025 autonomously creates a dependency graph and allows actor 390 to augment the dependency graph. (Such a dependency graph can be regarded as extrinsic data or as intrinsic data.) The causal graph can be conveyed incrementally, according to the dynamics of the process conducted by the tool system 310, and a diagnosis plan that can be devised by the actor 390. For example, a causal graph can show that a "pressure" malfunction is caused by one of four causes: a deposition chamber has a leak, gas flow into the chamber is faulty, exhaust valve angle (which controls the magnitude of gas flow) is faulty, or a pressure sensor is in error. Components of tool system 310 have a priori probabilities of failure (e.g., a chamber leak can occur with probability 0.01, a gas flow can be faulty with probability 0.005, and so on). In addition, actor 390, or self-conceptualization component 560, can define a conditional dependency for pressure malfunction which can be expressed as a conditional probability; e.g., probability of pressure being at fault given that the chamber has a leak can be p(P|leak). Generally, conditional probabilities causally relating sources of tool failure can be provided by actor 390. It should be noted that autonomous learning system 360 assumes that probability assignments defined by actor 390 can be approximate estimates, which in many cases can be significantly different from a physical probability (e.g., actual probability supported by observations). Examples of causal graphs are presented and discussed next in connection with FIGS. 11A and 11B below.

Self-optimization component 570 can also comprise a prognostic component 1060 which can generate a set of prognostics regarding performance of tool system 310 through information I/O 358 associated with the tool 310. Such information can comprise quality of materials employed by functional component, physical properties of product assets 328 produced by tool system 310, such as index of refraction, optical absorption coefficient, electro-photoluminescence yield, Raman spectroscopy cross-sections, defect density (ies), or magnetotransport properties in cases product assets 328 are doped with carriers, etc. Multiple techniques can be utilized by prognostics component 1060. The techniques comprise first characterization techniques substantially the same as those techniques that can be employed by self-awareness component when processing information 358; namely, such as (i) frequency analysis utilizing Fourier transforms, Gabor transforms, wavelet decomposition, non-linear filtering based statistical techniques, spectral correlations; (ii) temporal analysis utilizing time dependent spectral properties (which can be measured by sensor component 325), non-linear signal processing techniques such as Poincaré maps and Lyapunov spectrum techniques; (iii) real- or signal-space vector amplitude and angular fluctuation analysis; (iv) anomaly prediction techniques and so forth. Information, or data assets generated through analysis (i), (ii), (iii) or (iv), can be supplemented with predictive techniques such as neural-network inference, fuzzy logic, Bayes network propagation, evolutionary algorithms, like genetic algorithm, data fusion techniques, simulated annealing, and so on. The combination of analytic and predictive techniques can be exploited to facilitate optimization of tool system 310 via identification of ailing trends in specific assets, or properties, as probed by sensor component 325, as well as information available in OKM 101, with suitable corrective measures generated by optimization planner component 1050, and optimization autobots that can reside in component 540.

Figure 11:
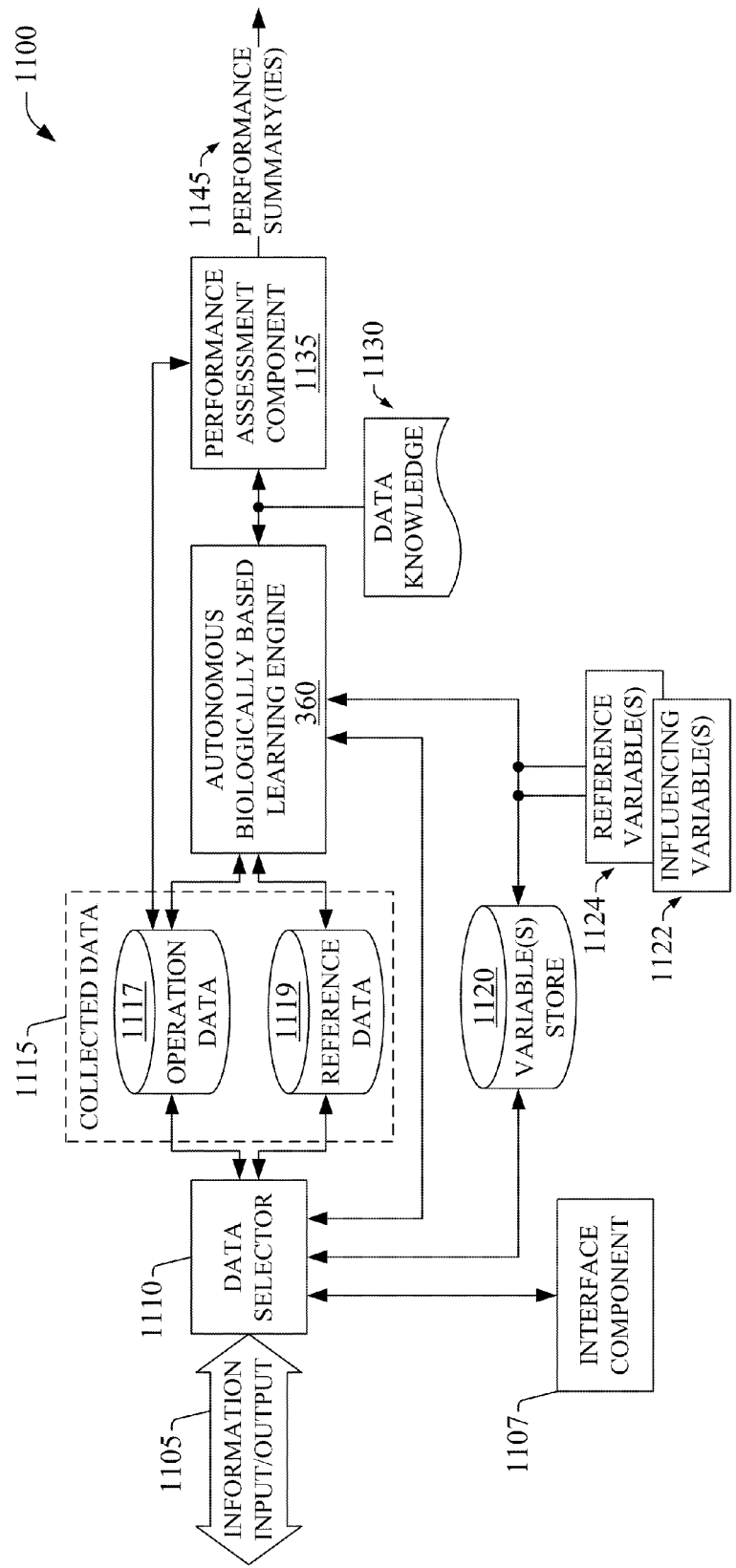
FIG. 11 is a block diagram of an example system to assess performance degradation of a tool, or tool mismatch according to aspects of the subject disclosure.

FIG. 11 is a block diagram of an example system 1100 to assess performance degradation of a tool, or tool mismatch, according to aspects of the subject disclosure. Information output 1105 can comprise data extracted, or output, from a tool system 310. Data can be associated with production (e.g., a manufacturing run) of assets (e.g., assets 328) generated by running one or more production recipes, or can include synthetic data; e.g., data generated through design of experiment (DOE). In addition, data within information output 1105 can comprise data generated in a maintenance cycle of the tool system 310. Information output 1105 also can include information related to the data such as variables measured, instrument(s) that generated the data (e.g., a sensor(s), a tool(s) . . . ), recipe employed (e.g., wet-clean cycle recipe, a photolithographic etching recipe, deposition of thin film transistors) to produce the asset, production run identifier(s), time stamp(s), operator and manufacturing or processing plant information, historical data on downtime and continuous operation and so forth.

Data selector 1110 receives information output 1105 and selects a target or reference variable(s) 1124, and a set of variables that can influence the selected target variable, e.g., influencing variables 1122. Upon variable selection, reference variable(s) 1124 and influencing variables 1122 are conveyed to autonomous biologically based learning engine 360. Substantially all received variables are retained in variable(s) store 1120. In addition, data selector 1110 splits and aggregates collected (or received) data 1115 in at least two sets of data, or data streams, which are retained in operation data storage 1117, and reference data storage 1119. Reference or training data is typically a fraction of collected data 1115, and is conveyed to autonomous biologically based learning engine 360, which analyzes the data as described in above and generates knowledge that characterizes the reference data. It is noted that, in an aspect, reference data 1119 can be associated with a specific, reference tool or unit of equipment, whereas operation data 1117 can be associated with a disparate tool or unit of equipment or the reference tool or unit at a subsequent interval of time distinct from the reference time interval (e.g., the time interval during which the reference data was generated). In the latter scenario, performance assessment is directed towards an identification of a mismatched performance among the reference tool and an operation tool or degradation of the reference tool over time. For instance, when a tool or set of reference tools is deployed for operation in the field, its operation is expected to substantially match the operation of a like reference tool or set of reference tools as installed in a tool manufacturer plant. In particular, specific performance is expected when the field deployed tool or set of tools implements the same set of calibration or reference recipes. Such expected performance can be directly contrasted with reference performance as described herein, and a performance mismatch assessment can be conducted. In another aspect, operation data 1117 and reference data 1119 can be generated through maintenance cycles, which can be either periodic or aperiodic; for instance, information output 1105 can include data extracted from tool operation under test recipe(s) in a predetermined time interval.

Operation data 1115 is typically measured data of a set of variables associated with one or more processes that generate the data. The knowledge is generated objectively, e.g., influencing variables are not externally biased or explicitly controlled for the purposes of learning, and includes associations that arise from natural physical correlations among a reference variable(s) 1124 and a set of selected influencing variables 1122. It should be appreciated that objective learning conducted with the training data is process agnostic; namely, learning proceeds in accordance with concepts generated in one or more semantic networks (e.g., knowledge network 375) through relationships discovered among data associated with influencing variable(s) 1122 and reference variable(s) 1124. It should be appreciated that once a space of influencing variables and a distinguished reference variable are determined, it is the data itself that drives the learning process without reliance on external bias(es). In addition, suppressing information while learning can impede or limit the quality of inferences generated from the application of learning; e.g., removal of a subset of influencing variables in an initial set of influencing variables can hinder the scope and/or quality or fidelity of inferences or autonomous predictions, e.g., application of learning, with respect to inferences obtained through the initial, non-suppressed set of influencing variables. In view of the process agnostic learning or uber-objective learning, a mathematical relationships can be learned with data at various time granularities such as a single step or multiple contiguous steps (e.g., a wafer run), or multiple disjointed steps, and so on. Accordingly, in an aspect of the subject innovation, the generated knowledge can be cast as the mathematical relationship or function $f$ among the target variable(s) 1124 and influencing variable(s) 1122. Knowledge on the data (e.g., data knowledge 1130), which includes the identified relationship f is conveyed to a performance assessment component 1135 that analyzes operation data 1117 with respect to values of a target variable(s) 1124 (e.g., chamber pressure, photolithographic etching rate) measured (e.g., sensor, CD scanning electron microscope (SEM) . . . ) and predicted via the learned mathematical relationship $f$ and measurements of the influencing variables 1122 (e.g., gas flow(s), annealing temperature . . . ) as conveyed by the operation data 1117.

Analysis conducted through performance assessment component 1135 can determine performance degradation of one or more tools (e.g., tool system 310) associated with process(es) that generate information output 1105. In addition, performance mismatch among a set of disparate tools can be evaluated via performance assessment component 1135 when reference data 1119 is generated through a reference tool while operation data 1117 is generated by a disparate tool or the same tool over another time interval.

In an aspect, data selector 1110 and performance asset component 1135 can be conferred at least part of their functionality through autonomous biologically based learning engine 360 via a processing platform therein and associated processors. Alternatively or in addition, one or more processors (not shown) can be configured to confer, and confer, at least in part, the functionality of data selector 1110 and performance assessment component 1135 described herein. To confer such functionality, the one or more processors (not shown) can execute code instructions (not shown) stored in a memory in example system 1100 to provide the described functionality of data selector 1110 and performance assessment component 1135. Next, we describe in greater detail aspects of data selector 1110 and performance assessment component 1135.

Figure 12:
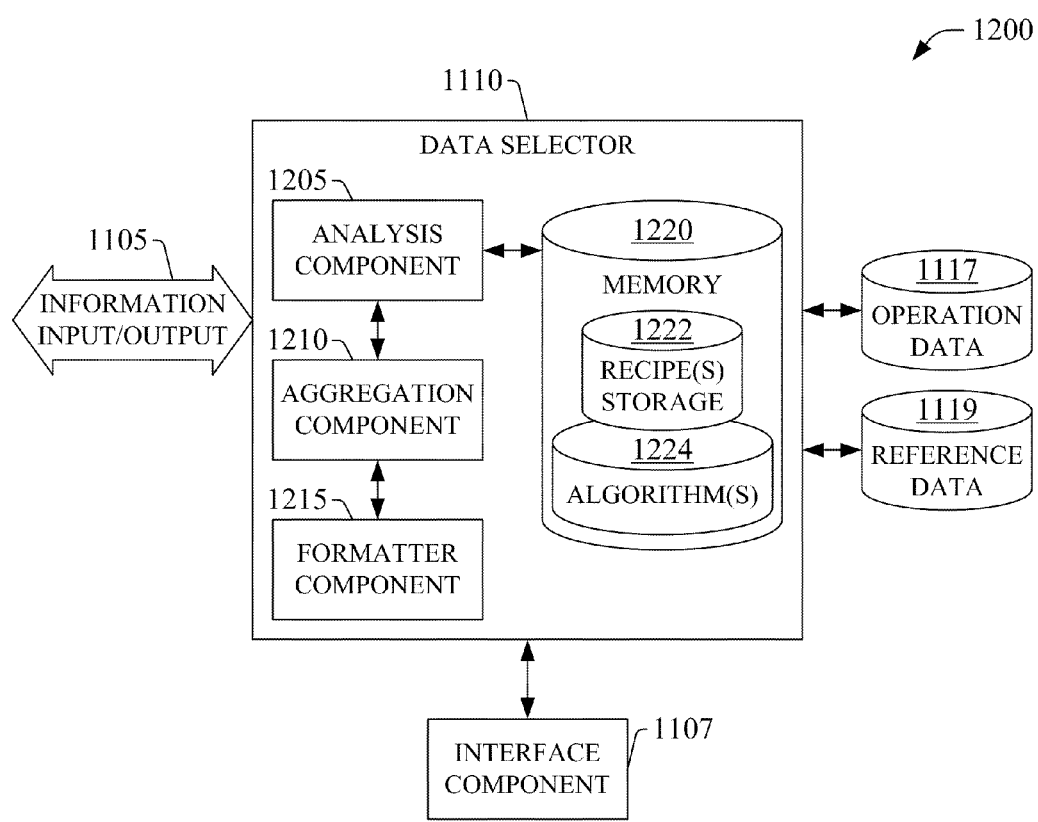
FIG. 12 is a block diagram of an example embodiment of a data selector in accordance with aspects described herein.

FIG. 12 is a block diagram of an example embodiment 1200 of a data selector 1110. Data selector 1110 receives information output 1105, which includes measured data. Analysis component 1205 can exploit heuristic reasoning implemented via algorithms retained in algorithm(s) memory element 1224 to distinguish behavioral aspects of received data associated with a set of variables, and implement variable selection. Part of the heuristic reasoning includes determination of variables that exhibit at least one of substantial variation, moderate variation, or low variation. In an aspect, variables that exhibit low variation can be discriminated since the low variation can evidence a lack of sensitivity to conditions under which a specific process (e.g., chemical vapor deposition of an advanced optical device, or plasma-enhanced chemical vapor deposition of thin-film transistors (TFTs) employed in flat panel display active matrix arrays) is conducted. Heuristic reasoning also facilitates organization of a set of variables in accordance with an observed variation of each variable in the set of variables.

In addition, analysis component 1205 can implement various approaches for variable or parameter selection: (1) Universal selection. Substantially all, or all, variables other than a reference variable are adopted as influencing variables. (2) Semi-universal selection. Once a target or reference variable is selected, substantially all variables that can affect to substantially any, or any, degree the target variable are selected as influencing variables; e.g., all variables associated with electricity units such as ohm, farad, ampere, and so on, can be selected when the reference variable also is a member of a set of all variables associated with electrical units. (3) Knowledge based selection. Variables related with a target variable through theory and simulation(s) are selected as influencing variables of the target variable. In addition, variables can be selected according to one or more recipes employed to produce a set of assets (e.g., assets 328). As an alternative, or in addition, to the latter, variables that do not posses predetermined settings in a recipe can be selected as a block of influencing variables. Analysis component 1205 can access memory 1220 in order to retrieve information associated with at least one of production recipes, calibration recipes, or maintenance recipes that are retained in recipe(s) storage 1222. (4) Empirical selection. Variables that exceed specific thresholds for correlation coefficients or substantially any other statistical metric are selected as influencing variables. In an aspect the thresholds can be configured at least in part by an actor (e.g., an operator of a deployed tool) or autonomously by a reference tool based at least in part on reference data 1119. (5) Actor driven selection. An operator of equipment, or tools and components associated with the equipment such as an electron beam gun, can determine specific reference variable(s) 1124 and influencing variable(s) 1122 thereof. In an aspect, to implement this modality of variable selection, interface component 1107 can be utilized; it should be appreciated that interface component 1107 is functionally coupled to data selector 1110. Such interface component 1105 can allow a tool operator or a computerized actor, e.g., a welding robot or an assembly robot, to select reference and influencing variables. It should be noted that computerized actors can effect variable selection for self-diagnosis or as part of monitoring routine(s) implemented by a third party.

An aggregation component 1210 can aggregate data received from disparate tools and associated instruments, or equipment, such as operation chambers (e.g., a deposition chamber, a clean chamber for wafer analysis, a chamber for lithographic etching, photolithographic etching, a chamber for cleaning steps in advances deposition processes, and so on) or other operational facilities or entities, in order to produce a pool of data (e.g., operation data 1117 or reference data 1119) and variables (e.g., variables store 1120). Such aggregation can facilitate analysis of tool performance or instrument performance when probed under disparate conditions, especially when a DOE is conducted to assess impact of a predetermined set of reference variables under various influencing variables. It is to be noted that aggregation component 1210 can convey data to operation data storage 1117 and reference data storage 1119.

Figure 13:
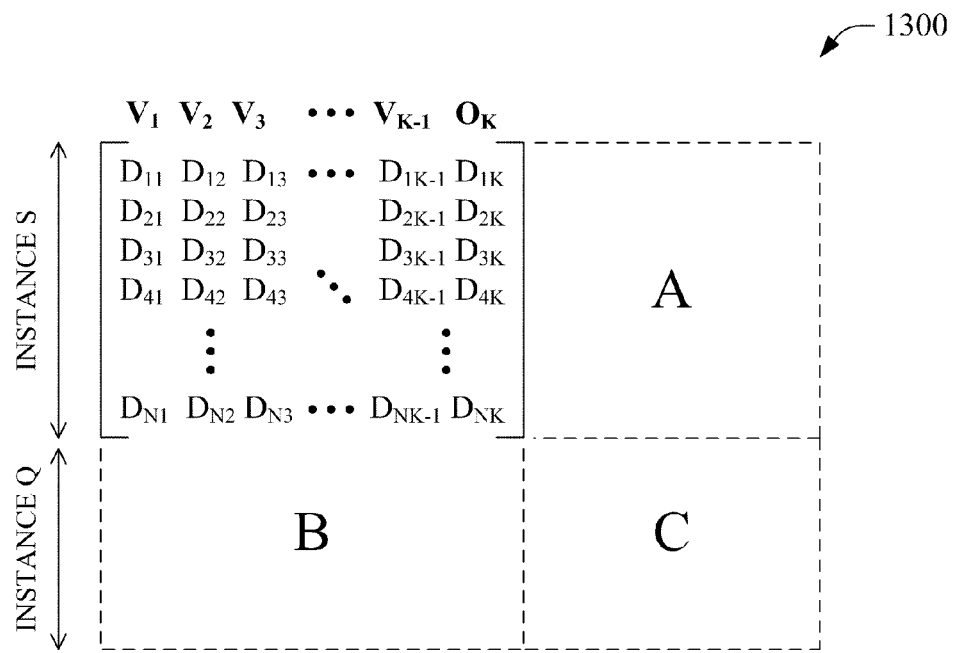
FIG. 13 illustrates a data matrix on variable space as formatted through a component in a data selector in accordance with aspects described herein.

In example embodiment 1200 of data selector 1110, aggregation component 1210 can exploit a formatter component 1215 that can generate a set of data structures (e.g., matrices, vectors . . . ) that convey reference data 1119 and operation data 1117 associated with a set of selected influencing variables and a set of one or more predetermined, or distinguished, reference variable(s). As an illustration, FIG. 13 presents a diagram of an example data matrix on variable space as formatted via formatter component 1215. The variable space is spanned by a set of influencing variables $\{V_\lambda\}$, with $\lambda=1, 2 \ldots K-1$, and reference variable $O_K$, with K a positive integer. Received data $D_{v\mu}(v, \mu=1, 2, \ldots K)$, e.g., production data, calibration data, or maintenance cycle data, associated with variables $\{V_\lambda\}$ and $O_K$ is generated for a specific instance S, wherein an instance can be one or more steps in a set of one or more recipes; when multiple steps comprise an instance, the steps can be contiguous or disjointed. Furthermore, an instance also can include data at the recipe step level, wafer level, lot level, and so forth. Further yet, an instance can comprise data averaged over multiple steps related to a production cycle (e.g., wet-clean cycle) for several production cycles. Still further, an instance can comprise data generated through a set of one or more tools. In an aspect, when data from disparate tools or manufacturing chambers or other operational facilities or entities are aggregated, matrix representation 1300 can span additional instances (e.g., instance Q) for the same set of variables (e.g., matrix block B). Additionally, the variable space can be expanded when data is aggregated; in such scenario the matrix representation adds matrix data blocks A and C. It is noted that new matrices can be generated as a result of data updates that occur as time progresses in a production run, e.g., wafer manufacturing, TFT active matrix array manufacturing, or a prescheduled maintenance.

It should be appreciated that formatter component 1215 can generate a matrix representation 1300 for training data (training matrix) and operation data (termed herein "apply matrix"). Generation of an apply matrix can be conducted for production data at the wafer level (e.g., a wafer run for each recipe run on a set of tools, a photolithographic etch run associated with deposition of a TFT); recipe level or recipe step level effected in one or more tools; lot level (e.g., a lot run for each recipe run on one or more tools); PM interval level or wet-clean cycle associated with a group of tools; or substantially any, or any, other level of production or time granularity. Production data utilized at the various levels of production for which one or more apply matrices are generated can be produced from a tool or a group of tools that carry out one or more recipes. Moreover, the production data included in generation of an apply matrix can span all available data for one or more tool, even though a portion of such data is directed to training data. Formatter component 1215 can generate "apply matrices" for each tool that produces an asset and conveys associated data in information input/output 1105, wherein a set of tools for which the apply matrices are generated need not be included in a training set of tools. It is to be noted that apply matrices and training matrices can be generated over time, e.g., continuously in real-time, nearly-continuously in real-time, or at predetermined steps, as asset production (e.g., manufacturing) proceeds. A training matrix and an apply matrix can be stored, respectively, in operation data storage 1117 and reference data storage 1119.

Figure 14:
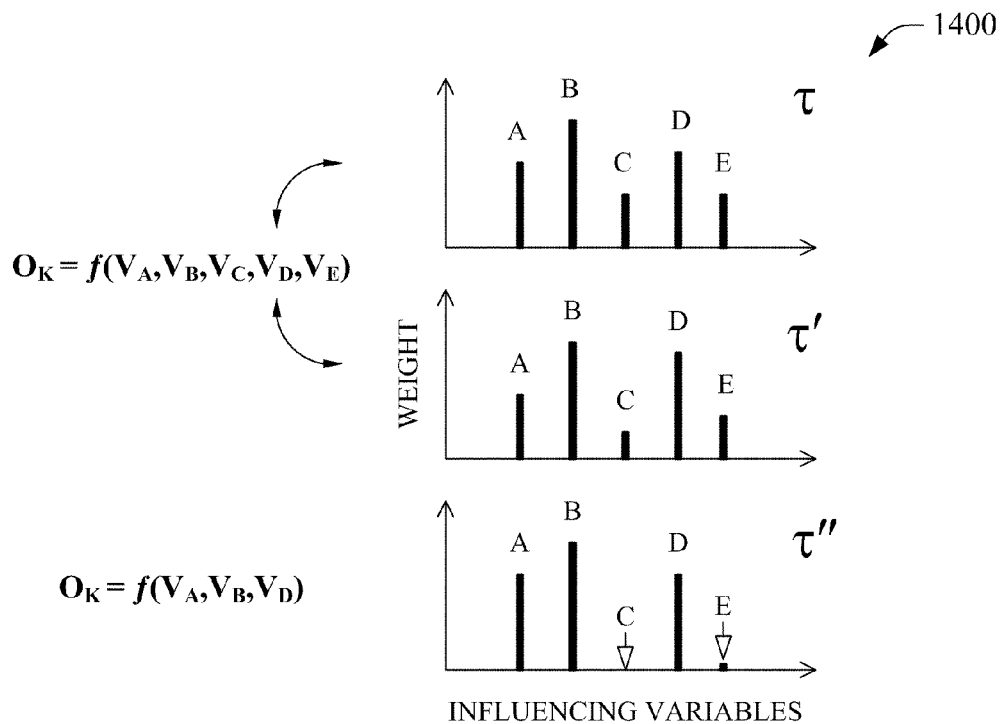
FIG. 14 illustrates time evolution of weights of five influencing variables for a specific reference variable in accordance with aspects described in the subject specification.

As discussed supra, reference data is conveyed to the autonomous biologically based learning engine 360 which can generate, through autonomous learning as described hereinbefore and received reference data, a mathematical relationship $f_I$ for each selected reference variable $O_I$ in reference variable(s) 1124, with I a positive integer. In addition, $f_I$ can be autonomously learned from received production data for one or more production recipes. As an example, the learned mathematical relationships can be a non-linear equation. The data can be conveyed in matrix representation (e.g., representation 1300). In another aspect, an $f_I$ relationship can be determined via genetic algorithm, even though other approaches such as Monte Carlo simulations or simulated annealing can be employed to identify $f_I = f_I(V_1, V_2 K V_{I-1})$. It is to be noted that as the matrix representation is spanned through instances, and instances can explicitly include elapsed time interval within a recipe step or various recipe steps, time also can be employed as an influential variable. Thus, for a reference variable $O_K$, autonomous biologically based learning engine 360 can infer a mathematical relationship such as $O_K = f(t; V_1, V_2 K V_{K-1})$. As an illustration, FIG. 14 presents a diagram 1400 of evolution (e.g., time evolution) of weights of five influencing variables: $V_A, V_B, V_C, V_D, V_E$ that influence reference variable $O_K$. While at instants $\tau$ and $\tau'$ the weights of all variables are significant, at instant $\tau''$ the weight of influencing variables $V_C$ and $V_E$ become substantially negligible when compared to the weight of their counterparts. Autonomous biologically based learning engine 360 can eliminate from a learned relationship those influencing variables with substantially zero, or zero, weight over time and thus do not influence output values for a reference variable. Upon elimination of an influencing variable with relative negligible weight, a learned mathematical function can be autonomously adjusted in order to account for variable removal. It is further noted that autonomous biologically learned engine 360 can learn a mathematical relationship among a reference variable and influencing variables, which can include time, for at least one of a single step in a recipe, a group of contiguous steps in a recipe, a group of non-contiguous steps in a recipe, or all steps in a recipe.

In an aspect, one or more processors (not shown) can be configured to confer, and confer, at least in part, the functionality of data selector 1110, and components therein, described hereinbefore. To confer such functionality, the one or more processors (not shown) can execute code instructions (not shown) stored in memory 1220 to provide the described functionality of data selector 1110 and component therein.

Figure 15:
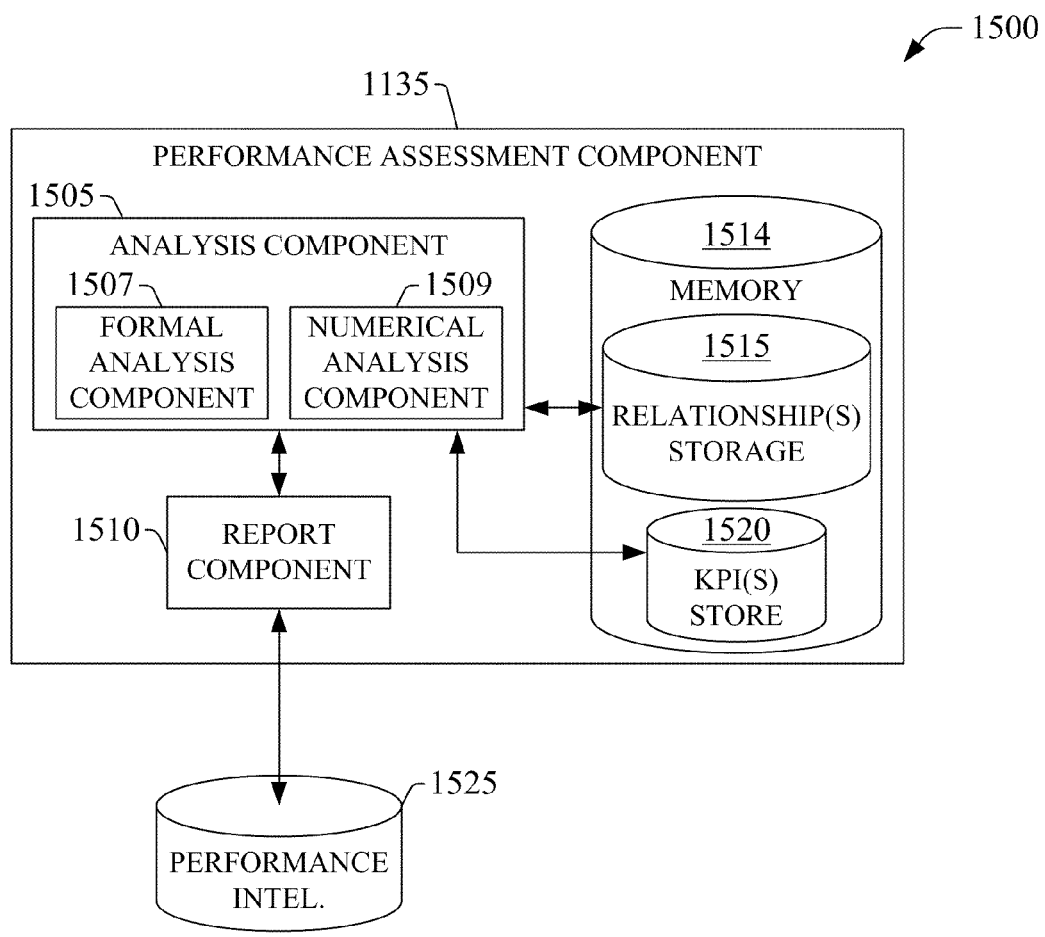
FIG. 15 is a block diagram of an example embodiment of a performance assessment component in accordance with aspects described herein.

FIG. 15 is a block diagram of an example embodiment 1500 of a performance assessment component 1135. In embodiment 1500, analysis component 1505 processes received data knowledge 1130, which includes a learned formal expressions of a reference variable (e.g., $O_K$) in terms of a set of influencing variables $\{V_\lambda\}$. Received relationship(s) are retained in a relationship(s) storage 1515, which also can retain training and apply matrices; retained training matrices can be received through data knowledge 1300, while apply matrices can be received through or gathered from operation data 1117 storage. Training matrices can be received for a set of reference tools or parts thereof (e.g., chambers) for a set of recipes, while received apply matrices can supply production data for one or more non-reference tools. Training matrices and apply matrices can be received continuously or nearly-continuously, or at scheduled intervals as production (e.g., manufacture) progresses and production data is generated. The scheduled intervals can be dictated by the granularity at which the apply matrices are generated. It should be appreciated that the received formal expression f is associated with a received training matrix and one or more related apply matrices, wherein f is employed to generate predictions for each of the one or more apply matrices. It is noted that apply matrices and training matrices are received at the level of granularity determined by formatter component 1215. Analysis component 1505 can contrast training matrices and apply matrices in order to determine a level of performance, or level of degradation or mismatch, of source(s) of operation data 1117. To at least that end, analysis component 1505 can compute value(s) of a reference variable as a function of measured values for a selected set of influencing variables in accordance with the learned mathematical relationship f among the reference variable and the selected set of influencing variables. In an aspect, analysis component 1505 can exploit the granularity at which training matrices are received in order to determine differences among predictions and reference data from a reference chamber at least one of the recipe step level, wafer level, TFT level, lot level, active matrix TFT array level, or PM interval level. In addition, analysis component 1505 can employ training matrices received over a predetermined production time interval to determine operation performance of a reference tool or instrument thereof.

Analysis component 1505 can exploit a formal analysis component 1507 and a numerical analysis component 1509 to summarize the differences among data in a training matrix and one or more apply matrices. Such components can rely at least in part on a manifold of statistical functions such as mean, standard deviation and higher momenta, maximum difference, and minimum difference that quantitatively describe one or more distribution of differences; e.g., define an expected magnitude of a difference among a reference variable and related prediction that arises form an associated learned function f. In an aspect, such statistical functions can be implemented via, for example, an autobot component 540, or a processor therein, of the statistical-mechanics type. It is to be noted that at least a portion of reference data 1119 as represented in a training matrix also can exhibit differences among predicted values, as computed via an autonomously learned mathematical function, and actual data. Likewise, production data formatted as one or more apply matrices can display differences with respect to predictions based at least in part on a mathematical function autonomously learned from reference, or training, data. Analysis component 1505 also can determine such differences and generate one or more summaries thereof via statistical functions described above. Additionally, analysis component 1505 can compare summary(ies) for training-matrix differences with summary(ies) for apply-matrix differences, and employ such a comparison to establish abnormal change(s) among the summary(ies) associated with the training-matrix differences and the summary(ies) related to apply-matrix differences. Abnormal change(s) can include at least one of a magnitude shift above a threshold or a magnitude shift based at least in part on a percentage change. The threshold can be configurable and supplied, for example, by an actor. Percentage change can be assessed against a specific metric that characterizes one or more summaries of differences; for instance, a 20% or 10% excess in the mean error of differences in apply-matrix data with respect to mean error of differences in training-matrix data can indicate an abnormal change. It should be appreciated that specific magnitude of percentages can be configurable and determined, for example, by an actor. Similarly, abnormal change(s) can be determined with respect to variation shifts assessed against a configurable threshold or percentage change; as an example, an abnormal change can be established when the standard deviation of respective summarized differences for apply-matrix data and training-matrix data for a set of matrices is above threshold, e.g., 3.1, or above a predetermined percentage, e.g., 5% above 3.

In an aspect of the subject innovation, performance degradation of a set of tools or performance mismatch among tools in a set of tools can be profiled according to a relevancy profile of influencing variables, wherein the relevancy profile arises from a sensitivity analysis of performance. Such sensitivity analysis can be effected by performance assessment component 1135 and conducted, for example, through a computation of a variation $\Delta f$ of the output of learned mathematical relationship f when a single influencing variable in a selected set of influencing variables is varied at a time, wherein the variation can be a definite percentage change (e.g., 5%) of the single influencing variable. Alternatively, or additionally, sensitivity analysis can be conducted through computation of a numeric partial derivative of the learned mathematical function $f$ with respect to a single influencing variable in the selected set of influencing variables. As an example, a relevancy profile can include a ranking of influencing variables as measured through the magnitude of $\Delta f$ or $(\partial f/\partial V_L)$, with $V_L$ an influencing variable in a selected set of influencing variables; L is a positive integer. It is to be noted that formal analysis component 1507 can determine at least in part a ranking of influential variables through at least one of unsupervised theorem proving algorithms or expression analysis. Likewise, numerical analysis component 1509 can numerically compute a gradient vector $\nabla f$ of $f$ for a set of associated influencing variables, and establish a relevancy ranking from such computation based at least in part on the magnitude of component of $\nabla f$. It is noted that computation of partial derivatives, with respect to selected influencing variables, of a manifold of learned functions $\{f\}$ also can be employed to determine a ranking, or hierarchical metric, for the selected influencing variables; for instance, for each influencing variable, the hierarchical metric can be equal to the product of the number of learned functions that exhibit a non-zero partial derivative when taken with respect to the influencing variable and the average of the normalized value of the influencing variable influence. It should be appreciated that such hierarchical metric is pseudo-global and includes results for all learned functions $f$ that describe a relationship among a selected reference variable and a selected set of influencing variables.

It is noted that similarly to computation of a relevancy profile for influencing variables, analysis component 1505 can exploit a set of received learned relationship(s), e.g., a set of one or more functions $\{g\}$, retained in relationship(s) storage 1515, to compute a functional relevancy profile. Such profile is substantially the same as a relevancy profile for influence variables, but it is determined in the space of learned functions {g}. In case of a degradation or mismatch event, as established through substantially any, or any, type of threshold to assess performance, e.g., key performance indicator (KPI), quality of service (QoS), or the like, a functional relevancy profile can facilitate analysis component 1505 to identify the source of such event, and report such source via, for example, report component 1510.

In embodiment 1500, analysis component 1505 can exploit a set of key performance indicators, retained in KPI(s) store 1520, and predetermined thresholds associated therewith to determine whether performance of one or more tools is abnormal, as determined through computed differences among measurements and predicted values calculated through measured magnitudes of influencing variables, via learned mathematical relationship $f_I$ of a reference variable $O_I$. It is noted that substantially any, or any, performance metric and related thresholds can be employed instead of KPIs and thresholds associated therewith. When an abnormal performance event, or degradation event, is determined, analysis component 1505 can generate a tool-degradation time stamp. Moreover, analysis component 1505 can utilize one or more apply matrices associated with production data that reveal abnormal performance in order to identify a degraded source of data, e.g., a tool, instrument, or equipment component; the source of data is a non-reference source of data. Predetermined threshold(s) can be configurable and established based at least in part on at least one of expected or historical performance of a set of one or more assessed tools. As an example, a KPI can enable determination of performance degradation as abnormal when a difference among a mean value for a difference among prediction and calculation for a training matrix and apply matrix exceeds an actor supplied threshold. As another example, a KPI can allow determination of abnormal tool deterioration or degradation when a mean error of difference for an apply matrix exceeds a mean error for differences for a training matrix representation by 10-20% or any other predetermined percentage. Likewise, a KPI or substantially any performance metric can determine abnormal tool degradation has occurred when variations of differences among training and apply matrices as summarized by a standard deviation, for example, exceeds an initial (e.g., at a time shortly after a tool or set of tools is calibrated and deployed) standard deviation value. It should be appreciated that KPI(S) can be established by an actor, by using interface component 1107, for example. An initial set of KPI(S) can be refined based on historical inferred assessment of performance of one or more tools, as determined at least in part through performance assessment component 1135 in at least partial conjunction with autonomous biologically based learning engine 360.

It should be appreciated that KPIs in KPI(S) store 1520, or substantially any, or any, performance metric, can be employed for determination of abnormalities of tool performance regardless whether the performance that is assessed is the performance of one or more production tools, or performance with respect to a standard or reference tool, instrument, or unit of equipment.

A report component 1510 can summarize differences among a predicted value for a reference variable and a value determined through actual operation data for influencing variables associated with the reference variable. In addition, report component 1510 can convey such summarized differences or any other metric(s) for performance degradation, as part of performance summary(ies) 1145, for example. In an aspect, performance summary(ies) 1145 can convey (e.g., through a display interface) a ranking of influencing variables ordered from most influential to least influential. It should be appreciated that a ranking ordered from least influential to most influential also can be conveyed via performance summary(ies) 1145. Moreover, a report component can retain temporal indication(s), e.g., one or more time stamps, of abnormal performance of one or more tools, or mismatched performance among an operational tool and a reference tool; the temporal indication(s) generated by analysis component 1505 based at least in part on computed differences among observed data and predicted values of one or more reference variables. For instance, report component 1510 can store information associated with a series of abnormal deterioration of performance events, and mismatched performance events. Content generated on abnormal performance events (e.g., a track record of events and a relevancy profile for influencing variables) for either degradation of a set of tools or mismatch among tools in a set of tools, can be retained in performance intelligence memory element 1525.

In an aspect, one or more processors (not shown) can be configured to confer, and confer, at least in part, the functionality of performance assessment component 1135, and component therein, described hereinbefore. To confer such functionality, the one or more processors (not shown) can execute code instructions (not shown) stored in memory 1514 to provide the described functionality of performance assessment component 1135 and components therein.

Figure 16A:
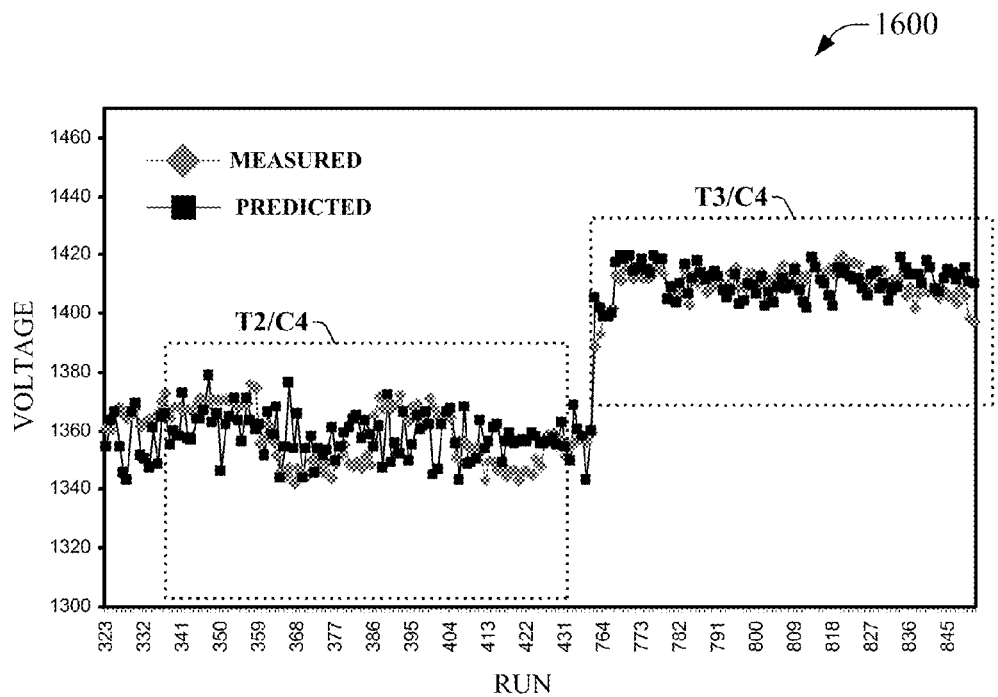
FIGS. 16A-16D illustrate measured data and predicted values, via autonomous objective learning as described herein, for example reference variables for various tools and associated chambers.

FIG. 16A illustrates a chart 1600 of example measured data and predicted values for a reference variable, e.g., voltage, in a reference chamber for two disparate tools for a series of production runs. In this example, the reference variable is a lower voltage in a wafer production process. Two disparate tools (e.g., T2 and T3) utilize the same chamber (e.g., C4) in disparate sets of runs, as illustrated with dotted-line and dashed-line boxes. As it is appreciated from the chart 1600, there is substantial agreement between the measured (grey diamond symbols) reference variable and the value of the reference variable predicted (black square symbols) after learning a functional relationship among the reference variable and influencing variables. Universal selection of variables was utilized for objective learning of the reference variable (e.g., voltage) in this example.

Figure 16B:
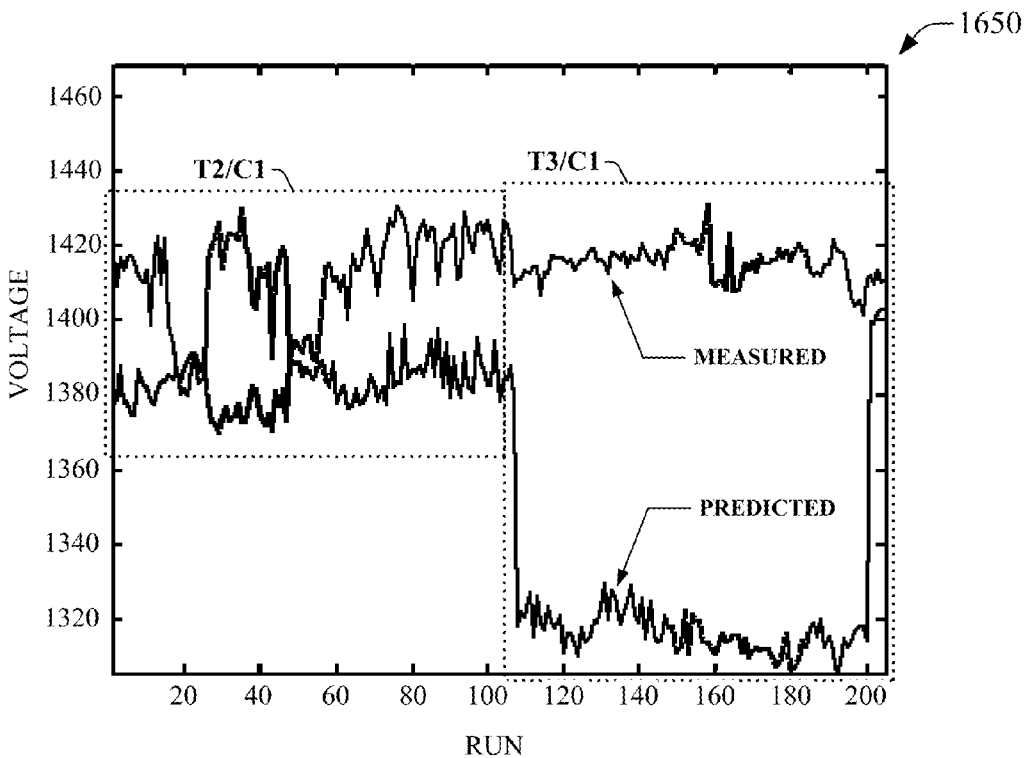

FIG. 16B illustrates a chart 1650 of example measured data and predicted values for a reference variable, e.g., voltage, in a non-reference chamber for two disparate tools, which are the same as those employed with the reference chamber of chart 1600, for a series of production runs. It should be appreciated that predicted values of the reference variable are in disagreement with measured values of both tools, e.g., T2 and T3, for the subject chamber (e.g., C1). Particularly, operation of tool T3, e.g., distinguished with a dotted-line box, is such that the there is a substantial disagreement among the measured values and predicted values of the reference variable. It should also be appreciated that the substantial discrepancy includes a change in phase with respect to the production run index after about run number 105. Universal selection of variables was utilized for objective learning of the reference variable (e.g., voltage) in this example.

It should further be noted that any scheme that is based on observing, or monitoring, measured value(s) can miss a possible underlying tool performance degradation issue. As an example, a current sensor (e.g., measurement in ampere) on a tool (e.g., tool T2, or tool system 310) may be damaged but the true magnitude of the current is not in error, thus a measured voltage is not observed to be in error. However, the sensor error for the current sensor (e.g., a sensor that is part of sensor component(s) 325) is masked when attention is focused on the observed value of the output voltage as it is performed with Shewhart charts or other conventional, simple statistics-based approaches (e.g., cumulative sum, exponentially weighted moving average, range charts . . . ) to performance control and monitoring. In an aspect, the subject innovation allows recognition of errors in at least one of dependent variable(s) (e.g., voltage) or independent variable(s) (e.g., current) that are missed in conventional means of monitoring or assessment of tool performance.

Figure 16C:
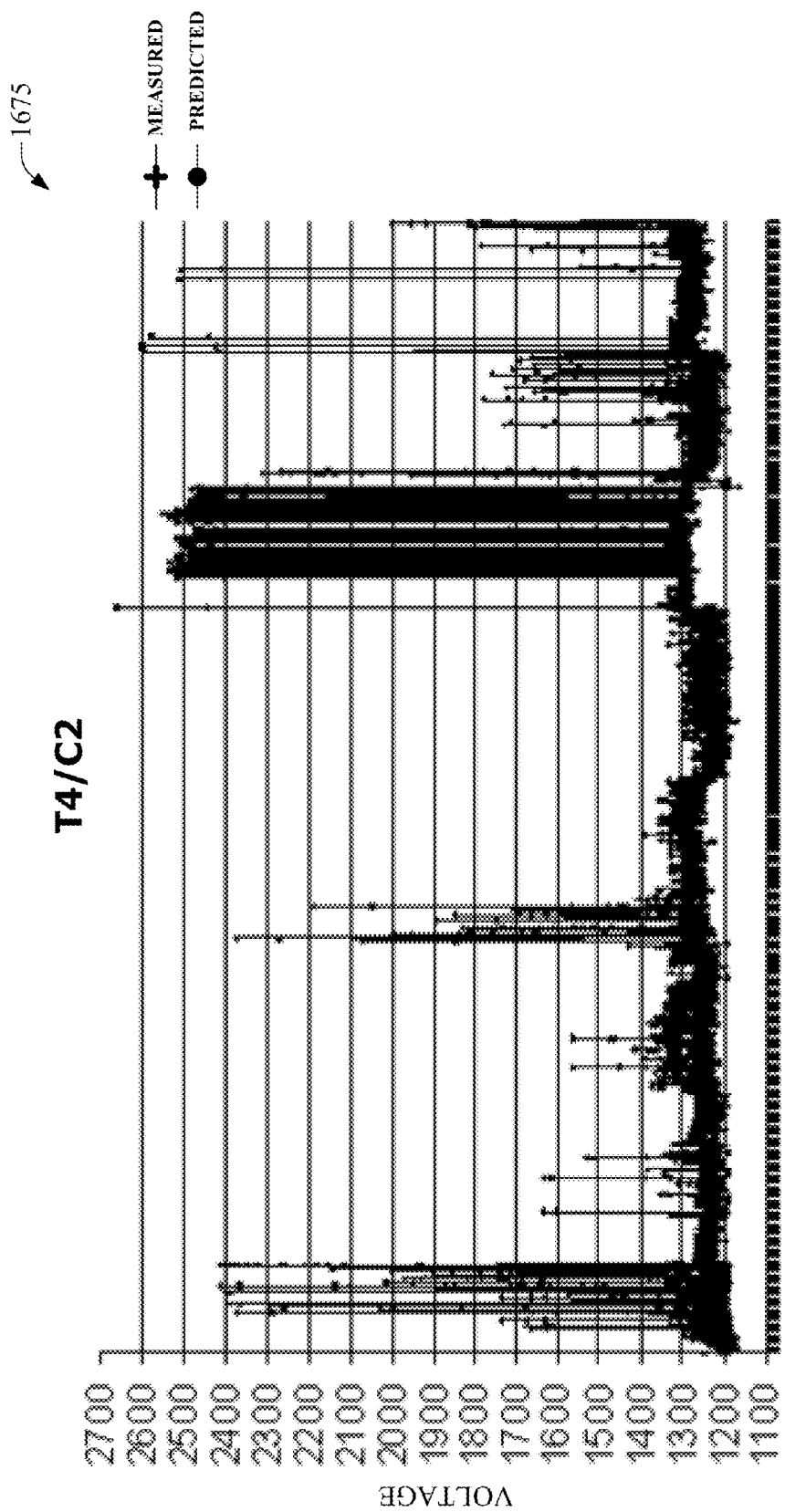
Figure 16D:
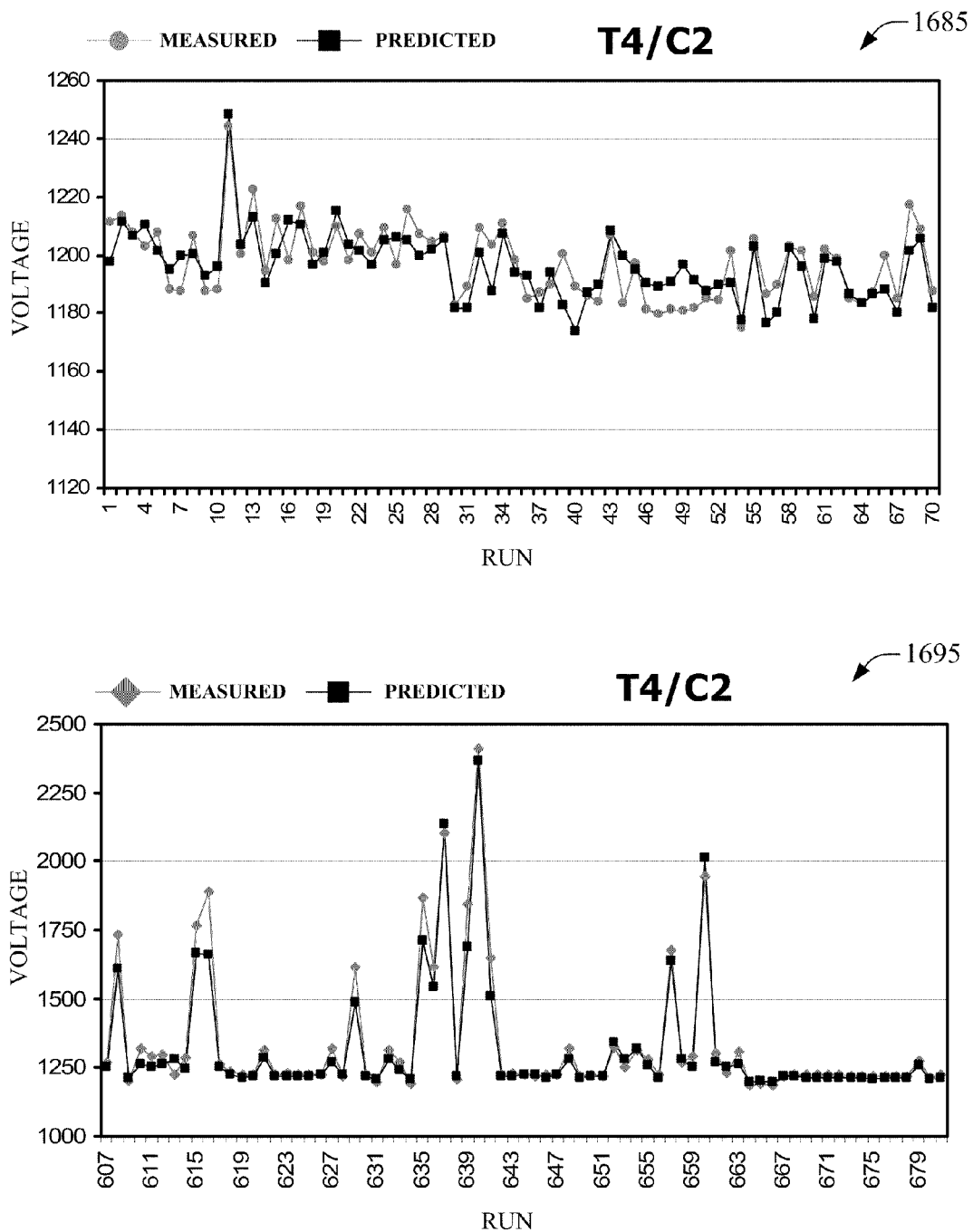

FIG. 16C illustrates a chart 1675 of example measured data and predicted values, as autonomously learned from a selected set of data for a reference variable, e.g., voltage, in a single tool and single chamber. It is noted that the voltage considered as reference variable in chart 1675 is different from the voltage reference variable of charts 1600 and 1650. Predicted values are determined through a learned relationship among the reference variable and influencing variables selected via empirical selection as described hereinbefore. In particular, selected influencing variables present a correlation of at least 0.4. Data employed as reference data includes 10% of all data gathered in a set of two tools, including tool T2, and a set of three chambers; at least a portion of the three chambers employed in each tool in the set of tools. Measured data extracted for the reference variable is well reproduced by the predicted values. Dual mode operation, e.g., set(s) of runs at high voltage and set(s) or runs at lower voltage, revealed by the data (measured values represented by circle symbols) is adequately described by predicted values (cross symbols) through an autonomously, objectively learned function of the selected influencing variables. It is noted that prediction of dual mode operation arises from the autonomously, objectively learned relationship among the reference variable and selected influencing variables and actual measured magnitudes thereof, rather than externally introducing dual-mode type operation during learning of the functional relationship. Example chart 1685 in FIG. 16D illustrates a detail of predicted values and measured values for lower-voltage mode of operation. Likewise, chart 1695 illustrates a detail of predicted values and measured values for lower-voltage and high-voltage mode of operation. As indicated above, agreement between autonomous predictions and data is substantial.

In view of the example systems presented and described above, a methodology that may be implemented in accordance with the disclosed subject matter, will be better appreciated with reference to the flowchart of FIGS. 17-21. While, for purposes of simplicity of explanation, the methodologies are shown and described as a series of blocks, it is to be understood and appreciated that the disclosed aspects are not limited by the number or order of acts, as some acts may occur in different orders and/or concurrently with other blocks from what is depicted and described herein. Moreover, not all illustrated acts may be required to implement the methodologies described hereinafter. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices for execution, and thus implementation, by at least a processor or processing unit or platform. It is to be understood and appreciated that a methodology could alternatively be represented as a series of interrelated states or events, such as in a state diagram.

FIG. 17 presents a flowchart of an example method 1700 for biologically based autonomous learning with contextual goal adjustment. An adaptive inference engine (e.g., 110), or one or more components functionally coupled thereto, can implement at least in part the subject example method 1700. Alternatively or in addition, a processing platform and functional unit(s) or processor(s) therein that confer functionality to the adaptive inference engine or the one or more components functionally coupled thereto also can implement at least in part the subject example method. At act 1710 a goal is established. A goal is an abstraction associated with a functionality of a goal component that is employed to accomplish the goal or objective. A goal can be multi-disciplinary and span various sectors (e.g., industrial, scientific, cultural, political, and so on). Generally act 1710 can be executed by an actor that can be external, or extrinsic, to a goal component (e.g., 120) that can be coupled to a learning system (e.g., adaptive inference engine 110). In view of the multidisciplinary nature of a goal, a goal component can be a tool, device, or system that possesses multiple functionalities; for instance, a tool system (e.g., tool system 310) that performs a specific process, or a device that provides with a specific outcome to a set of requests, or the like. At act 1720 data is received. Such data can be intrinsic, e.g., data generated in a goal component (e.g., component 120) that pursues a goal. In an aspect, as a part of performing the specific process, a set of sensors or probes associated with the tool can gather the data that is received in an adaptive intelligent component. Received data can also be extrinsic, such as data conveyed by an actor (e.g., actor 390), which can be a human agent or a machine with embedded intelligence or otherwise. Extrinsic data can be data that is utilized to drive a process or, generally, to drive an accomplishment of a specific goal. A human agent can be an operator of the tool system, and can provide instructions or specific procedures associated with the processes performed by the tool. An example of an actor can be a computer performing a simulation of the tool system, or substantially any goal component. It should be appreciated that simulation of the tool system can be employed to determine deployment parameters for the tool system, or for testing alternative conditions of operation for the tool (e.g., conditions of operations that can pose a hazard to a human agent, or can be costly). The received data can be training data or production data associated with a specific process (e.g., deposition of a matix of TFTs that are part of a flat panel display active matrix), or generally a specific code.

In a further aspect, the received data can be associated with data types or with procedural, or functional, units. A data type is a high level abstraction of actual data; for instance, in an annealing state in the tool system a temperature can be controlled at a programmed level during the span of the annealing cycle, the time sequence of temperature values measured by a temperature sensor in the tool system can be associated a sequence data type. Functional units can correspond at least in part to libraries of received instructions, or processing code patches that, when executed at least by a processor or processing platform, manipulate data necessary for the operation of the tool or for analyzing data generated by the tool. Functional units can be abstracted at least in part into concepts related to the specific functionality of the unit, with the functionality conferred at least by a processor; for example, a multiplication code snippet can be abstracted into a multiply concept. Such concepts can be overloaded, in that a single concept can be made dependent on a plurality of data types, such as multiply (sequence), multiply (matrix), or multiply (constant, matrix). Moreover, concepts associated with functional units can inherit other concepts associated with functional units, like derivative (scalar_product (vector, vector)) which can illustrate a concept that represents a derivative of a scalar product of two vectors with respect to an independent variable. It should be appreciated that functional concepts are in direct analogy with classes, which are in themselves concepts. Furthermore, data types can be associated a priority and according to the priority can be deposited in a semantic network. Similarly, functional concepts (or at least part of autobots; see FIG. 6B), can also be associated with a priority, and deposited in a disparate semantic network. Concept priorities are dynamic, and can facilitate concept activation in the semantic networks.

At act 1730 knowledge is generated from the received data, which can be represented in semantic networks, as discussed above. Generation of knowledge can be accomplished by propagating activation in the semantic networks. Such propagation can be determined by a situation score assigned to a concept in addition to a score combination. In an aspect, score combination can be a weighted addition of two scores, or an average of two or more scores. It should be appreciated that a rule for score combination can be modified, depending on at least one of tool system conditions or information input received from an external actor. It should be appreciated that a priority can decay as time progresses to allow concepts that are seldom activated to became obsolete, allowing new concepts to become more relevant.

The generated knowledge can be retained in a memory, and employed as actionable information; for instance, a steady-state pressure in a deposition step can be cast as a precise, well-defined mathematical function (e.g., a single-valued function with all parameters that enter the function deterministically assessed, rather than being stochastic or unknown) of two independent variables like steady-state flow and steady-state exhaust valve angle. Alternatively, or in addition, pressure during transition can be cast as a function of independent variables and/or parameters or alternatively, or pressure during execution of a recipe (e.g., photolithographic etching of a TFT structure in a FPD (plat panel display) pixel), wherein all time instances are included, can be cast as a function of other measured variables/parameters during execution of the recipe.

At act 1740 the generated knowledge is stored for subsequent utilization of the autonomous tool and for the generation of further knowledge. In an aspect, knowledge can be stored in a hierarchy of memories. A hierarchy can be determined on the persistence of knowledge in the memory and the applicability of knowledge for creation of additional knowledge. In an aspect, a third tier in the hierarchy can be an episodic memory (e.g., episodic memory 530, or awareness episodic memory 740), wherein received data impressions and knowledge can be collected. In such a memory tier manipulation of concepts is not significant, the memory acting instead as a reservoir of available information received from a tool system or an external actor. In an aspect, such a memory can be identified as a meta-database, in which multiple data types and procedural concepts can be stored. In a second tier, knowledge can be stored in a short term memory wherein concepts can be significantly manipulated and spread activation in semantic networks can take place. In such a memory tier, functional units or procedural concepts operate on received data, and concepts to generate new knowledge, or learning. A first tier memory can be a long term memory (e.g., LTM 510) in which knowledge is maintained for active utilization, with significant new knowledge stored in this memory tier. In addition, knowledge in a long term memory can be utilized by functional units in short term memory (e.g., 520).

At act 1750 the generated or stored knowledge is utilized. Knowledge can be employed to (i) determine a level of degradation of a goal component (e.g., tool system 310) by identifying differences based on stored knowledge (data and procedures) and newly received data (see self-awareness component 550), wherein the received data can be extrinsic (e.g., input 130) or intrinsic (e.g., a portion of output 140); (ii) characterize either extrinsic or intrinsic data or both, for example by identifying data patterns or by discovering relationships among variables (such as in a self-conceptualization component 560), wherein the variables can be utilized to accomplish the established goal; or (iii) generate an analysis of the performance of the tool system that generates the data (e.g., self-optimization component 570), providing indications of root cause for predicted failures or existing failures as well as necessary repairs, or triggering alarms for implementing preventive maintenance before degradation of the tool system causes tool failure. It is to be noted that utilization of the stored and generated knowledge is affected by the received data—extrinsic or intrinsic—and the ensuing generated knowledge.

Act 1760 is a validation act in which the degree of accomplishment of a goal can be inspected in view of generated knowledge. In case the established goal is accomplished, example method 1700 can end. Alternatively, if the established goal has not been accomplished, the established goal can be reviewed at act 1770. In the latter, flow of method 1700 can lead to establishing a new goal in case a current goal is to be revised or adapted; for instance, goal adaptation can be based on generated knowledge. In case no revision of a current goal is to be pursued, flow of method 1700 is returned to generate knowledge, which can be utilized to continue pursuing the currently established goal.

FIG. 18 presents a flowchart 1800 of an example method for adjusting a situation score of a concept associated with a state of a goal component. An autonomous biologically based learning engine (e.g., 360), and one or more components functionally coupled thereto, can implement at least in part the subject example method 2100. Alternatively or in addition, a processing platform (e.g., 385) and functional unit(s) or processor(s) therein, that confer functionality to the autonomous biologically based learning engine or the one or more components functionally coupled thereto also can implement at least in part the subject example method. At act 1810 a state of a goal component is determined. A state typically is established through a context, which can be determined by various data input (e.g., input 130), or through a network of concepts associated with the input and exhibiting specific relationships. The input data relates to a goal that is pursued by the goal component; for instance, a recipe for a coating process of a specific thin-film device, such as a TFT, can be deemed as input associated with a "deposit an insulating device" goal. At act 1820 a set of concepts that can be applied to the state of the goal component is determined. Such concepts can be abstractions of data types entered in act 1810, or can be existing concepts in a memory platform (e.g., long term memory 510, or short term memory 520). Generally, functional concepts that can act, via at least a processor or a processing unit, on descriptive concepts (e.g., concepts with no functional component) can be utilized more frequently towards achieving a goal. At act 1830 a situation score for each concept in a set of concepts associated with the goal state is determined. A set of situation scores can establish a hierarchy for concept utilization or application, which can determine the dynamics of a goal, like goal adaptation or sub-goal creation/randomization. Adjustment of situation scores for specific concepts can drive goal accomplishment as well as propagation within a space of goals as part of goal adaptation.

FIG. 19 presents a flowchart 1900 of an example method for generating knowledge through inference. An autonomous biologically based learning engine (e.g., 360), and one or more components functionally coupled thereto, can implement at least in part the subject example method 1900. Alternatively or in addition, a processing platform and functional unit(s) or processor(s) therein that confer functionality to the autonomous biologically based learning engine or the one or more components functionally coupled thereto also can implement at least in part the subject example method. At act 1910 a concept is associated to a data type and a priority for the concept is determined. Priorities typically can be determined based on a probability of utilization of a concept, or a concept's weight. Such a weight can be determined through a function (e.g., a weighted sum, an arithmetic average, or a geometric average) of parameters that can represent the ease to utilize a concept (e.g., the complexity to operate on a data type), such a parameter can be identified with a concept's inertia, and the suitability parameter of a concept to describe a state (e.g., a number of neighboring concepts that can be related to the concept). It should be appreciated that a priority can be time dependent as a consequence of explicitly time-dependent inertia and suitability parameters, or as a result of concept propagation. Time dependent priorities can introduce aging aspects into specific concepts and thus can promote knowledge flexibility (for example, a paradigm employed to pursue a goal, such as a recipe for preparation of a nanostructured device such as for example a TFT in an active matrix array in a FPD) through concepts ceasing to be relevant in a particular knowledge scenario (e.g., node structure in a priority-based knowledge network). At act 1920 a semantic network for a set of prioritized concepts is established. It should be appreciated that the semantic network can comprise multiple sub-networks, wherein each of the multiple networks can characterize a set of relationships among concepts in a class. As an example, in a two-tier semantic network, a first sub-network can represent relationships among concepts derived from data types, whereas a second sub-network can comprise relationships among functional concepts (e.g., a planner autobot or überbot, a conceptual autobot) describing operations that can be utilized to alter upon a data type. At act 1930 the set of priorities is propagated over the semantic network to make an inference and thus generate knowledge associated with the network of concepts. In an aspect, such propagation can be utilized to generate optimization plans for goal adaptation, or to predict failures in a system that pursues a specific goal.

FIG. 20 presents a flowchart of an example method 2000 for learning a relationship among a set of variables associated with production data generated by one or more tools that produce, e.g., manufacture, an asset according to aspects described herein. An autonomous biologically based learning engine (e.g., 360), and one or more components functionally coupled thereto, can implement at least in part the subject example method 2000.) Alternatively or in addition, a processing platform and functional unit(s) or processor(s) therein that confer functionality to the autonomous biologically based learning engine or the one or more components functionally coupled thereto also can implement at least in part the subject example method. At act 2010, a set of data is received; the data associated at least in part with production of one or more assets (e.g., 328). In an aspect, the received data can originate from at least one of a production run, e.g., manufacturing run, implemented in a production tool, equipment, or instrument thereof, or a reference operation effected through a reference tool, equipment, or instrument thereof. As described above, received set of data originated in a production run, e.g., production data, can result from effecting one or more production recipes, such as a recipe to deposit a gate contact for a TFT in an active matrix array, to manufacture one or more assets. In addition, production data can arise from various production or recipe stages, or instances, such as a set of one or more contiguous recipe steps or a set of disjointed recipe steps. The one or more assets can include devices, e.g., semiconductor devices, of varying degrees of complexity; for instance, assets 328 can include plasma-discharge based flat panel display(s) (FPD(s)), organic light emitting diode (OLED)-based FPD(s), liquid crystal display (LCD)-based FPD(s), or elements thereof such as for example thin-film-transistor active matrix array, color filters, polarizers, etc. At act 2020, the received set of data is formatted. In an aspect, as described above, data can be cast into matrix format, with matrices associated with training data, e.g., test manufacturing data, identified as training matrices and matrices composed of production data, e.g., manufacturing run data, identified as apply matrices. Training and apply matrices can be generated, respectively, at various instants during operation of a reference tool, or equipment thereof, and production. In addition, training and apply matrices can be generated at various operation or production instances, such as a step level in one or more recipes, a plurality of steps either contiguous or disjointed in one or more recipes, or the like. In addition training or apply matrices can be generated via received data at the asset level, such as wafer level, or lot level. Moreover, data collected at maintenance cycles, e.g., preventive schedule maintenance, also can be formatted into at least one of a training matrix or an apply matrix.

At act 2030, a set of reference data is selected for a set of variables. The selected reference data can be a portion, e.g., 10% or 20%, of the received data. Selected reference data can originate from at least one of a reference tool or instrument thereof, or a set of production tools. It is noted that the set of tools can include one or more tools, or a tool group that operates as a tool unit. Additionally, selected reference data can include averages of data generated during one or more production instances, or stages; for instance, averages can be at least one of step level averages for each step (e.g., etching step, photolithographic or otherwise) in each recipe in a plurality of recipes employed in production of one or more assets; wafer level averages for each produced wafer in a lot or batch, or any manufacturing volume; lot level averages for each lot produced by one or more tools; TFT-deposition level averages for one or more manufactured active matrix arrays; or wet-clean cycle averages for each wet-clean cycle in a recipe. In an aspect, selection of data can be effected by receiving an actor indication. Moreover, selected reference data can be streamlined from production data, wherein the selected reference data is raw production data collected at a predetermined measurement sampling rate. The raw production data originating from all recipes implemented in production of one or more assets (e.g., a flat panel display), a specific implemented single recipe, or a set of implemented recipes such as deposition recipe(s), photolithography recipe(s) and etching recipe(s). For one or more implemented production recipes, the measurement sampling rate that facilitates data selection can be at least one of a single step, a group of contiguous steps, or all steps in one or more recipes.

At act 2040, a reference variable within the set of variables is determined and a set of influencing variables are selected. Determination of a reference variable can be based on analysis of variations exhibited by the set of variables identified in act 2030, whereas selection of influencing variables can obey various selection mechanisms, as discussed supra. In particular, selection mechanisms can include at least one of a universal selection, a semi-universal selection, a knowledge based selection, an empirical selection, or an actor-driven selection. Influencing variables can include time, such as elapsed time in a recipe step. At act 2050, a formal functional relationship g among the determined reference variable and the set of influencing variables is learned. Learning proceeds in substantially the same manner, or the same manner, as in act 1730 of example method 1700. In addition, learning the formal function relationship can include time as an influencing variable. It should be appreciated that example method can be re-enacted multiple times in order to learn multiple functions for several reference variables. It should further be appreciated that the autonomous system described in the subject specification can learn a function for each parameter included in the received set of data.

FIG. 21 presents a flowchart of an example method 2100 for establishing a performance degradation or mismatch of one or more tools, or instruments thereof, according to aspects described herein. The subject example method 2100 can be enacted to determine performance degradation for a reference tool or a production tool. An autonomous biologically based learning engine (e.g., 360), and one or more components functionally coupled thereto, can implement at least in part the subject example method 2100. Alternatively or in addition, a processing platform and functional unit(s) or processor(s) therein that confer functionality to the autonomous biologically based learning engine or the one or more components functionally coupled thereto also can implement at least in part the subject example method. At act 2110, a value of a reference variable is measured. In an aspect, the measurement is part of a production process for an asset (e.g., asset 390 such as a FPD) through one or more tools via utilization of one or more recipes. In another aspect, the subject example method can be utilized at various level of granularity with respect to the production process. At act 2120, a value for each variable in a set of influencing variables associated with the reference variable is measured. At act 2130, a value for the reference variable is predicted based on a learned formal relationship among the reference variable and the set of influencing variables as measured. At act 2140 it is validated whether a difference among the prediction and measurement of the reference variable is below a performance metric threshold, wherein the performance metric threshold can be configurable, e.g., by an actor. Performance can be assessed at least in part via a key performance indicator or substantially any, or any, performance metric such as quality of service. Various KPIs can be utilized, as discussed hereinbefore. When the difference is below the KPI threshold, flow of is redirected to measurement of a reference variable. Conversely, at act 2150, relevancy profile(s) for influencing variables and learned formal relationships are generated and retained. Generation of the relevancy profile(s) can be implemented as discussed hereinbefore. For instance, a sensitivity analysis can be conducted, wherein the sensitivity analysis can be based at least in part on at least one of a percentage impact of a set of influencing variables on a predicted value for a reference variable, or a numeric derivative assessment of the learned formal relationship of the set of influencing variables. In an aspect, the performance degradation or mismatch is associated with operation of one or more tools that implement a process to produce an asset. It should be appreciated that assessment of performance degradation typically entails a learned formal relationship associated with production data, whereas in case of performance mismatch, the learned formal relationship is associated with production data originating from disparate tools, wherein one of the tools can be a reference tool.

At act 2160, at least one of performance degradation or mismatch is reported and performance report(s) (e.g., performance summary(ies) 1145) are retained. In an aspect, reporting includes conveying or delivering performance information such as relevancy profile(s) to an actor. As an example, for an abnormal performance event, reporting can include displaying a set of influencing variables ordered according to a ranking criterion, with a time stamp associated with the event.

Various aspects or features described herein may be implemented as a method, apparatus as either hardware or a combination of hardware and software or hardware and firmware, or article of manufacture using standard programming and/or engineering techniques. Implementation(s) as a method can be effected at least in part through a processor or processing unit (e.g., processing platform 385). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disc (CD), digital versatile disc (DVD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "including" are used in either the detailed description or the claims, such term is intended to be inclusive in a manner similar to the terms "comprises" or "comprising" as "comprises" or "comprising" is interpreted when employed as a transitional word in a claim.

What is claimed is:

1. A learning system, comprising:
   a processor; and
   a computer-readable storage medium storing computer executable components and communicatively coupled to the processor to facilitate operation of the computer executable components, the computer executable components comprising:
   a component configured to select a set of variables associated with data generated based on a first unit of equipment in a tool system and a second unit of equipment in the tool system, wherein the tool system is configured to produce an asset, and wherein the set of variables includes a reference variable and a set of influencing variables that influences the reference variable;
   an objective learning engine configured to learn autonomously a relationship among the reference variable and the set of influencing variables associated with the first unit of equipment and the second unit of equipment, wherein the objective learning engine is configured to remove an influencing variable from the set of influencing variables in response to a determination that a weight associated with the influencing variable is below a threshold value and a previous weight associated with the influencing variable is above the threshold value, and wherein the relationship among the reference variable and the set of influencing variables is autonomously adjusted in response to the removal of the influencing variable from the set of influencing variables in order to account for the removal of the influencing variable from the set of influencing variables; and a performance assessment component configured to compare a measured value of the reference variable and a predicted value of the reference variable based on the relationship among the reference variable and the set of influencing variables to determine a performance degradation or a performance mismatch of the first unit of equipment and the second unit of equipment.

2. The system of claim 1, wherein the asset includes at least one semiconductor device, the at least one semiconductor device comprising at least one of a plasma-discharge based flat panel display (FPD), an organic light emitting diode (OLED)-based FPD, a liquid crystal display (LCD)-based FPD, or elements thereof which comprise at least one of a thin-film-transistor active matrix array, a color filter, or a polarizer.

3. The system of claim 1, wherein the performance assessment component is configured to generate a ranking of the set of influencing variables associated with the performance degradation or the performance mismatch.

4. The system of claim 3, wherein the data includes at least one of manufacturing run data, synthetic manufacturing data, or test manufacturing data.

5. The system of claim 1, wherein the data selector is configured to select the reference variable via at least one of an automated analysis or an actor input.

6. The system of claim 5, wherein the automated analysis includes an arrangement of candidate reference variables in accordance with a variation magnitude of each of the candidate reference variables in a manufacturing process of the asset.

7. The system of claim 6, wherein the data selector is further configured to select at least one of a low variation variable, a medium variation variable, or a high variation variable.

8. The system of claim 1, wherein the data selector is further configured to select a set of influencing variables based at least in part on one of a universal selection, a semi-universal selection, a knowledge based selection, an empirical selection, or an actor-driven selection.

9. The system of claim 4, wherein the data selector includes a formatter component configured to convey selected data in a matrix representation.

10. The system of claim 9, wherein the matrix representation includes a reference variable and at least one variable in the set of influencing variables associated with the reference variable.

11. The system of claim 10, wherein the data selector includes a component configured to select reference data from the data associated with the set of units of equipment in the tool system that produces the asset, the reference data is at least a portion of the data.

12. The system of claim 11, wherein the data selector is further configured to select reference data via an actor input.

13. The system of claim 12, wherein the formatter component is further configured to generate a training matrix based at least in part on the selected reference data.

14. The system of claim 13, wherein the data is collected at a predetermined sampling rate.

15. The system of claim 14, wherein the reference data includes data from a group of non-contiguous steps in an ordered set of steps for the asset.

16. The system of claim 15, wherein the reference data includes average data that originates from at least one of a step level, a wafer level, a lot level, an active matrix array manufacturing, or a wet-clean cycle.

17. The system of claim 16, wherein the reference data includes average data that originates in a predetermined cycle within a process to manufacture the asset, the asset comprises a flat panel display device.

18. The system of claim 14, wherein the training matrix is generated for one or more instances of a process to manufacture the asset, the one or more instances include at least one of a step in the ordered set of steps for the asset, a wafer run in a set of tools, a lot run in a set of tools, or a set of cycles within the process.

19. The system of claim 3, wherein the relationship among the reference variable and the set of influencing variables for the selected data is a mathematical functional relationship, wherein the mathematical functional relationship is autonomously learned without reliance on an external bias.

20. The system of claim 19, wherein the mathematical functional relationship conveys a difference among a measured value of the reference variable and a predicted value thereof.

21. The system of claim 20, wherein the mathematical function relationship conveys a variation of the difference among a measured value of the reference variable and a predicted value thereof.

22. The system of claim 19, wherein the selected data is production data for at least one instance in a process to manufacture the asset.

23. The system of claim 19, wherein the performance assessment component includes an analysis component configured to summarize a distribution of differences between a measured value and a predicted value through a set of statistical-mechanics functions.

24. The system of claim 23, wherein a set of actor-supplied key performance indicator thresholds are utilized to determine at least one of an abnormal performance degradation or an abnormal performance mismatch.

25. The system of claim 23, wherein at least one of the abnormal performance degradation or the abnormal performance mismatch is determined for at least one of a reference tool or an instrument thereof.

26. The system of claim 24, wherein the analysis component includes a formal analysis component configured to determine the ranking of the set of influencing variables through unsupervised theorem proving algorithms and expression analysis of the mathematical functional relationship.

27. The system of claim 26, wherein the analysis component includes a numerical analysis component configured to establish the ranking of the set of influencing variables through computation of a gradient vector of the mathematical functional relationship for the set of influencing variables.

28. The system of claim 27, wherein at least one of the performance degradation or a performance mismatch of the first unit of equipment and the second unit of equipment is profiled according to the ranking of the set of influencing variables and a timestamp associated with the performance degradation or the performance mismatch.

29. A method, comprising:

measuring a value of a reference variable associated with a first tool that manufactures at least one asset and a second tool that manufactures the at least one asset;

measuring a value for each variable in a set of influencing variables that influences the reference variable;

predicting a value for the reference variable based on a learned formal relationship among the reference variable and the set of influencing variables associated with the first tool that manufactures the at least one asset and the second tool that manufactures the at least one asset;

removing an influencing variable from the set of influencing variables in response to a determination that a weight associated with the influencing variable satisfies a function of a threshold value and a previous weight associated with the influencing variable does not satisfy the function of the threshold value;

adjusting the learned formal relationship among the reference variable and the set of influencing variables in response to the removing of the influencing variable from the set of influencing variables in order to account for the removing of the influencing variable from the set of influencing variables; and reporting at least one of performance degradation of at least one tool or performance mismatch amongst the first tool that manufactures the at least one asset and the second tool that manufactures the at least one asset in response to a difference among the predicted value for the reference variable and the measured value for the reference variable being above a performance metric threshold.

30. The method of claim 29, wherein the reporting includes generating a profile that is associated with the performance degradation or the performance mismatch and includes the set of influencing variables ordered according to a ranking criterion; and retaining the profile for the set of influencing variables and learned functions in response to a difference among the predicted value for the reference variable and the measured value for the reference variable being above a performance metric threshold.

31. The method of claim 30, wherein reporting at least one of the performance degradation of the at least one tool or the performance mismatch includes conveying performance information to an actor, the performance information comprises at least one of the profile or the set of influencing variables ordered according to the ranking criterion with a time stamp associated with the performance degradation or the mismatch event.

32. The method of claim 31, wherein generating the profile associated with the performance degradation includes performing a sensitivity analysis based at least in part on at least one of a percentage impact of the set of influencing variables on a predicted value for the reference variable, or a numeric derivative assessment of the learned function of the set of influencing variables.

33. The method of claim 29, further comprising
receiving a set of data associated at least in part with the manufacture of the at least one asset;
selecting a set of reference data for a set of variables; and
determining the reference variable from the set of variables and selecting the set of influencing variables.

34. The method of claim 33, wherein the at least one asset include at least one of a semiconductor device, the semiconductor device comprising at least one of a plasma-discharge based flat panel display (FPD), an organic light emitting diode (OLED)-based FPD, or a liquid crystal display (LCD)-based FPD.

35. The method of claim 34, wherein the set of data includes at least one of production run data, synthetic manufacturing data, or test manufacturing data.

36. The method of claim 35, further comprising formatting the received set of data, wherein formatting the received data includes generating a matrix representation for at least one of the test manufacturing data or the production run data.

37. The method of claim 36, wherein the matrix representation of the test manufacturing data is generated at one or more instants during operation of the first tool that manufactures the at least one asset and the second tool that manufactures the at least one asset.

38. The method of claim 36, wherein the matrix representation of the production run data is generated at one or more instants during operation of the first tool that manufactures the at least one asset and the second tool that manufactures the at least one asset.

39. The method of claim 36, wherein generating the matrix representation for at least one of test manufacturing data or the production run data is generated at one or more production instances, the one or more production instances include at least one of a step level in one or more recipes, or a plurality of steps either contiguous or disjointed in the one or more recipes.

40. The method of claim 36, wherein generating the matrix representation for at least one of the test manufacturing data or the production run data is generated via received data at the asset level.

41. The method of claim 33, wherein selecting the set of reference data for the set of variables includes at least one of selecting a portion of the received data or receiving input from an actor.

42. The method of claim 41, wherein the set of reference data for the set of variables includes data from the first tool that manufactures the at least one asset and the second tool that manufactures the at least one asset, and wherein the data is collected at a predetermined sampling rate.

43. The method of claim 42, wherein the set of reference data for the set of variables includes data from a group of non-contiguous steps in one or more recipes to produce the at least one asset.

44. The method of claim 43, wherein the set of reference data for the set of variables includes average data that originates from at least one of a step level, a wafer level, a lot level, an active matrix array manufacturing, or a wet-clean cycle.

45. The method of claim 33, wherein selecting the set of influencing variables is based at least on one of a universal selection, a semi-universal selection, a knowledge based selection, an empirical selection, or an actor-driven selection.

46. The method of claim 29, further comprising updating a learned mathematical function in response to the removing the influencing variable from the set of influencing variables.

47. A non-transitory computer-readable storage medium comprising a set of instructions that, when executed by a computer, cause the computer to perform the following acts:
measuring a set of values of a reference variable associated with a first tool for manufacturing an asset and a second tool for manufacturing the asset;
measuring a set of values for each variable in a set of influencing variables that influences the reference variable;
learning autonomously a formal relationship among the reference variable and the set of influencing variables associated with the first tool for manufacturing the asset and the second tool for manufacturing the asset;
predicting a set of values for the reference variable based on the learned formal relationship;
removing an influencing variable from the set of influencing variables in response to a determination that a first weight associated with the influencing variable is above a threshold value and a second weight associated with the influencing variable is below the threshold value;

modifying the formal relationship among the reference variable and the set of influencing variables in response to the removing of the influencing variable from the set of influencing variables in order to account for the removing of the influencing variable from the set of influencing variables; and reporting performance degradation of at least a tool or performance mismatch of the first tool for manufacturing the asset and the second tool for manufacturing the asset when a difference among a predicted value of the reference variable and a measured value of the reference variable is above a key performance indicator threshold.

48. The non-transitory computer-readable storage medium of claim 47, wherein the reporting includes ordering the set of influencing variables according to a ranking criterion relevant to the performance degradation or the performance mismatch.

49. An apparatus, comprising:
means for identifying a set of variables and data associated with a first unit of equipment in a tool system that produces an asset and a second unit of equipment in the tool system that produces the asset, wherein the set of variables includes a reference variable and a set of influencing variables that influences the reference variable;

means for autonomously learning a functional relationship among the reference variable and the set of influencing variables associated with the first unit of equipment and the second unit of equipment;

means for removing a selected influencing variable from the set of influencing variables in response to a determination that a weight associated with the selected influencing variable is below a set value and a previous weight associated with the selected influencing variable is above the set value;

means for autonomously updating the learned functional relationship among the reference variable and the set of influencing variables in response to the removing of the selected influencing variable from the set of influencing variables in order to account for the removing of the selected influencing variable from the set of influencing variables; and means for assessing at least one of performance degradation or performance mismatch of the first unit of equipment and the second unit of equipment in the tool system based at least in part on values of the reference variable predicted through the learned functional relationship.

50. The apparatus of claim 49, wherein the means for assessing includes means for generating a relevancy profile associated with the performance degradation or the performance mismatch which includes the set of influencing variables ordered according to a ranking criterion.

\* \* \* \* \*